US012229696B2

(12) United States Patent
Bisht et al.

(10) Patent No.: US 12,229,696 B2
(45) Date of Patent: Feb. 18, 2025

(54) FIELD EQUIPMENT DATA SYSTEM

(71) Applicant: Schlumberger Technology Corporation, Sugar Land, TX (US)

(72) Inventors: Vipin Bisht, Dehradun (IN); Shankar Shailesh, Pune (IN); Sapna Deshmukh, Pune (IN); Chandra Prakash Deep Ajmera, Pune (IN)

(73) Assignee: Schlumberger Technology Corporation, Sugar Land, TX (US)

( * ) Notice: Subject to any disclaimer, the term of this patent is extended or adjusted under 35 U.S.C. 154(b) by 244 days.

(21) Appl. No.: 17/820,260

(22) Filed: Aug. 17, 2022

(65) Prior Publication Data

US 2024/0062124 A1 Feb. 22, 2024

(51) Int. Cl.
| | | |
|---|---|---|
| *G06F 16/00* | (2019.01) | |
| *G01V 20/00* | (2024.01) | |
| *G06F 16/25* | (2019.01) | |
| *G06Q 10/0631* | (2023.01) | |
| *G06Q 50/02* | (2012.01) | |

(52) U.S. Cl.
CPC ......... *G06Q 10/0631* (2013.01); *G01V 20/00* (2024.01); *G06F 16/258* (2019.01); *G06Q 50/02* (2013.01)

(58) Field of Classification Search
None
See application file for complete search history.

(56) References Cited

U.S. PATENT DOCUMENTS

| | | | |
|---|---|---|---|
| 6,411,903 B2 | 6/2002 | Bush | |
| 7,176,682 B2 | 2/2007 | Galford et al. | |
| 10,026,041 B2 | 7/2018 | Narayanan et al. | |
| 2002/0040300 A1* | 4/2002 | Ell | G06Q 10/0631 705/26.1 |
| 2017/0364795 A1 | 12/2017 | Anderson et al. | |
| 2018/0181865 A1 | 6/2018 | Adachi | |
| 2019/0292908 A1 | 9/2019 | Vajargah et al. | |
| 2019/0325331 A1 | 10/2019 | Benhallam et al. | |
| 2020/0160173 A1 | 5/2020 | Pandey et al. | |
| 2021/0058235 A1* | 2/2021 | Rangarajan | H04L 9/0643 |
| 2021/0406792 A1 | 12/2021 | Bhardwaj et al. | |
| 2022/0154574 A1 | 5/2022 | Mehri | |

OTHER PUBLICATIONS

International Search Report and Written Opinion of the PCT Application No. PCT/US2023/030345 dated Nov. 30, 2023, 10 pages.
International Search Report and Written Opinion of the PCT Application No. PCT/US2023/030324 dated Dec. 11, 2023, 10 pages.
Shell Launches Artificial Intelligence Chatbot for B2B Lubricants Customers and Distributors, Shell.com, May 17, 2018, 7 pages. Available at: https://www.shell.com/business-customers/lubricants-for-business/news-and-media-releases/2018/shell-launches-ai-chatbot.html.

* cited by examiner

*Primary Examiner* — Thu Nguyet T Le
(74) *Attorney, Agent, or Firm* — Jeffrey D. Frantz

(57) ABSTRACT

A method can include receiving a request for field equipment data; responsive to the request, automatically processing the field equipment data using a trained machine learning model to generate a quality score for the field equipment data; and outputting the quality score.

20 Claims, 29 Drawing Sheets

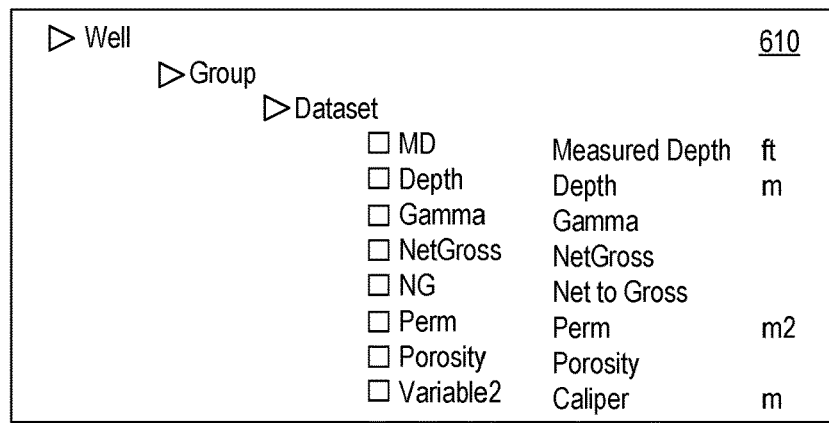

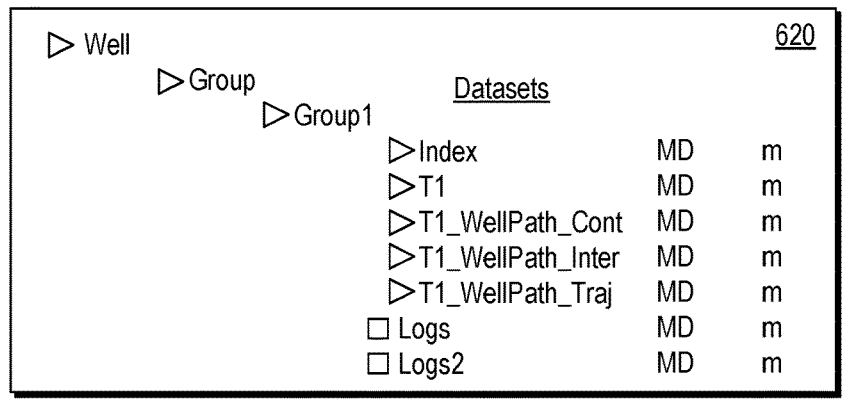

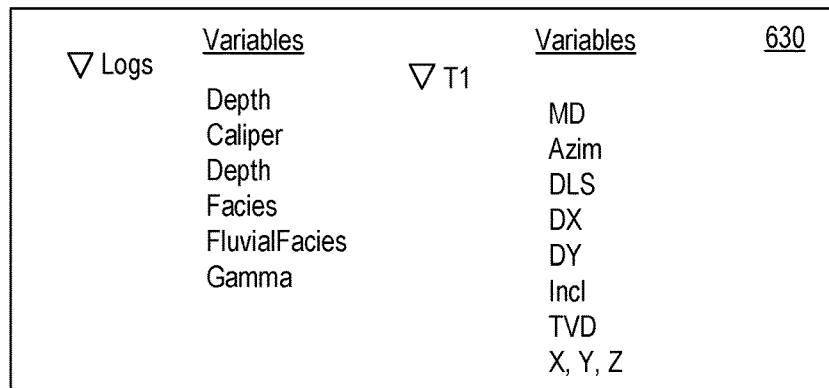

| Data Type | DS Prop. | Variable Properties | | | | 680 |
|---|---|---|---|---|---|---|
| | DS Type | Main Family | Family | Sub-Type | Units | |
| Dev. Survey | Continuous | Borehole | Hole Azimuth | Vari.Cont. | dega | |
| | Continuous | Borehole | X Offset | Vari.Cont. | m | |
| | Continuous | Borehole | Y Offset | Vari.Cont. | m | |
| Log Curves | Continuous | Borehole | Caliper | Vari.Cont. | m | |
| | Continuous | Borehole | Porosity | Vari.Cont. | | |
| | Continuous | Borehole | Lithology | Vari.Cont. TBC | unitless | |

▽ Logs
    Depth            MD
                       MD
    Caliper         Tunnel Length
    Depth            MD
    Facies          Lithology
    FluvialFacies   Lithology
    Gamma         Gamma Ray

814

| Main Param. | 2nd Param. | Properties | TECHLOG | Quality |

Name               Caliper
Version No.        1
Version Status   raw and latent
Dataset           Logs
Sampling Rate   0.5 m
Main Family     Completion ▷
Family           Tunnel Length ▷
Family Unit      in.
Measurement    Short Length
Unit             m ▷

816

▽ Logs
    Depth            MD
                       MD
    Caliper         Tunnel Length

818

| Parameters | Properties | Recall | Quality | History |

Dataset Name    Logs
Dataset Type    Continuous ▷
Well Name       C3
No. of Samples  1111
Ref. Family      MD

| Name/Type | Description |
|---|---|
| Request Query Param | entityid |
| Response | Example:<br><br>{<br><br>"qcMlResults":<br><br>  {<br><br>    "MlEngineResult":"<br><br>{<br><br>"boreholdId" : 1469857<br><br>  "boreholeName" : BB23-A<br><br>   "status" : "Good",<br><br>   "kind" : "tenant1:PSW:BH_Sum: 1.0",<br><br>   "modelName" : "Decision Tree" |

1410

| Model | Description |
|---|---|
| Logistic Regression | 91.10 % accurate to detect data as good or bad for wellbore entity |
| Random Forest | Random Forest w/GINI: 0.989 |
| | Random Forest w/Entropy: 0.990 |
| | Random Forest w/GINI (sqrt): 0.983 |
| | Random Forest w/Entropy (sqrt): 0.988 |
| Decision Tree | Decision Tree w/GINI & BEST: 0.978 |
| | Decision Tree w/GINI & RANDOM: 0.971 |
| | Decision Tree w/ENTROPY & BEST: 0.992 |
| | Decision Tree w/ENTROPY & RANDOM: 0.906 |
| SVM | SVM w/Linear Kernel: 0.941 |
| | SVM w/Radial Basis Kernel: 0.951 |
| | SVM w/Polynomial Kernel: 0.896 |
| XgBoost | 99.4% accurate |

1420

| Model | Description |
|---|---|
| Keras DNN w/K-Fold Validation | 98.83% accuracy |

Fig. 14

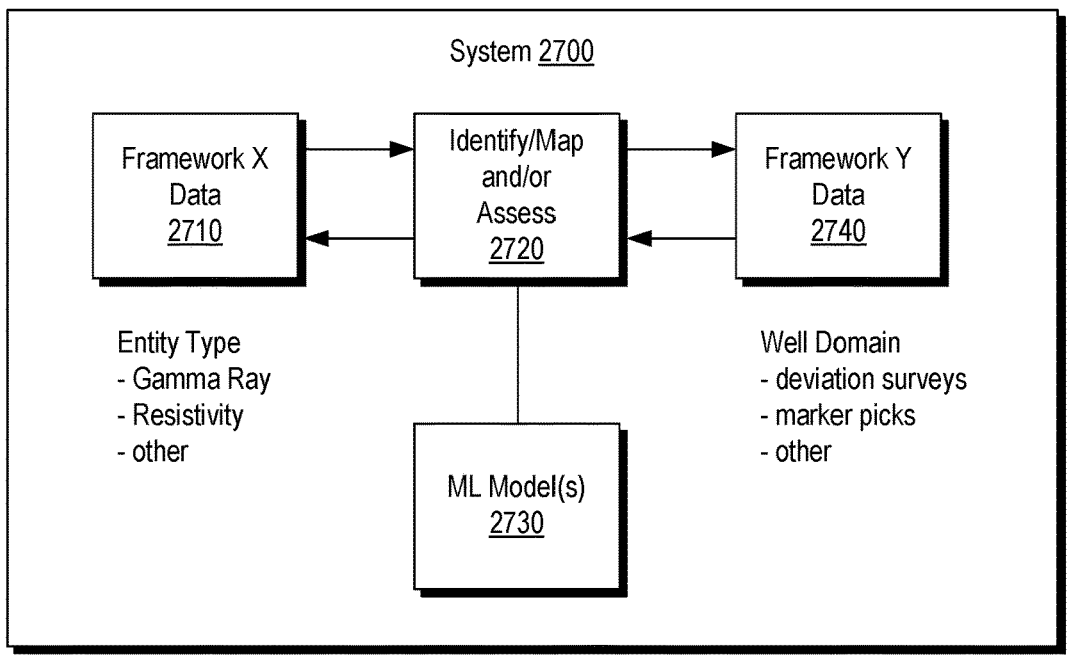
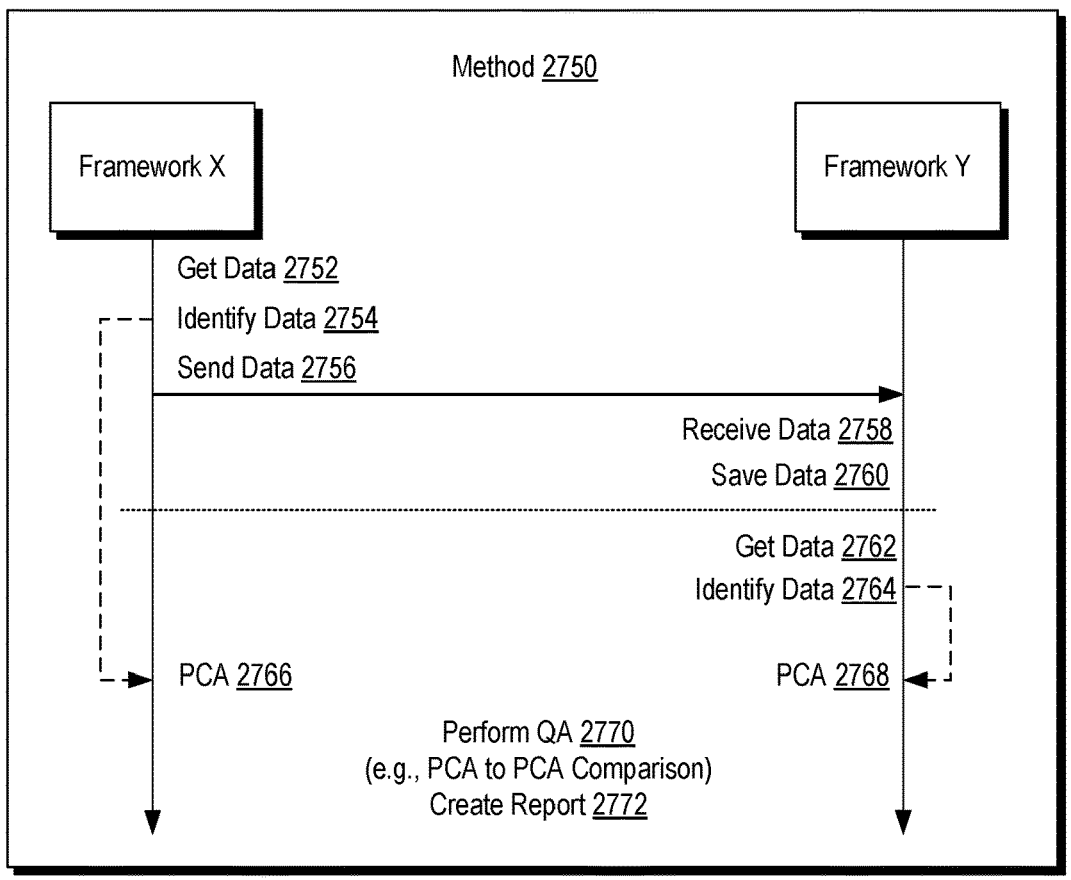
Fig. 27

FIELD EQUIPMENT DATA SYSTEM

BACKGROUND

A reservoir can be a subsurface formation that can be characterized at least in part by its porosity and fluid permeability. As an example, a reservoir may be part of a basin such as a sedimentary basin. A basin can be a depression (e.g., caused by plate tectonic activity, subsidence, etc.) in which sediments accumulate. As an example, where hydrocarbon source rocks occur in combination with appropriate depth and duration of burial, a petroleum system may develop within a basin, which may form a reservoir that includes hydrocarbon fluids (e.g., oil, gas, etc.). Various operations may be performed in the field to access such hydrocarbon fluids and/or produce such hydrocarbon fluids. For example, consider equipment operations where equipment may be controlled to perform one or more operations.

SUMMARY

A method can include receiving a request for field equipment data; responsive to the request, automatically processing the field equipment data using a trained machine learning model to generate a quality score for the field equipment data; and outputting the quality score. A system can include a processor; memory accessible to the processor; and processor-executable instructions stored in the memory to instruct the system to: receive a request for field equipment data; responsive to the request, automatically process the field equipment data using a trained machine learning model to generate a quality score for the field equipment data; and output the quality score. One or more computer-readable storage media can include processor-executable instructions to instruct a computing system to: receive a request for field equipment data; responsive to the request, automatically process the field equipment data using a trained machine learning model to generate a quality score for the field equipment data; and output the quality score. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 6 illustrates examples of graphical user interfaces and an example of a table of data properties;

FIG. 8 illustrates examples of graphical user interfaces;

FIG. 14 illustrates an example of a table of various model related attributes;

FIG. 27 illustrates an example of a system;

DETAILED DESCRIPTION

This description is not to be taken in a limiting sense, but rather is made merely for the purpose of describing the general principles of the implementations. The scope of the described implementations should be ascertained with reference to the issued claims.

Figure 1:
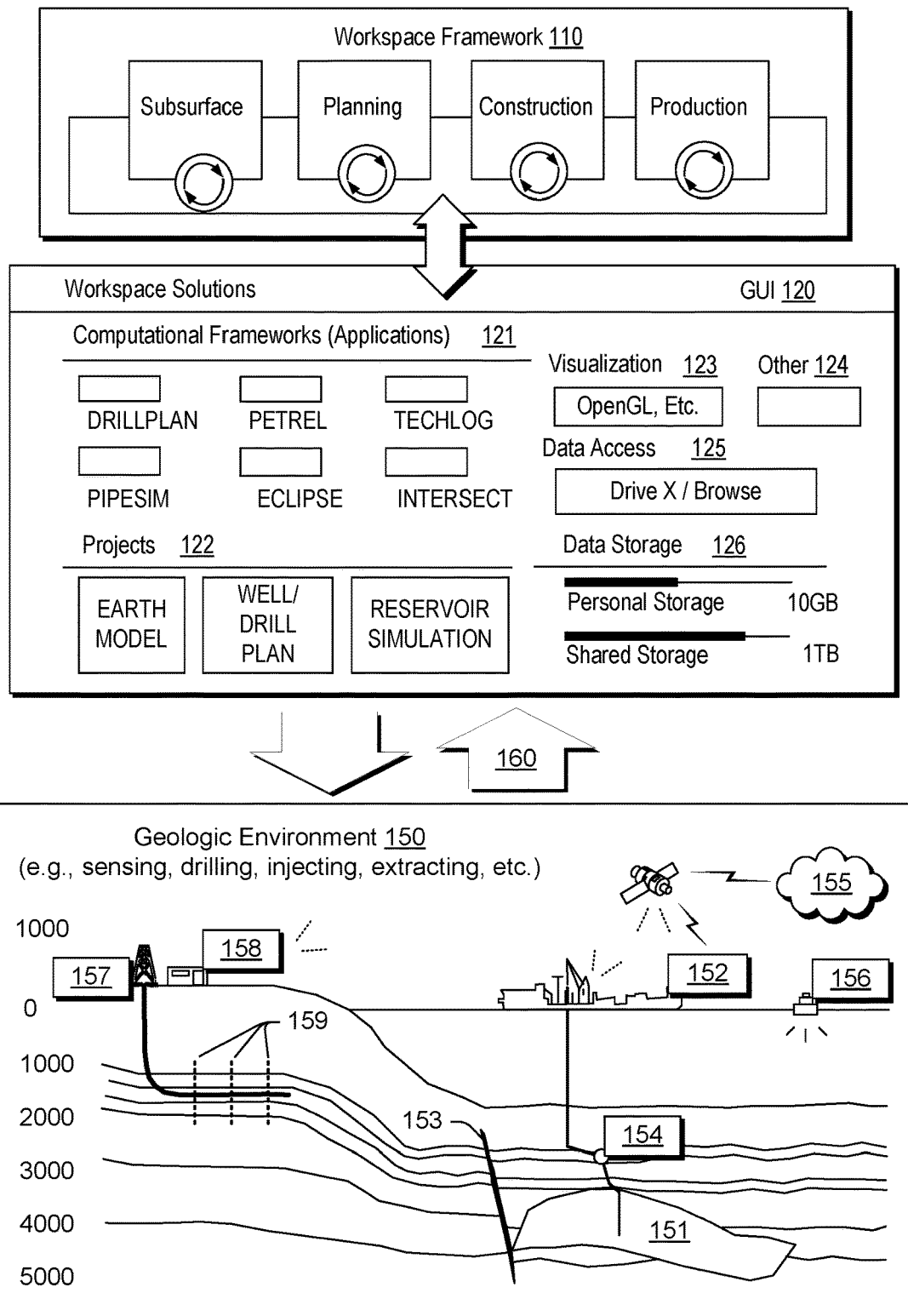
FIG. 1 illustrates an example system that includes various framework components associated with one or more geologic environments.

FIG. 1 shows an example of a system 100 that includes a workspace framework 110 that can provide for instantiation of, rendering of, interactions with, etc., a graphical user interface (GUI) 120. In the example of FIG. 1, the GUI 120 can include graphical controls for computational frameworks (e.g., applications) 121, projects 122, visualization 123, one or more other features 124, data access 125, and data storage 126.

In the example of FIG. 1, the workspace framework 110 may be tailored to a particular geologic environment such as an example geologic environment 150. For example, the geologic environment 150 may include layers (e.g., stratification) that include a reservoir 151 and that may be intersected by a fault 153. As an example, the geologic environment 150 may be outfitted with a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a wellsite and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

In the example of FIG. 1, the GUI 120 shows some examples of computational frameworks, including the DRILLPLAN, PETREL, TECHLOG, PETROMOD, ECLIPSE, and INTERSECT frameworks (Schlumberger Limited, Houston, Texas).

The DRILLPLAN framework provides for digital well construction planning and includes features for automation of repetitive tasks and validation workflows, enabling improved quality drilling programs (e.g., digital drilling plans, etc.) to be produced quickly with assured coherency.

The PETREL framework can be part of the DELFI cognitive exploration and production (E&P) environment (Schlumberger Limited, Houston, Texas, referred to as the DELFI environment) for utilization in geosciences and geoengineering, for example, to analyze subsurface data from exploration to production of fluid from a reservoir.

One or more types of frameworks may be implemented within or in a manner operatively coupled to the DELFI environment, which is a secure, cognitive, cloud-based collaborative environment that integrates data and workflows with digital technologies, such as artificial intelligence (AI) and machine learning (ML). As an example, such an environment can provide for operations that involve one or more frameworks. The DELFI environment may be referred to as the DELFI framework, which may be a framework of frameworks. As an example, the DELFI environment can include various other frameworks, which can include, for example, one or more types of models (e.g., simulation models, etc.).

The TECHLOG framework can handle and process field and laboratory data for a variety of geologic environments (e.g., deepwater exploration, shale, etc.). The TECHLOG framework can structure wellbore data for analyses, planning, etc.

The PIPESIM simulator includes solvers that may provide simulation results such as, for example, multiphase flow results (e.g., from a reservoir to a wellhead and beyond, etc.), flowline and surface facility performance, etc. The PIPESIM simulator may be integrated, for example, with the AVOCET production operations framework (Schlumberger Limited, Houston Texas). As an example, a reservoir or reservoirs may be simulated with respect to one or more enhanced recovery techniques (e.g., consider a thermal process such as steam-assisted gravity drainage (SAGD), etc.). As an example, the PIPESIM simulator may be an optimizer that can optimize one or more operational scenarios at least in part via simulation of physical phenomena.

The ECLIPSE framework provides a reservoir simulator (e.g., as a computational framework) with numerical solutions for fast and accurate prediction of dynamic behavior for various types of reservoirs and development schemes.

The INTERSECT framework provides a high-resolution reservoir simulator for simulation of detailed geological features and quantification of uncertainties, for example, by creating accurate production scenarios and, with the integration of precise models of the surface facilities and field operations, the INTERSECT framework can produce reliable results, which may be continuously updated by real-time data exchanges (e.g., from one or more types of data acquisition equipment in the field that can acquire data during one or more types of field operations, etc.). The INTERSECT framework can provide completion configurations for complex wells where such configurations can be built in the field, can provide detailed chemical-enhanced-oil-recovery (EOR) formulations where such formulations can be implemented in the field, can analyze application of steam injection and other thermal EOR techniques for implementation in the field, advanced production controls in terms of reservoir coupling and flexible field management, and flexibility to script customized solutions for improved modeling and field management control. The INTERSECT framework, as with the other example frameworks, may be utilized as part of the DELFI cognitive E&P environment, for example, for rapid simulation of multiple concurrent cases. For example, a workflow may utilize one or more of the DELFI on demand reservoir simulation features.

The aforementioned DELFI environment provides various features for workflows as to subsurface analysis, planning, construction and production, for example, as illustrated in the workspace framework 110. As shown in FIG. 1, outputs from the workspace framework 110 can be utilized for directing, controlling, etc., one or more processes in the geologic environment 150 and, feedback 160, can be received via one or more interfaces in one or more forms (e.g., acquired data as to operational conditions, equipment conditions, environment conditions, etc.).

As an example, a workflow may progress to a geology and geophysics ("G&G") service provider, which may generate a well trajectory, which may involve execution of one or more G&G software packages.

In the example of FIG. 1, the visualization features 123 may be implemented via the workspace framework 110, for example, to perform tasks as associated with one or more of subsurface regions, planning operations, constructing wells and/or surface fluid networks, and producing from a reservoir.

As an example, a visualization process can implement one or more of various features that can be suitable for one or more web applications. For example, a template may involve use of the JAVASCRIPT object notation format (JSON) and/or one or more other languages/formats. As an example, a framework may include one or more converters. For example, consider a JSON to PYTHON converter and/or a PYTHON to JSON converter. In such an approach, one or more features of a framework that may be available in one language may be accessed via a converter. For example, consider the APACHE SPARK framework (Apache Software Foundation, Wakefield, Massachusetts) that can include features available in a particular language where a converter may convert code in another language to that particular language such that one or more of the features can be utilized. As an example, a production field may include various types of equipment, be operable with various frameworks, etc., where one or more languages may be utilized. In such an example, a converter may provide for feature flexibility and/or compatibility.

As an example, visualization features can provide for visualization of various earth models, properties, etc., in one or more dimensions. As an example, visualization features can provide for rendering of information in multiple dimensions, which may optionally include multiple resolution rendering. In such an example, information being rendered may be associated with one or more frameworks and/or one or more data stores. As an example, visualization features may include one or more control features for control of equipment, which can include, for example, field equipment that can perform one or more field operations. As an example, a workflow may utilize one or more frameworks to generate information that can be utilized to control one or more types of field equipment.

Field equipment can include equipment utilized at one or more field sites. For example, consider drilling equipment, wireline equipment, fracturing equipment, etc., which may be utilized at wellsites. A wellsite can be a site where a well or borehole is present for fluid communication with a reservoir. For example, a wellsite can include one or more wells that are in fluid communication with one or more reservoirs for injection and/or production of fluid. As an example, produced fluid can include hydrocarbon fluid that can be utilized as an energy source (e.g., for combustion). As an example, a wellsite or another type of site may include energy production related equipment. For example, consider wind energy production equipment (e.g., wind turbines, orientation controllers, converters, etc.), solar energy production equipment (e.g., solar cell panels, orientation controllers, converters, etc.), or other energy production equipment (e.g., thermal, regenerative, etc.). In such examples, data acquired from one site may be analyzed to assist with planning and/or performance of one or more field operations at one or more other sites. As an example, data may be acquired and analyzed as to energy production, for example, to monitor production, optimize production, etc.

As to a reservoir model that may be suitable for utilization by a simulator, consider acquisition of seismic data as acquired via reflection seismology, which finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks. Such interpretation results can be utilized to plan, simulate, perform, etc., one or more operations for production of fluid from a reservoir (e.g., reservoir rock, etc.).

Field acquisition equipment may be utilized to acquire seismic data, which may be in the form of traces where a trace can include values organized with respect to time and/or depth (e.g., consider 1D, 2D, 3D or 4D seismic data). For example, consider acquisition equipment that acquires digital samples at a rate of one sample per approximately 4 ms. Given a speed of sound in a medium or media, a sample rate may be converted to an approximate distance. For example, the speed of sound in rock may be on the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where later acquired samples correspond to deeper reflection boundaries. If the 4 second trace duration of the foregoing example is divided by two (e.g., to account for reflection), for a vertically aligned source and sensor, a deepest boundary depth may be estimated to be about 10 km (e.g., assuming a speed of sound of about 5 km per second).

As an example, a model may be a simulated version of a geologic environment. As an example, a simulator may include features for simulating physical phenomena in a geologic environment based at least in part on a model or models. A simulator, such as a reservoir simulator, can simulate fluid flow in a geologic environment based at least in part on a model that can be generated via a framework that receives seismic data. A simulator can be a computerized system (e.g., a computing system) that can execute instructions using one or more processors to solve a system of equations that describe physical phenomena subject to various constraints. In such an example, the system of equations may be spatially defined (e.g., numerically discretized) according to a spatial model that that includes layers of rock, geobodies, etc., that have corresponding positions that can be based on interpretation of seismic and/or other data. A spatial model may be a cell-based model where cells are defined by a grid (e.g., a mesh). A cell in a cell-based model can represent a physical area or volume in a geologic environment where the cell can be assigned physical properties (e.g., permeability, fluid properties, etc.) that may be germane to one or more physical phenomena (e.g., fluid volume, fluid flow, pressure, etc.). A reservoir simulation model can be a spatial model that may be cell-based.

A simulator can be utilized to simulate the exploitation of a real reservoir, for example, to examine different productions scenarios to find an optimal one before production or further production occurs. A reservoir simulator does not provide an exact replica of flow in and production from a reservoir at least in part because the description of the reservoir and the boundary conditions for the equations for flow in a porous rock are generally known with an amount of uncertainty. Certain types of physical phenomena occur at a spatial scale that can be relatively small compared to size of a field. A balance can be struck between model scale and computational resources that results in model cell sizes being of the order of meters; rather than a lesser size (e.g., a level of detail of pores). A modeling and simulation workflow for multiphase flow in porous media (e.g., reservoir rock, etc.) can include generalizing real micro-scale data from macro scale observations (e.g., seismic data and well data) and upscaling to a manageable scale and problem size. Uncertainties can exist in input data and solution procedure such that simulation results too are to some extent uncertain. A process known as history matching can involve comparing simulation results to actual field data acquired during production of fluid from a field. Information gleaned from history matching, can provide for adjustments to a model, data, etc., which can help to increase accuracy of simulation.

As an example, a simulator may utilize various types of constructs, which may be referred to as entities. Entities may include earth entities or geological objects such as wells, surfaces, reservoirs, etc. Entities can include virtual representations of actual physical entities that may be reconstructed for purposes of simulation. Entities may include entities based on data acquired via sensing, observation, etc. (e.g., consider entities based at least in part on seismic data and/or other information). As an example, an entity may be characterized by one or more properties (e.g., a geometrical pillar grid entity of an earth model may be characterized by a porosity property, etc.). Such properties may represent one or more measurements (e.g., acquired data), calculations, etc.

As an example, a simulator may utilize an object-based software framework, which may include entities based on pre-defined classes to facilitate modeling and simulation. As an example, an object class can encapsulate reusable code and associated data structures. Object classes can be used to instantiate object instances for use by a program, script, etc. For example, borehole classes may define objects for representing boreholes based on well data. A model of a basin, a reservoir, etc. may include one or more boreholes where a borehole may be, for example, for measurements, injection, production, etc. As an example, a borehole may be a wellbore of a well, which may be a completed well (e.g., for production of a resource from a reservoir, for injection of material, etc.).

While several simulators are illustrated in the example of FIG. 1, one or more other simulators may be utilized, additionally or alternatively. For example, consider the VISAGE geomechanics simulator (Schlumberger Limited, Houston Texas) or the PETROMOD simulator (Schlumberger Limited, Houston Texas), etc. The VISAGE simulator includes finite element numerical solvers that may provide simulation results such as, for example, results as to compaction and subsidence of a geologic environment, well and completion integrity in a geologic environment, cap-rock and fault-seal integrity in a geologic environment, fracture behavior in a geologic environment, thermal recovery in a geologic environment, CO 2 disposal, etc. The PETROMOD framework provides petroleum systems modeling capabilities that can combine one or more of seismic, well, and geological information to model the evolution of a sedimentary basin. The PETROMOD framework can predict if, and how, a reservoir has been charged with hydrocarbons, including the source and timing of hydrocarbon generation, migration routes, quantities, and hydrocarbon type in the subsurface or at surface conditions. The MANGROVE simulator (Schlumberger Limited, Houston, Texas) provides for optimization of stimulation design (e.g., stimulation treatment operations such as hydraulic fracturing) in a reservoir-centric environment. The MANGROVE framework can combine scientific and experimental work to predict geomechanical propagation of hydraulic fractures, reactivation of natural fractures, etc., along with production forecasts within 3D reservoir models (e.g., production from a drainage area of a reservoir where fluid moves via one or more types of fractures to a well and/or from a well). The MANGROVE framework can provide results pertaining to heterogeneous interactions between hydraulic and natural fracture networks, which may assist with optimization of the number and location of fracture treatment stages (e.g., stimulation treatment(s)), for example, to increased perforation efficiency and recovery.

Figure 2:
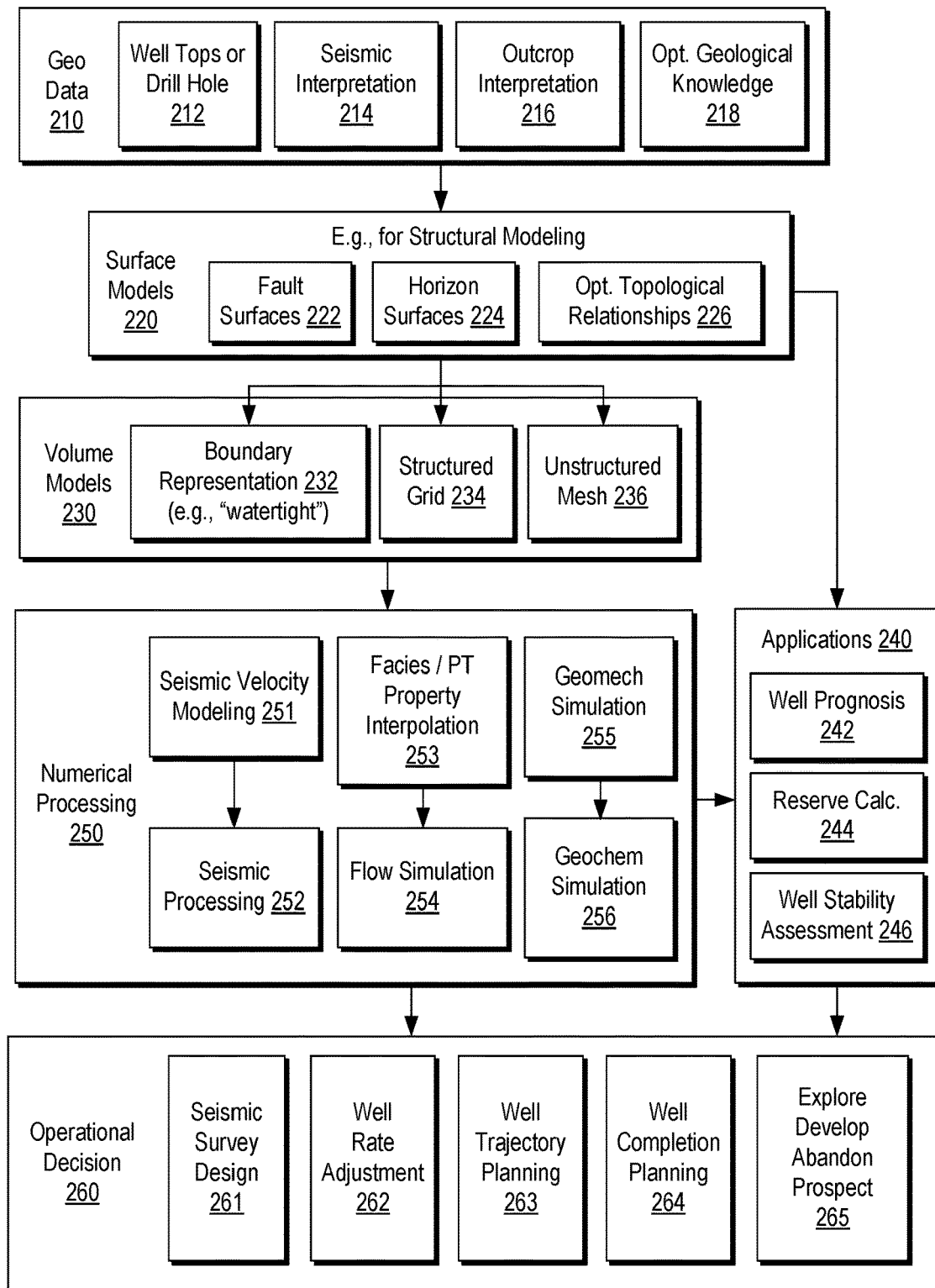
FIG. 2 illustrates an example of a system.

FIG. 2 shows an example of a system 200 that can be operatively coupled to one or more databases, data streams, etc. For example, one or more pieces of field equipment, laboratory equipment, computing equipment (e.g., local and/or remote), etc., can provide and/or generate data that may be utilized in the system 200.

As shown, the system 200 can include a geological/geophysical data block 210, a surface models block 220 (e.g., for one or more structural models), a volume modules block 230, an applications block 240, a numerical processing block 250 and an operational decision block 260. As shown in the example of FIG. 2, the geological/geophysical data block 210 can include data from well tops or drill holes 212, data from seismic interpretation 214, data from outcrop interpretation and optionally data from geological knowledge. As to the surface models block 220, it may provide for creation, editing, etc. of one or more surface models based on, for example, one or more of fault surfaces 222, horizon surfaces 224 and optionally topological relationships 226. As to the volume models block 230, it may provide for creation, editing, etc. of one or more volume models based on, for example, one or more of boundary representations 232 (e.g., to form a watertight model), structured grids 234 and unstructured meshes 236.

As shown in the example of FIG. 2, the system 200 may allow for implementing one or more workflows, for example, where data of the data block 210 are used to create, edit, etc. one or more surface models of the surface models block 220, which may be used to create, edit, etc. one or more volume models of the volume models block 230. As indicated in the example of FIG. 2, the surface models block 220 may provide one or more structural models, which may be input to the applications block 240. For example, such a structural model may be provided to one or more applications, optionally without performing one or more processes of the volume models block 230 (e.g., for purposes of numerical processing by the numerical processing block 250). Accordingly, the system 200 may be suitable for one or more workflows for structural modeling (e.g., optionally without performing numerical processing per the numerical processing block 250).

As to the applications block 240, it may include applications such as a well prognosis application 242, a reserve calculation application 244 and a well stability assessment application 246. As to the numerical processing block 250, it may include a process for seismic velocity modeling 251 followed by seismic processing 252, a process for facies and petrophysical property interpolation 253 followed by flow simulation 254, and a process for geomechanical simulation 255 followed by geochemical simulation 256. As indicated, as an example, a workflow may proceed from the volume models block 230 to the numerical processing block 250 and then to the applications block 240 and/or to the operational decision block 260. As another example, a workflow may proceed from the surface models block 220 to the applications block 240 and then to the operational decisions block 260 (e.g., consider an application that operates using a structural model).

In the example of FIG. 2, the operational decisions block 260 may include a seismic survey design process 261, a well rate adjustment process 252, a well trajectory planning process 263, a well completion planning process 264 and a process for one or more prospects, for example, to decide whether to explore, develop, abandon, etc. a prospect.

Referring again to the data block 210, the well tops or drill hole data 212 may include spatial localization, and optionally surface dip, of an interface between two geological formations or of a subsurface discontinuity such as a geological fault; the seismic interpretation data 214 may include a set of points, lines or surface patches interpreted from seismic reflection data, and representing interfaces between media (e.g., geological formations in which seismic wave velocity differs) or subsurface discontinuities; the outcrop interpretation data 216 may include a set of lines or points, optionally associated with measured dip, representing boundaries between geological formations or geological faults, as interpreted on the earth surface; and the geological knowledge data 218 may include, for example knowledge of the paleo-tectonic and sedimentary evolution of a region.

As to a structural model, it may be, for example, a set of gridded or meshed surfaces representing one or more interfaces between geological formations (e.g., horizon surfaces) or mechanical discontinuities (fault surfaces) in the subsurface. As an example, a structural model may include some information about one or more topological relationships between surfaces (e.g. fault A truncates fault B, fault B intersects fault C, etc.).

As to the one or more boundary representations 232, they may include a numerical representation in which a subsurface model is partitioned into various closed units representing geological layers and fault blocks where an individual unit may be defined by its boundary and, optionally, by a set of internal boundaries such as fault surfaces.

As to the one or more structured grids 234, it may include a grid that partitions a volume of interest into different elementary volumes (cells), for example, that may be indexed according to a pre-defined, repeating pattern. As to the one or more unstructured meshes 236, it may include a mesh that partitions a volume of interest into different elementary volumes, for example, that may not be readily indexed following a pre-defined, repeating pattern (e.g., consider a Cartesian cube with indexes I, J, and K, along x, y, and z axes).

As to the seismic velocity modeling 251, it may include calculation of velocity of propagation of seismic waves (e.g., where seismic velocity depends on type of seismic wave and on direction of propagation of the wave). As to the seismic processing 252, it may include a set of processes allowing identification of localization of seismic reflectors in space, physical characteristics of the rocks in between these reflectors, etc.

As to the facies and petrophysical property interpolation 253, it may include an assessment of type of rocks and of their petrophysical properties (e.g. porosity, permeability), for example, optionally in areas not sampled by well logs or coring. As an example, such an interpolation may be constrained by interpretations from log and core data, and by prior geological knowledge.

As to the flow simulation 254, as an example, it may include simulation of flow of hydro-carbons in the subsurface, for example, through geological times (e.g., in the context of petroleum systems modeling, when trying to predict the presence and quality of oil in an un-drilled formation) or during the exploitation of a hydrocarbon reservoir (e.g., when some fluids are pumped from or into the reservoir).

As to geomechanical simulation 255, it may include simulation of the deformation of rocks under boundary conditions. Such a simulation may be used, for example, to assess compaction of a reservoir (e.g., associated with its depletion, when hydrocarbons are pumped from the porous and deformable rock that composes the reservoir). As an example a geomechanical simulation may be used for a variety of purposes such as, for example, prediction of fracturing, reconstruction of the paleo-geometries of the reservoir as they were prior to tectonic deformations, etc.

As to geochemical simulation 256, such a simulation may simulate evolution of hydrocarbon formation and composition through geological history (e.g., to assess the likelihood of oil accumulation in a particular subterranean formation while exploring new prospects).

As to the various applications of the applications block 240, the well prognosis application 242 may include predicting type and characteristics of geological formations that may be encountered by a drill-bit, and location where such rocks may be encountered (e.g., before a well is drilled); the reserve calculations application 244 may include assessing total amount of hydrocarbons or ore material present in a subsurface environment (e.g., and estimates of which proportion can be recovered, given a set of economic and technical constraints); and the well stability assessment application 246 may include estimating risk that a well, already drilled or to-be-drilled, will collapse or be damaged due underground stress.

As to the operational decision block 260, the seismic survey design process 261 may include deciding where to place seismic sources and receivers to optimize the coverage and quality of the collected seismic information while minimizing cost of acquisition; the well rate adjustment process 262 may include controlling injection and production well schedules and rates (e.g., to maximize recovery and production); the well trajectory planning process 263 may include designing a well trajectory to maximize potential recovery and production while minimizing drilling risks and costs; the well trajectory planning process 264 may include selecting proper well tubing, casing and completion (e.g., to meet expected production or injection targets in specified reservoir formations); and the prospect process 265 may include decision making, in an exploration context, to continue exploring, start producing or abandon prospects (e.g., based on an integrated assessment of technical and financial risks against expected benefits).

The system 200 can include and/or can be operatively coupled to a system such as the system 100 of FIG. 1. For example, the workspace framework 110 may provide for instantiation of, rendering of, interactions with, etc., the graphical user interface (GUI) 120 to perform one or more actions as to the system 200. In such an example, access may be provided to one or more frameworks (e.g., DRILLPLAN, PETREL, TECHLOG, PIPESIM, ECLIPSE, INTERSECT, etc.). One or more frameworks may provide for geo data acquisition as in block 210, for structural modeling as in block 220, for volume modeling as in block 230, for running an application as in block 240, for numerical processing as in block 250, for operational decision making as in block 260, etc.

As an example, the system 200 may provide for monitoring data such as production data and/or production-related data. For example, consider the operational decision block 260 as including capabilities for monitoring, analyzing, etc., such data for purposes of making one or more operational decisions, which may include controlling equipment, revising operations, revising a plan, etc. In such an example, data may be fed into the system 200 at one or more points where the quality of the data may be of particular interest. For example, data quality may be characterized by one or more metrics where data quality may provide indications as to trust, probabilities, etc., which may be germane to operational decision making and/or other decision making.

Figure 3:
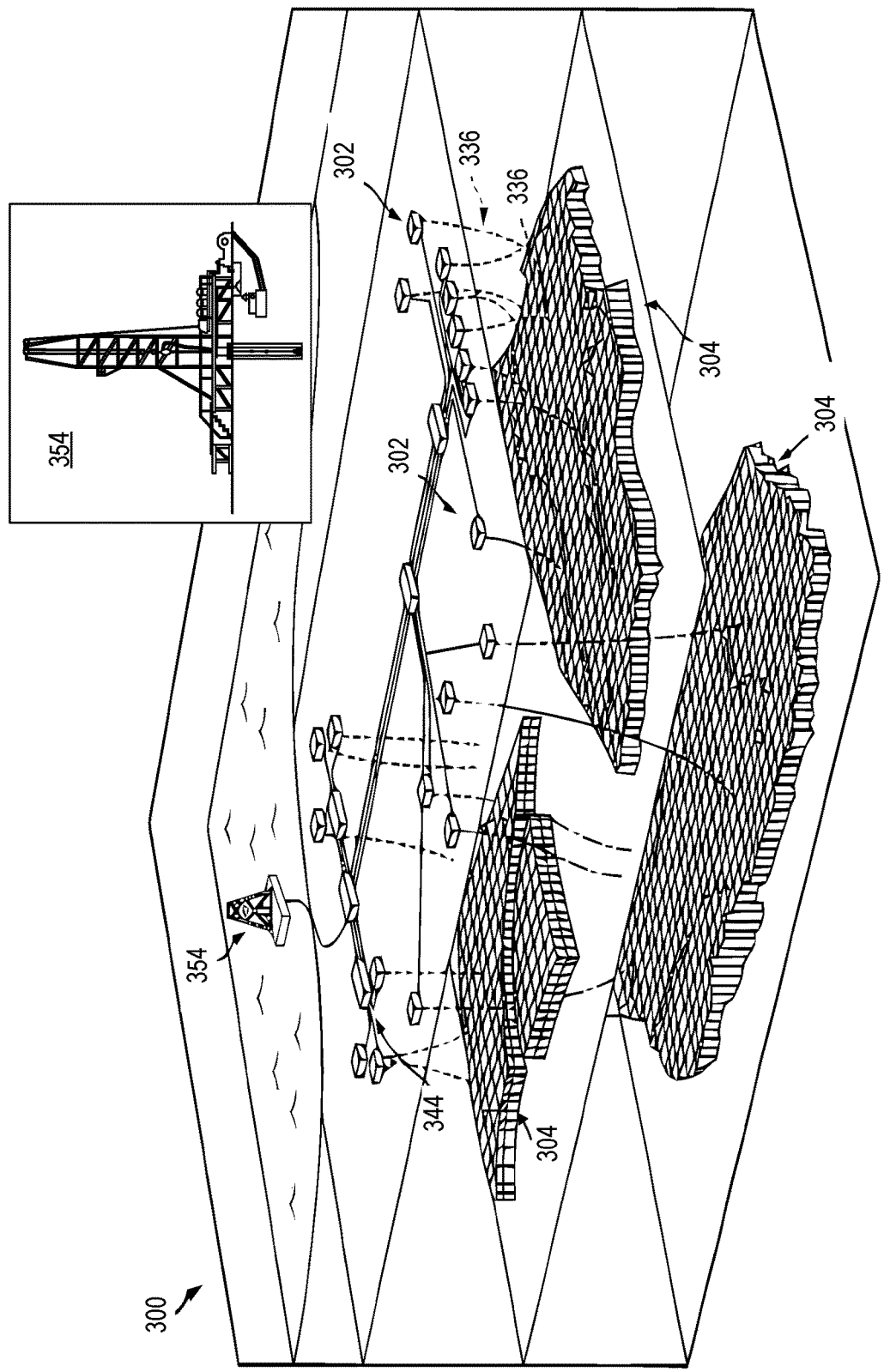
FIG. 3 illustrates an example of a geologic environment and examples of equipment.

FIG. 3 shows an example of a geologic environment 300 as including various types of equipment and features. As shown, the geologic environment 300 includes a plurality of wellsites 302, which may be operatively connected to a processing facility. In the example of FIG. 3, individual wellsites 302 can include equipment that can form individual wellbores 336. Such wellbores can extend through subterranean formations including one or more reservoirs 304. Such reservoirs 304 can include fluids, such as hydrocarbons. As an example, wellsites can provide for flow of fluid from one or more reservoirs and pass them to one or more processing facilities via one or more surface networks 344. As an example, a surface network can include tubing and control mechanisms for controlling flow of fluids from a wellsite to a processing facility. In the example of FIG. 3, a rig 354 is shown, which may be an offshore rig or an onshore rig. As an example, a rig can be utilized to drill a borehole that can be completed to be a wellbore where the wellbore can be in fluid communication with a reservoir such that fluid may be produced from the reservoir.

As mentioned, the geologic environment 300 can include various types of equipment and features. As an example, consider one or more sensors that can be located within the geologic environment 300 for purposes of sensing physical phenomena (e.g., pressure, temperature, flow rates, composition, density, viscosity, solids, flare character, compaction, etc.). As an example, equipment may include production equipment such as a choke valve where individual wells may each include a choke valve that can regulate flow of fluid from a well. As an example, equipment may include artificial lift equipment that can facilitate production of fluid from a reservoir. Artificial lift can be implemented as part of a production strategy whereby energy can be added to fluid to help initiate and/or improve production. Artificial lift equipment may utilizes one or more of various operating principles, which can include, for example, rod pumping, gas lift, electric submersible pumps, etc. Referring again to FIG. 2, the operational decision block 260 may include planning for artificial lift, call for artificial lift, controlling one or more artificial lift operations, etc.

As an example, enhanced oil recovery (EOR) may be employed in the geologic environment 300, which may be based on one or more outputs of a system such as the system 200, the system 100, etc. EOR can aim to alter fluid properties, particularly properties of hydrocarbons. As an example, EOR may aim to restore formation pressure and/or improve oil displacement or fluid flow in a reservoir. EOR may include chemical flooding (e.g., alkaline flooding or micellar-polymer flooding), miscible displacement (e.g., carbon dioxide injection or hydrocarbon injection), thermal recovery (e.g., steam flood or in-situ combustion), etc. EOR may depend on factors such as reservoir temperature, pressure, depth, net pay, permeability, residual oil and water saturations, porosity and fluid properties such as oil API gravity and viscosity. EOR may be referred to at times as improved oil recovery or tertiary recovery.

Figure 4:
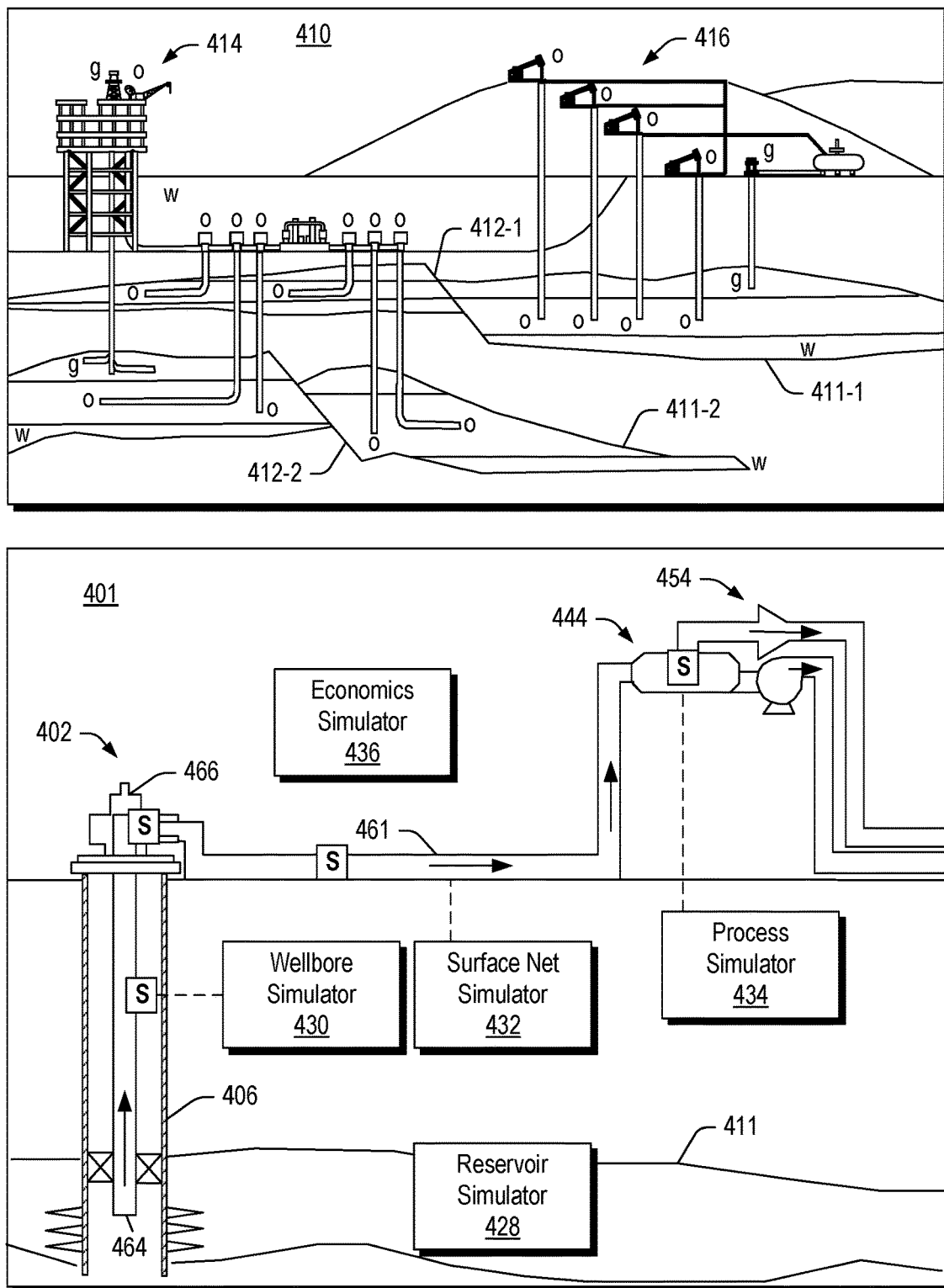
FIG. 4 illustrates examples of equipment and examples of simulators.

FIG. 4 shows an example of portion of a geologic environment 401 and an example of a larger portion of a geologic environment 410. As shown, a geologic environment can include one or more reservoirs 411-1 and 411-2, which may be faulted by faults 412-1 and 412-2 and which may include oil (o), gas (g) and/or water (w). FIG. 4 also shows some examples of offshore equipment 414 for oil and gas operations related to the reservoirs 411-1 and 411-2 and onshore equipment 416 for oil and gas operations related to the reservoir 411-1. As an example, a system may be implemented for operations associated with one or more of such reservoirs.

As to the geologic environment 401, FIG. 4 shows a schematic view where the geologic environment 401 can include various types of equipment. As shown in FIG. 4, the environment 401 can includes a wellsite 402 and a fluid network 444. In the example of FIG. 4, the wellsite 402 includes a wellbore 406 extending into earth as completed and prepared for production of fluid from a reservoir 411 (e.g., one of the reservoirs 411-1 or 411-2).

In the example of FIG. 4, wellbore production equipment 464 extends from a wellhead 466 of the wellsite 402 and to the reservoir 411 to draw fluid to the surface. As shown, the wellsite 402 is operatively connected to the fluid network 444 via a transport line 461. As indicated by various arrows, fluid can flow from the reservoir 411, through the wellbore 406 and onto the fluid network 444. Fluid can then flow from the fluid network 444, for example, to one or more fluid processing facilities.

In the example of FIG. 4, sensors (S) are located, for example, to monitor various parameters during operations. The sensors (S) may measure, for example, pressure, temperature, flowrate, composition, and other parameters of the reservoir, wellbore, gathering network, process facilities and/or other portions of an operation. As an example, the sensors (S) may be operatively connected to a surface unit (e.g., to instruct the sensors to acquire data, to collect data from the sensors, etc.).

In the example of FIG. 4, a surface unit can include computer facilities, such as a memory device, a controller, one or more processors, and a display unit (e.g., for managing data, visualizing results of an analysis, etc.). As an example, data may be collected in the memory device and processed by the processor(s) (e.g., for analysis, etc.). As an example, data may be collected from the sensors (S) and/or by one or more other sources. For example, data may be supplemented by historical data collected from other operations, user inputs, etc. As an example, analyzed data may be used to in a decision making process.

As an example, a transceiver may be provided to allow communications between a surface unit and one or more pieces of equipment in the environment 401. For example, a controller may be used to actuate mechanisms in the environment 401 via the transceiver, optionally based on one or more decisions of a decision making process. In such a manner, equipment in the environment 401 may be selectively adjusted based at least in part on collected data. Such adjustments may be made, for example, automatically based on computer protocol, manually by an operator or both. As an example, one or more well plans may be adjusted (e.g., to select optimum operating conditions, to avoid problems, etc.).

To facilitate data analyses, one or more simulators may be implemented (e.g., optionally via the surface unit or other unit, system, etc.). As an example, data fed into one or more simulators may be historical data, real time data or combinations thereof. As an example, simulation through one or more simulators may be repeated or adjusted based on the data received.

In the example of FIG. 4, simulators can include a reservoir simulator 428, a wellbore simulator 430, a surface network simulator 432, a process simulator 434 and an economics simulator 436. As an example, the reservoir simulator 428 may be configured to solve for hydrocarbon flow rate through a reservoir and into one or more wellbores. As an example, the wellbore simulator 430 and surface network simulator 432 may be configured to solve for hydrocarbon flow rate through a wellbore and a surface gathering network of pipelines. As to the process simulator 434, it may be configured to model a processing plant where fluid containing hydrocarbons is separated into its constituent components (e.g., methane, ethane, propane, etc.), for example, and prepared for further distribution (e.g., transport via road, rail, pipe, etc.) and optionally sale. As an example, the economics simulator 436 may be configured to model costs associated with at least part of an operation. For example, consider MERAK framework (Schlumberger Limited, Houston, Texas), which may provide for economic analyses.

As an example, a system can include and/or be operatively coupled to one or more of the simulators 428, 430, 432, 434 and 436 of FIG. 4. As an example, such simulators may be associated with frameworks and/or may be considered tools (see, e.g., the system 100 of FIG. 1, etc.). Various pieces of equipment in the example geologic environments 401 and 410 of FIG. 4 may be operatively coupled to one or more systems, one or more frameworks, etc. As an example, one or more of the sensors (S) may be operatively coupled to one or more networks (e.g., wired and/or wireless) for transmission of data, which, as explained, may include data indicative of production. As shown, a sensor (S) may be utilized for acquisition of downhole data and/or surface data, which can include data relevant to production (e.g., flow rate, temperature, pressure, composition, etc.). Such data may be utilized in a system such as, for example, the system 200 of FIG. 2 for operational decision making, etc.

While various examples of field equipment are illustrated for hydrocarbon related production operations, as explained, field equipment may be for one or more other types of operations where such field equipment can acquire data (e.g., field equipment data) that can be utilized for operation decision making and/or one or more other purposes. As to wind energy production equipment, data can include meteorological data associated with a site or sites, turbine blade data, turbine performance data, orientation control data, energy conversion data, etc. As to solar energy production equipment, data can include meteorological data associated with a site or sites, solar cell data, solar panel performance data, orientation control data, energy conversion data, etc.

As explained, field equipment data may be suitable for use with one or more frameworks, one or more workflows, etc. Uses of field equipment data can involve transfers such as, for example, inter-framework transfers where one or more types of data related issues may arise due to formatting, unit conversions, coordinate reference system (CRS) conversions, etc. Use of field equipment data can be enhanced through automated or semi-automated processes that can perform tasks such as identifying data (e.g., data types, etc.) and/or assessing quality of data.

Figure 5:
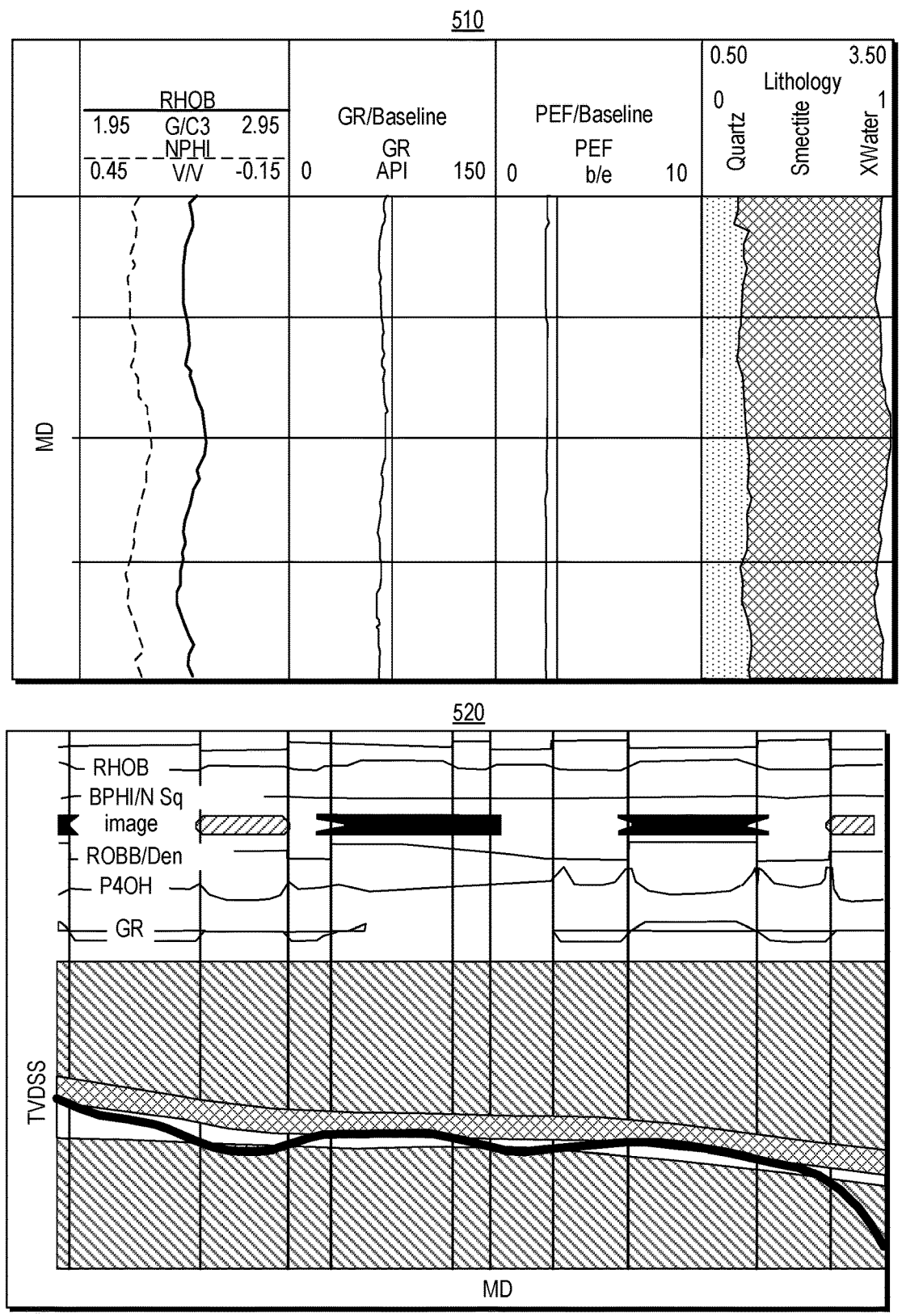
FIG. 5 illustrates examples of graphical user interfaces.

FIG. 5 shows example GUIs 510 and 520 as to some examples of data that may be acquired and/or generated based at least in part on acquired data. As mentioned, various types of data can be acquired, which may be or include field data, laboratory data, simulation data, etc. In the GUIs 510 and 520, the data can be received using a framework such as the TECHLOG framework. In the GUI 510, data include well log data (e.g., log curves) such as bulk density (RHOB), gamma ray (GR), photo electric factor (PEF), and lithology versus measured depth (MD). In the GUI 520, data include RHOB, neutron porosity (BPHI), bulk density bottom (ROBB), phase shift resistivity 40 inch spacing at 2 MH (P40H ohm·m), imagery data (e.g., borehole images), and GR versus total vertical depth (TVD) minus the elevation above mean sea level of the depth of the reference point of a well (TVDSS). As shown in the GUI 520, a borehole trajectory (thick line) can be defined using TVDSS and MD and can be related to various types of data. As explained, data can be utilized during drilling, for example, to control drilling into one or more types of materials to reach a reservoir target and/or to keep a borehole within spatial bounds of a reservoir.

As explained, a framework such as the TECHLOG framework can dynamically incorporate data as they are streamed directly from a wellsite for real-time processing and instantaneous analysis as a well is drilled, which can aid in decision making during operations. As mentioned, such a framework can also access one or more other types of data such as laboratory data, stored data, etc.

FIG. 6 shows example GUIs 610, 620 and 630 of data hierarchies for a well along with a table 680 of various examples of variable properties. As shown in FIG. 6, a well can include a group of datasets (see, e.g., Group) and/or a subgroup of datasets (see, e.g., Group 1) and where each dataset can include variables (see, e.g., Logs and T1). As shown, units can be associated with data where, for example, unit conversions may be performed. In various instances, multiple unit conversions may be performed where data may be stored after each conversion. In such an example, some amount of data degradation may occur after one or more unit conversions (e.g., from feet to meters and back to feet).

As shown in GUI 610, a vertical arrangement of a data structure is presented with four elements: well, group, dataset and variables. In the TECHLOG framework, a user may arrange and/or rename such a structure, for example, consider the GUI 620 with groups, dataset and variables. As an example, a user can create multiple groups and datasets under a well with a suitable name. As an example, a structure can consider each entity entry to be a variable without distinguishing between entities. In such an example, from the given data structure, it may not be possible to discern whether an entity is for a deviation survey or a logcurve (e.g., or log curve). Various frameworks demand that entity type is known in advance, for example, to synchronize among different data sources. Data consistency and management can benefit from information as to data structure, names, etc., that is known before ingestion into a framework, an environment, etc.

A deviation survey can include measurements of inclination and azimuth of one or more locations in a well (e.g., total depth at time of measurement). In both directional and straight boreholes, knowing positions along a borehole with reasonable accuracy can help to assess a borehole trajectory with respect to a plan and, for example, to allow for appropriate drilling of a relief well if warranted. Measurements of a deviation survey can include inclination from vertical and azimuth (or compass heading) of a borehole. Such measurements can be made at a plurality of discrete points in the well, and the approximate path of the wellbore computed from the discrete points. Measurement devices (e.g., sensors) can include pendulum-like devices, electronic accelerometers and gyroscopes, etc. Where a MWD tool is carried by a drillstring, the MWD tool can include sensors for acquiring measurements of a deviation survey.

In FIG. 6, the table 680 includes various examples of variable properties for cases that include of deviation survey and logcurve data types. As an example, consider the table 680 as training data (e.g., a collection of data type cases which are available within a system) where a workflow can involve an entity as may be read from a framework (e.g., TECHLOG, etc.).

As an example, a deviation survey or a logcurve may be represented as an entity in a framework such as the TECHLOG framework where the deviation survey data or the logcurve can be utilized by another framework such as the PETRL framework. In such an example, a transfer can occur, which can be referred to as an inter-application or inter-framework transfer. Such transfers can involve actions such as formatting, converting, etc., which may give rise to one or more quality related issues. For example, consider a coordinate reference system (CRS) conversion and/or a unit conversion where location information may be altered. As explained, data of a deviation survey may be utilized for one or more purposes that depend on accuracy of the data. If a transfer can possibly compromise or degrade accuracy of data (e.g., as to location, position, etc.), a method can provide for assessing data with respect to transfers, which can include data identification (e.g., automatic data identification, etc.).

While deviation survey and logcurve data types are mentioned, various other data types exist, which can be application or framework dependent. As an example, consider a well tops data transfer from the PETREL framework to the TECHLOG framework. Well tops data can include data generated via interpretation (e.g., picks, markers, etc.) of data acquired from one or more types of sensors (e.g., seismic surveys, drillstring sensors, wireline sensors, etc.) where well tops data include location data (e.g., position data for various structures such as stratigraphic structures, etc.). As with deviation surveys, accuracy as to location information in well tops data can be germane to one or more workflows, field operations, etc.

As an example, a method can perform data type identification using one or more machine learning models. In such an example, the method may be executed prior to performing a quality control assessment.

As an example, data types can include well log (e.g., logcurve, etc.), deviation surveys, markers, etc. As an example, data may be continuous, intermittent, interval-based, etc. As an example, a supervised machine learning and case-based reasoning (CBR) approach can be implemented to identify data types. For example, such an approach can provide for identifying the appropriate data type of one or more entities, where entity data can be ingested by a framework, optionally with data quality assessment performed prior to ingestion, during ingestion or after ingestion. As an example, a method can provide for analysis and/or extraction of structured and/or unstructured data.

As an example, the DELFI environment may implement the INNERLOGIX data engine (Schlumberger Limited, Houston, Texas). The INNERLOGIX data engine provide components for automated techniques to identify data issues and changes by applying user-defined assessment rules to an area of interest, to locate data changes or issues and automatically adjust and/synchronize data through a combination of techniques. Results can include results of automated assessment runs where adjusted and/or synchronized data can be displayed in GIS, chart, or spreadsheet form, and stored in a database. The INNERLOGIX data engine can provide a specialized set of rules that includes features such as a wellbore digital elevation checker, deviation survey outliner method, and log curve stratigraphic range verification; graphs, GIS, and reports to expose underlying data quality issues; a manual quality control tool for analyzing, comparing, and correcting data; and plug-and-play adapters for reading, inserting, and updating data from various applications into common and proprietary data stores. As an example, a data engine that can implement one or more machine learning models may be integrated with the INNERLOGIX data engine.

As an example, a framework-to-framework data transfer component may be included in a data engine that can, for example, provide well data transfer capabilities between frameworks such as the PETREL and TECHLOG frameworks (e.g., to improve efficient data sharing and data syncing workflows between the two frameworks, etc.). In such an example, a data identification component can be implemented such that identification of data can occur in an automated manner. For example, consider extraction of data types from one or more available data structures of the TECHLOG framework such that data types are identified to streamline use data by the PETREL framework (e.g., or vice versa).

As explained, a framework can be variable in its data arrangements, which may complicate an ability to identify appropriate data types. In such an example, a data identification component can identify data types using supervised machine learning with case-based reasoning approach. Such an approach can improve data consistency within workflows and, for example, can involve continual learning based on results of similar past workflows.

As an example, a data identification component can provide for identifying and categorizing entities retrieved from a framework (e.g., TECHLOG, etc.) with respect to data types. Such a component may provide for keeping the same data structure of a framework's data.

As an example, a data identification component can be implemented in a workflow when a user wants to analyze or export data from a framework (e.g., TECHLOG, etc.) where identification of entity data type can streamline data exported to one or more other frameworks. In such an example, a hierarchy may be discerned or otherwise indicated. For example, consider identification using a hierarchy of main family, family, subtype, units of variables along with type of a dataset (see, e.g., the table 680 of FIG. 6).

As mentioned, case-based reasoning (CBR) may be implemented, which provides for solving new problems based on the solutions of similar past problems (e.g., prior cases). A CBR system can solve new problems by retrieving stored prior cases and adapting their solutions to fit new circumstances. For example, a CBR system can draw cases from a single local case-base (e.g., a database with prior case information) tailored to a task.

Case-based reasoning can include the following processes: retrieval where, given a target problem, retrieval from memory cases relevant to solving it occurs where a case consists of a problem, its solution, and annotations about how the solution was derived; reuse where a solution from a previous case is mapped to a target problem, which can involve adapting the solution as appropriate to fit the new situation; revise where, having mapped the previous solution to the target situation, the new solution is tested in the real world (or a simulation) and revised if and as appropriate; and retain where, after the solution has been successfully adapted to the target problem, the result is stored as a new case in memory.

However, when the set of cases for a system is limited, it may be beneficial to supplement the local case-base with cases drawn from one or more external case-bases for related tasks. Effective use of external case-bases demands strategies for multi-case-based reasoning (MCBR): (1) for deciding when to dispatch problems to an external case-base, and (2) for performing cross-case-base adaptation to compensate for differences in the tasks and environments that each case-base reflects.

As an example, a method can include automatically tuning a multi-case-based reasoning (MCBR) system by selecting effective dispatching criteria and cross-case-base adaptation strategies. Such an approach does not necessarily demand advance knowledge of a task and domain as tests can be performed on an initial set of problems where results can be used to select strategies reflecting the characteristics of the local and external case-bases.

As mentioned, a supervised ML with CBR approach can be utilized for data type identification, which may be performed before or as part of a data quality assessment. For example, a data engine can include a data identification component and a data quality assessment component, which may be utilized in combination.

Figure 7:
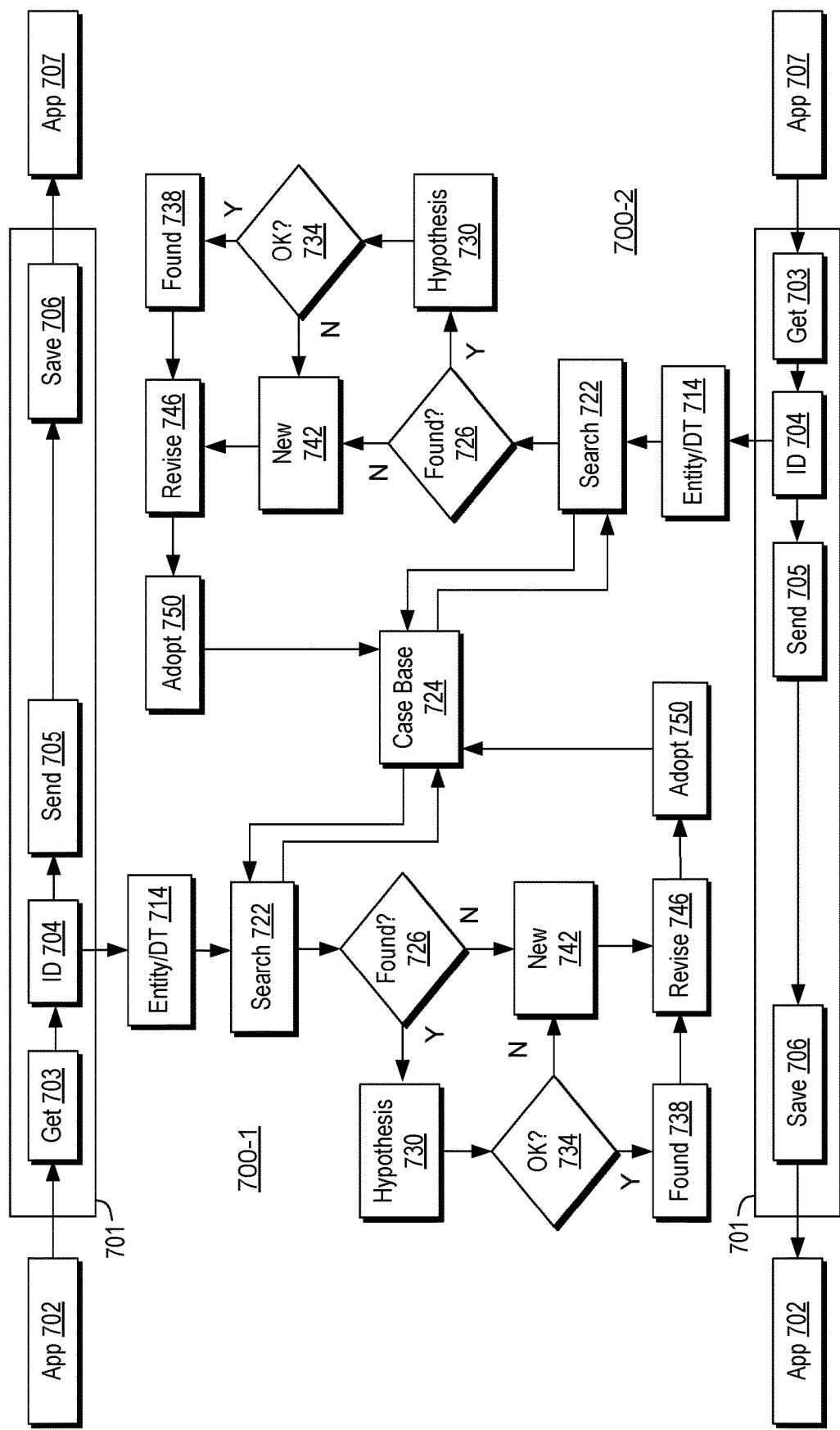
FIG. 7 illustrates examples of methods.

FIG. 7 shows examples of methods 700-1 and 700-2 that can be performed in a forward manner and in a reverse or inverse manner. In FIG. 7, various blocks are shown where one set of the blocks represent the method 700-1 for a forward progression of a transfer from an application 702 to an application 707 and where another set of the blocks represent the method 700-2 for an inverse progression of a transfer from the application 707 to the application 702. In the examples of FIG. 7, a transfer system 701 may be an intermediate system that provides for inter-application transfers (e.g., inter-framework transfers, etc.).

In the forward progression method 700-1, the application 702 is operatively coupled to the transfer system 701 to get data per a get block 703, identify data per an ID block 704, send data per a send block 705 and save data per a save block 706, which makes transfer data available to the application 707.

In the inverse progression method 700-2, the application 707 is operatively coupled to the transfer system 701 to get data per the get block 703, identify data per the ID block 704, send data per the send block 705 and save data per the save block 706, which makes transfer data available to the application 702.

As to the method 700-1, it includes an entity or data type (DT) block 714 for accessing an entity or a data type that can be part of a case, a search block 722 for searching a case base 724 for similar cases (e.g., according to one or more criteria), a decision block 726 for deciding whether a similar case (or cases) was found or not found by the search block 722. Where the decision block 726 decides that a case (or cases) was found, a hypothesis block 730 can determine a hypothesis of the case where a decision block 734 can decide if the hypothesis is correct or incorrect. If the decision block 734 decides that the hypothesis is correct, then the data type of the entity can be deemed to be found per a found block 738; otherwise, the method 700-1 can proceed to a new solution block 742, which can also be implemented where the decision block 726 decides that no cases were in the search result of the search block 722. As shown, the new solution block 742 and the found block 738 can proceed to a revision block 746 where mappings can be revised and where, if appropriate, can be adopted per an adoption block 750, which may be operatively coupled to the case base 724 for storage as a new case (e.g., new solution and/or revised solution).

In the example of FIG. 7, a retrieval block can be included as part of the entity/DT block 714, as part of the search block 722 or as an additional block to get related data, for example, in the form of variables and datasets for well children entities. In such an example, a user may select or want to know type of data among the available data types. As an example, data types can include variables, datasets and/or groups. If a given entity is of a variables type then a next action can get related data of that type. To get the related data, it can get a parent (or parents) of variable (e.g., dataset and subtype of that dataset). In a subsequent workflow, retrieval of children can be performed (e.g., variables of that dataset and related details like main family, family, subtype and units of variables).

As an example, a method can include variables->get parent datasets->subtype of datasets->get variables details (e.g., main family, family, subtype and units, under related dataset(s)) (see, e.g., the table 680 of FIG. 6). As an example, if a given entity is datasets then "get subtype" of it and "get its variables details" can get main family, family, subtype and units, under that dataset(s).

As to the search block 722, it can search for possible matches in a training database referred to as the case base 724, which can include available combinations that are created and fed to the system based on experience learning.

As explained, if one or more matches are found in the case base 724, the method 700 can continue to the hypothesis block 730 else, if a match is not found, then the "problem" can be a new experience. In such an example, the method 700-1 can work to revise an existing case or by adding new solution (e.g., a new case). In either instance, the method 700-1 can update training data which can be utilized for a future "problem". As explained, the case base 724 can be a repository for training data, learned solutions, etc.

As to the hypothesis block 730, it follows the "Yes" branch of the decision block 726. A hypothesis can be formulated as follows: check match of related data of each variable and dataset against the case of the case base 724; collect positive and negative matches with its data types while matching with the case of the case base 724 for each item; collect the matched data types in an array; calculate a mean of each distinct data type present in the array; and get data type of the given entity based on highest mean value of data type.

As to the revision and adoption blocks 746 and 750, a hypothesis solution can be used to revise the existing case of the case base 724, whether the solution is right or wrong. If the solution is wrong or not as per the user's intention then it can consider it to be a new solution and revise accordingly. Once a new solution gets revised, it can be tested and can be adopted for storage in the case base 724 for future reference. In the example of FIG. 7, the case base 724 can be a collection of data type cases, for example, based on main family, family, subtype and unit of variable which are mapped with subtype of related datasets (see, e.g., the table 680 of FIG. 6).

As to the inverse method 700-2, it can leverage case information in the case base 724 for the purposes of an inverse transfer. In such an approach, the blocks of the method 700-2 can be arranged as in the forward method 700-1 where flow is from the application 707 to the application 702.

In FIG. 7, the method 700-1 may be for a transfer from the TECHLOG framework, as the application 702, and the method 700-2 may be for a transfer to the TECHLOG framework, as the application 702. For example, consider the ID block 704 as providing for identification for the entity or data type (DT) block 714. In such an example, the ID block 704 may identify, for example, well domain data or identify a TECHLOG framework entity (e.g., inverse logic to find TECHLOG identifiable entity type(s)).

As explained, field equipment data can include data from one or more types of field equipment. As such, the methods 700-1 and 700-2 may be utilized for various types of scenarios, which can include field equipment scenarios for field equipment related to energy production, energy storage, etc. In different field operational domains, particular language may be utilized to describe data. Where such domains overlap as being related to energy, opportunities exist for sharing of data between domains. Such sharing can involve utilization of different frameworks. For example, consider accessing hydrocarbon production data generated by an oil and gas industry framework by a wind turbine industry framework or a solar industry framework. In such an example, field equipment data pertaining to energy production may be transferred for one or more purposes such as, for example, to optimize energy production strategies across multiple domains.

FIG. 8 shows example GUIs 812, 814, 816 and 818 where the GUIs 812 and 814 show a variable and its main parameters and the GUIs 816 and 818 show a dataset and its type. As explained, a method can search an existing training dataset/collection of cases (e.g., a case base) in an effort to match dataset properties, dataset type. A method can then retrieve the variables of that dataset where, for each variable, it can match main family, family, subtype and unit properties with existing collection of matched datasets. Thus, in the example GUIs 812 and 814, main family is "completion" which does not exist in existing cases, but family, subtype and unit is matching with "caliper" of existing collection cases. Note, here that a match is not based on name, but it is decided based on four properties: main family, family, subtype and units (see, e.g., the table 680 of FIG. 6). Hence, a system can consider this new item as logcurve as its maximum weightage will receive to logcurve. To decide data type, based on maximum matched attribute, weightage can be given to each attribute.

As explained, a proposed workflow can consider resultant data type based on weightage of each matched attribute which can be considered based on existing collection cases. As in the given example, maximum weightage received to logcurve, caliper with family tunnel length will be considered as the logcurve data type.

As explained, an E&P domain or other domain can generate a large amount of data each day field operations, production, etc., persist, where information extracted from such data can be relied upon for making various decisions. As an example, a system can include a data quality engine and optionally a data identification engine. For example, consider a system that can receive data, identify data and assess quality of identified data. Such a system can improve data quality for purposes of making one or more types of decisions.

As an example, a system can include components that allow for seamless synchronization of data from one or more sources such that synchronized data can be utilized by one or more different frameworks.

Figure 9:
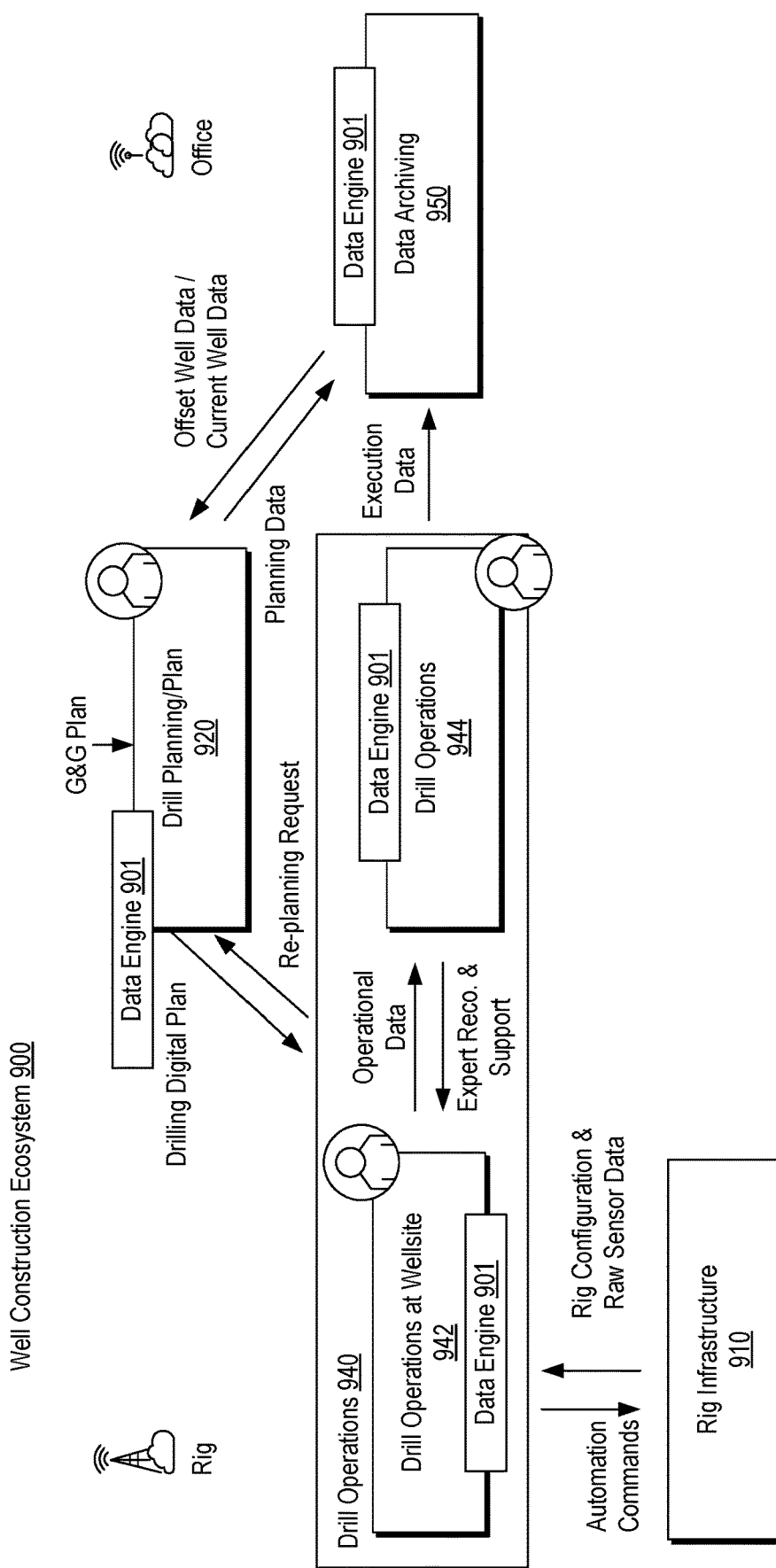
FIG. 9 illustrates an example of a well construction ecosystem.

FIG. 9 shows an example of a system 900 that can be a well construction ecosystem. As shown, the system 900 can include one or more instances of a data engine 901 and can include a rig infrastructure 910 and a drill plan component 920 that can generation or otherwise transmit information associated with a plan to be executed utilizing the rig infrastructure 910, for example, via a drilling operations layer 940, which includes a wellsite component 942 and an offsite component 944. As shown, data acquired and/or generated by the drilling operations layer 940 can be transmitted to a data archiving component 950, which may be utilized, for example, for purposes of planning one or more operations (e.g., per the drilling plan component 920).

In the example of FIG. 9, the data engine 901 is shown as being implemented with respect to the drill plan component 920, the wellsite component 942 and/or the offsite component 944.

As an example, the data engine 901 can interact with one or more of the components in the system 900. As shown, the data engine 901 can be utilized in conjunction with the drill plan component 920. As shown, the data archiving component 950 can be utilized in conjunction with the data engine 901. As an example, the data archiving component 950 can include drilling data for one or more offset wells and/or one or more current wells pertaining to specifications for and/or operations of one or more types of bits, one or more types of mud motors, etc. As an example, data may be utilized in combination with a framework or frameworks.

As shown in FIG. 9, various components of the drilling operations layer 940 may utilize the data engine 901 and/or a drilling digital plan as output by the drill plan component 920. During drilling, execution data can be acquired, which may be processed by the data engine 901. Such processed data may be archived in the data archiving component 950, which may be archived during one or more drill operations and may be available by the drill plan component 920, for example, for re-planning, etc. While the example of FIG. 9 pertains to an E&P domain, similar ecosystems exist for other domains where the data engine 901 can be utilized.

Figure 10:
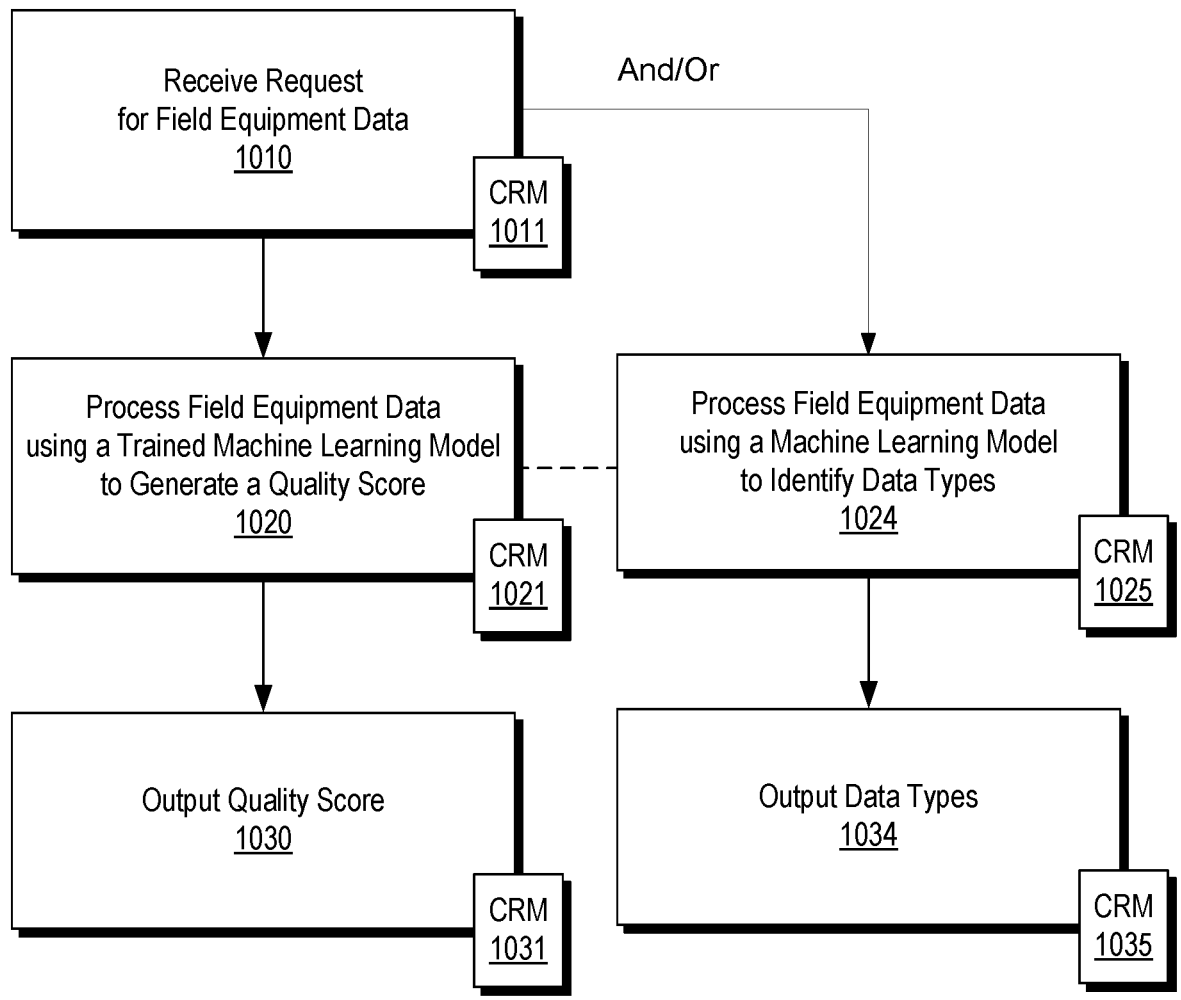
FIG. 10 illustrates an example of a method.

FIG. 10 shows an example of a method 1000 that includes a reception block 1010 for receiving a request for field equipment data; a process block 1020 for, responsive to the request, automatically processing the field equipment data using a trained machine learning model to generate a quality score for the field equipment data; and an output block 1030 for outputting the quality score. The method 1000 can also include a process block 1024 for, responsive to the request, automatically processing the field equipment data using a machine learning model to identify data types in the field equipment data and an output block 1034 for outputting the data types. As shown, the method 1000 may proceed from the reception block 1010 to the process block 1020 and/or the process block 1024; noting that the process block 1024 may occur prior to the process block 1020 or that the process blocks 1020 and 1024 may be operatively coupled. For example, consider identification of data types prior to quality assessment of data and/or identification of data types simultaneously with quality assessment of data. As to the latter, a ML model or ML models may provide for identification and quality assessment, for example, via one or more of classification and prediction.

In the example of FIG. 10, the method 1000 is shown along with various computer-readable storage media (CRM) blocks 1011, 1021, 1025, 1031 and 1035, which can include processor-executable instructions that can be executed to perform one or more actions. Such blocks may be provided as a number of storage media and/or as a single storage medium.

Figure 11:
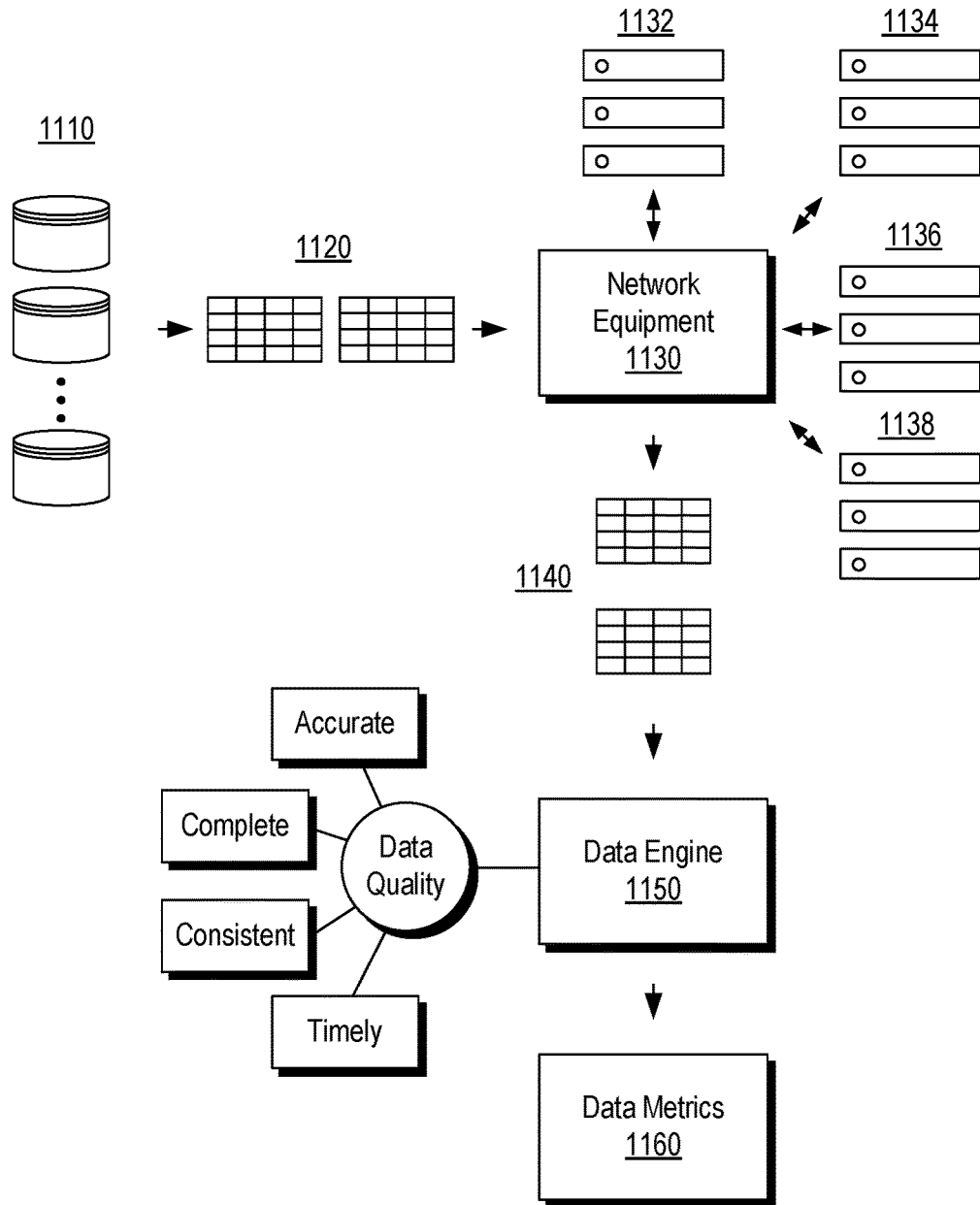
FIG. 11 illustrates an example of a system.

FIG. 11 shows an example of a system 1100 that shows data sources 1110 and mini-batch data 1120 that can flow from one of the data sources as an input source into a real-time distributed computation framework that includes network equipment 1130 operatively coupled to computation/memory equipment 1132, 1134, 1136 and 1138, etc. As shown, data 1140 can flow to a data engine 1150, which can include data quality score computation features and features that can aggregate data metrics in real-time for the chunks (batches) of data 1140. As an example, such data metrics may be consumed by one or more machine and/or human layers such as, for example, one or more presentation layers (e.g., user customizable presentation layer, etc.).

As an example, an input data source may be a static file or data stream, where data formats supported may include, for example, one or more of JSON, CSV, etc.

As an example, a distributed real-time computational framework may include one or more of cloud and on-premises distributed framework components. As an example, a framework can include one or more features of the APACHE SPARK framework, which is capable of handling and distributing computation across multiple nodes and for producing a response in real-time (e.g., near real-time that can be with a latency that can be less than an interval of a data rate or acquisition rate of one or more pieces of equipment, etc., which may be in the field, in a laboratory, etc.).

As an example, a system can include a data quality score computation engine, which may be or may be part of the data engine 1150 of the system 1100 of FIG. 11. For example, consider a microservice that can take mini-batch data of defects and/or opportunities and generate one or more types of data metrics (e.g., a six-sigma computation score, etc.).

As an example, a system can include one or more consumption, distribution, presentation, etc., types of layers. For example, consider a controller that is operatively coupled to one or more sensors, one or more pieces of equipment, one or more communication circuits, etc. In such an example, a control action may be taken in response to a data metric being above, below or at a certain value (e.g., a threshold, etc.). For example, consider taking a sensor off-line where the sensor is generating data of poor quality and/or, for example, implementing a digital twin (e.g., an avatar, etc.) that can generate substitute data (e.g., via one or more AI, via one or more machine models, etc.). As an example, where data include measurements of code and/or other types security data (e.g., via a trusted platform module, etc.), one or more data quality issues may indicate a possible system breach, which may trigger one or more actions (e.g., shutting down equipment, moving to a backup system, etc.).

As an example, as to a user customizable hierarchical presentation, consider, for example, a presentation layer that one or more end users can customize from a default view to drill down a hierarchy, arrange elements of the view in different combination(s), etc. In such an example, a view may be associated with one or more actionable insights.

As explained, mini-batch data can flow from an input source into a real-time distributed computation framework that can filter the data for defects where filtered data can be fed into a data assessment engine (e.g., a quality score computation engine) that can include features to aggregate data metrics in real-time for the chunks (batches) of data. As explained, metrics may be consumed by one or more types of machines, humans, etc. (e.g., consider a user customizable hierarchical presentation layer).

As an example, a type of data metric can be, for example, a completeness data metric, which, for example, may be computed on a real-time data stream of one or more types of data such as, for example, production data.

As explained, various types of data related issues can arise in a system that can include frameworks that request access to such data and may generate data (e.g., processed data, transformed data, etc.). In various instances, data can be streaming data in real-time from field equipment, which may be via networks (e.g., land, air, satellite, etc.).

As an example, a system can include one or more machine learning models. For example, one or more data engines can include one or more ML models.

As explained, a data engine can assess data quality, which can be useful for performing further analysis and/or decision making. As an example, a ML model-based approach can be data driven. For example, deep neural networks (DNNs) can include multiple layers (e.g., deep layers) that can be trained using data in a supervised, semi-supervised or unsupervised manner. As an example, a trained ML model can be a classifier and/or a predictor to facilitate enterprise data management (EDM). As an example of an unsupervised ML process, consider utilization of principal component analysis (PCA) for one or more purposes such as exploratory data analysis, dimensionality reduction, information compression, data de-noising, etc. A PCA approach may provide for both identification and quality assessment. As an example, a PCA approach may be combined with one or more other techniques. For example, consider PCA and clustering where PCA may be applied one or more times to data. In such an example, identification and/or quality assessment may occur in a PCA space, a cluster space, or other space.

As an example, an EDM portal can be a multidisciplinary application contributing to a source data platform that can unite and provide different workflow integration and ingestion at the EDM portal. Such an architecture can utilize one or more of various technologies to provide metrics such as quality scores or status indicators. Such metrics can be utilized for one or more of data insights, log viewing, GIS plotting, optical character recognition (OCR), natural language processing (NLP), automation, etc.

A data engine can be part of an analysis stream that benefits from quality of data as assessed by such an engine. Data quality can be synonymous with information quality as poor data quality results in inaccurate information that can compromise machine and/or human decision making.

As an example, a data engine can be operatively coupled to one or more interfaces, which can include machine interfaces, visual interfaces, touch interfaces, voice interfaces, etc. For example, consider a data engine that can receive a command via an interface and respond to the command by taking one or more actions, which may involve assessing data and/or outputting data via an interface.

As an example, a data engine can utilize one or more types of services. For example, consider a PYTHON service that can facilitate ML model integration.

As an example, a ML model can be trained using a reward-based learning technique. For example, consider an upvote/downvote type of reward-based learning technique. In such an example, an upvote can correspond to an acceptable level of data quality while a downvote can correspond to an unacceptable level of quality. In such an example, a reward can be increased for appropriate upvotes, downvotes, etc.

As an example, a learning technique may utilize a combination of supervised and unsupervised learning that can make a trained ML model more robust as to handling various file types. As an example, one or more trained ML models can be suitable for implementation in real-time workflows where streaming data from one or more sources can be assessed to output metrics (e.g., quality score, statues, etc.).

As an example, a data engine can operate in a schema agnostic approach. In a particular example implementation, a data engine processed a 38 feature wellbore entity file. In that example, the data engine can handle that file and optionally different types of files. For example, consider a data engine with a ML model trained in an unsupervised manner that can perform feature clustering such that features can be uncovered and classified. Such an approach can be integrated into a DNN model that supports various data types, data formats, etc., which may not be known a priori. In such an example, data can also be assessed for quality, where such an assessment can include automated quality score generation and quality status (e.g., acceptable or unacceptable) of the ingested data, optionally without utilization of explicit predefined rules. For example, a trained ML model can learn aspects of what are acceptable data and unacceptable data in a non-rule-based manner such that assessments can be performed by a trained ML model, optionally without human intervention.

As explained, a data engine may include one or more rule-free components that can generate one or more quality metrics. As to an example of a rule-based approach consider the DROOLS Business Rules Management System (BRMS) that includes a core Business Rules Engine (BRE) that can run on a JAVA virtual machine (JVM). In such a rule-based system, rules are defined a priori. In contrast, a trained ML model may operate without human, predefined rules.

As an example, a data engine, which may be part of an EDM portal, can ingest various types of data files (e.g., CSV, LAS, DLIS, raster, document, logs etc.) where the data engine can output quality metrics. In such an example, the data engine may operate in a batch mode and/or in a streaming mode.

As explained, a trained ML model can be a classifier that can classify data. For example, consider a classification score as to acceptable or unacceptable status, which may be accompanied by a regression value such as a quality score. In such an example, training can involve reward-based feedback for a DNN model, for example, to retrain the DNN model in dynamic manner, for example, if a given classification does not match user expectation.

As explained, a data engine may implement clustering or grouping, which can be a problem of recognition of similarities. As an example, a combined regression (prediction) and classification ML model may be constructed. For example, consider an architecture with an input layer, hidden layers and multiple output layers. In such an example, regression and classification output layers can be connected to a common last hidden layer of the model. Given two output layers, a model may be trained using two loss functions, for example, consider a mean squared error (MSE) loss for the regression output layer and a sparse categorical cross-entropy for the classification output layer. An example of a combined ML model for regression (prediction) and classification can be for determining the age of an abalone from physical details, where predicting the number of rings of the abalone is a proxy for the age of the abalone (e.g., age can be predicted as both a numerical value (in years) or a class label (ordinal year as a class)). In various examples, a trained ML model may output probability information. For example, consider a probability that input belongs to a particular class.

As to types of ML models, consider one or more of a support vector machine (SVM) model, a k-nearest neighbors (KNN) model, an ensemble classifier model, a neural network (NN) model, etc. As an example, a machine learning model can be a deep learning model (e.g., deep Boltzmann machine, deep belief network, convolutional neural network (CNN), stacked auto-encoder, etc.), an ensemble model (e.g., random forest, gradient boosting machine, bootstrapped aggregation, AdaBoost, stacked generalization, gradient boosted regression tree, etc.), a neural network model (e.g., radial basis function network, perceptron, backpropagation, Hopfield network, etc.), a regularization model (e.g., ridge regression, least absolute shrinkage and selection operator, elastic net, least angle regression), a rule system model (e.g., cubist, one rule, zero rule, repeated incremental pruning to produce error reduction), a regression model (e.g., linear regression, ordinary least squares regression, stepwise regression, multivariate adaptive regression splines, locally estimated scatterplot smoothing, logistic regression, etc.), a Bayesian model (e.g., naïve Bayes, average on-dependence estimators, Bayesian belief network, Gaussian naïve Bayes, multinomial naïve Bayes, Bayesian network), a decision tree model (e.g., classification and regression tree, iterative dichotomiser 3, C4.5, C5.0, chi-squared automatic interaction detection, decision stump, conditional decision tree, M5), a dimensionality reduction model (e.g., principal component analysis (PCA), partial least squares regression, Sammon mapping, multidimensional scaling, projection pursuit, principal component regression, partial least squares discriminant analysis, mixture discriminant analysis, quadratic discriminant analysis, regularized discriminant analysis, flexible discriminant analysis, linear discriminant analysis, etc.), an instance model (e.g., k-nearest neighbor, learning vector quantization, self-organizing map, locally weighted learning, etc.), a clustering model (e.g., k-means, k-medians, expectation maximization, hierarchical clustering, etc.), etc.

As an example, a ML model may be built using a computational framework with a library, a toolbox, etc., such as, for example, those of the MATLAB framework (MathWorks, Inc., Natick, Massachusetts). The MATLAB framework includes a toolbox that provides supervised and unsupervised machine learning algorithms, including support vector machines (SVMs), boosted and bagged decision trees, k-nearest neighbor (KNN), k-means, k-medoids, hierarchical clustering, Gaussian mixture models, and hidden Markov models. Another MATLAB framework toolbox is the Deep Learning Toolbox (DLT), which provides a framework for designing and implementing deep neural networks with algorithms, pretrained models, and apps. The DLT provides convolutional neural networks (ConvNets, CNNs) and long short-term memory (LSTM) networks to perform classification and regression on image, time-series, and text data. The DLT includes features to build network architectures such as generative adversarial networks (GANs) and Siamese networks using custom training loops, shared weights, and automatic differentiation. The DLT provides for model exchange various other frameworks.

As an example, the TENSORFLOW framework (Google LLC, Mountain View, CA) may be implemented, which is an open source software library for dataflow programming that includes a symbolic math library, which can be implemented for machine learning applications that can include neural networks. As an example, the CAFFE framework may be implemented, which is a DL framework developed by Berkeley AI Research (BAIR) (University of California, Berkeley, California). As another example, consider the SCIKIT platform (e.g., scikit-learn), which utilizes the PYTHON programming language. As an example, a framework such as the APOLLO AI framework may be utilized (APOLLO.AI GmbH, Germany). As an example, a framework such as the PYTORCH framework may be utilized (Facebook AI Research Lab (FAIR), Facebook, Inc., Menlo Park, California).

As an example, a training method can include various actions that can operate on a dataset to train a ML model. As an example, a dataset can be split into training data and test data where test data can provide for evaluation. A method can include cross-validation of parameters and best parameters, which can be provided for model training.

The TENSORFLOW framework can run on multiple CPUs and GPUs (with optional CUDA (NVIDIA Corp., Santa Clara, California) and SYCL (The Khronos Group Inc., Beaverton, Oregon) extensions for general-purpose computing on graphics processing units (GPUs)). TENSORFLOW is available on 64-bit LINUX, MACOS (Apple Inc., Cupertino, California), WINDOWS (Microsoft Corp., Redmond, Washington), and mobile computing platforms including ANDROID (Google LLC, Mountain View, California) and IOS (Apple Inc.) operating system based platforms.

TENSORFLOW computations can be expressed as stateful dataflow graphs; noting that the name TENSORFLOW derives from the operations that such neural networks perform on multidimensional data arrays. Such arrays can be referred to as "tensors".

As an example, a data engine may utilize an ensemble approach where multiple different ML models are employed. For example, consider an ensemble of twelve ML models trained using supervised learning with a combination of algorithms such as, for example, tree classifier, binary classification, a KERAS library algorithm, etc. In such an example, a process can provide for understanding data patterns (e.g., via data treatment, feature engineering, heat-map plotting and data visualization, validation, and testing, etc.). For example, consider processing CSV data such that the data can be labeled for a wellbore entity and utilized to develop a classification model that can output indicators of quality status such as acceptable or unacceptable for the ingested data.

As an example, an implementation can expose a ML model using a PYTHON microservice built on a FLASK-RESTful framework and exposed to an APIGEE developer portal. The FLASK framework is a micro web framework written in PYTHON and APIGEE is a platform for developing and managing APIs (Google LLC). Specifically, FLASK-RESTful is an extension for the FLASK framework that adds support for quickly building REST APIs.

As an example, a ML model can be in a PYTHON pkl/joblib format within a project space and/or decoupled from a project space and kept in a bucket such that a data scientist can perform separate model building activity in parallel and during ML operational processes such that a ML model can be replaced with a revised version.

Figure 12:
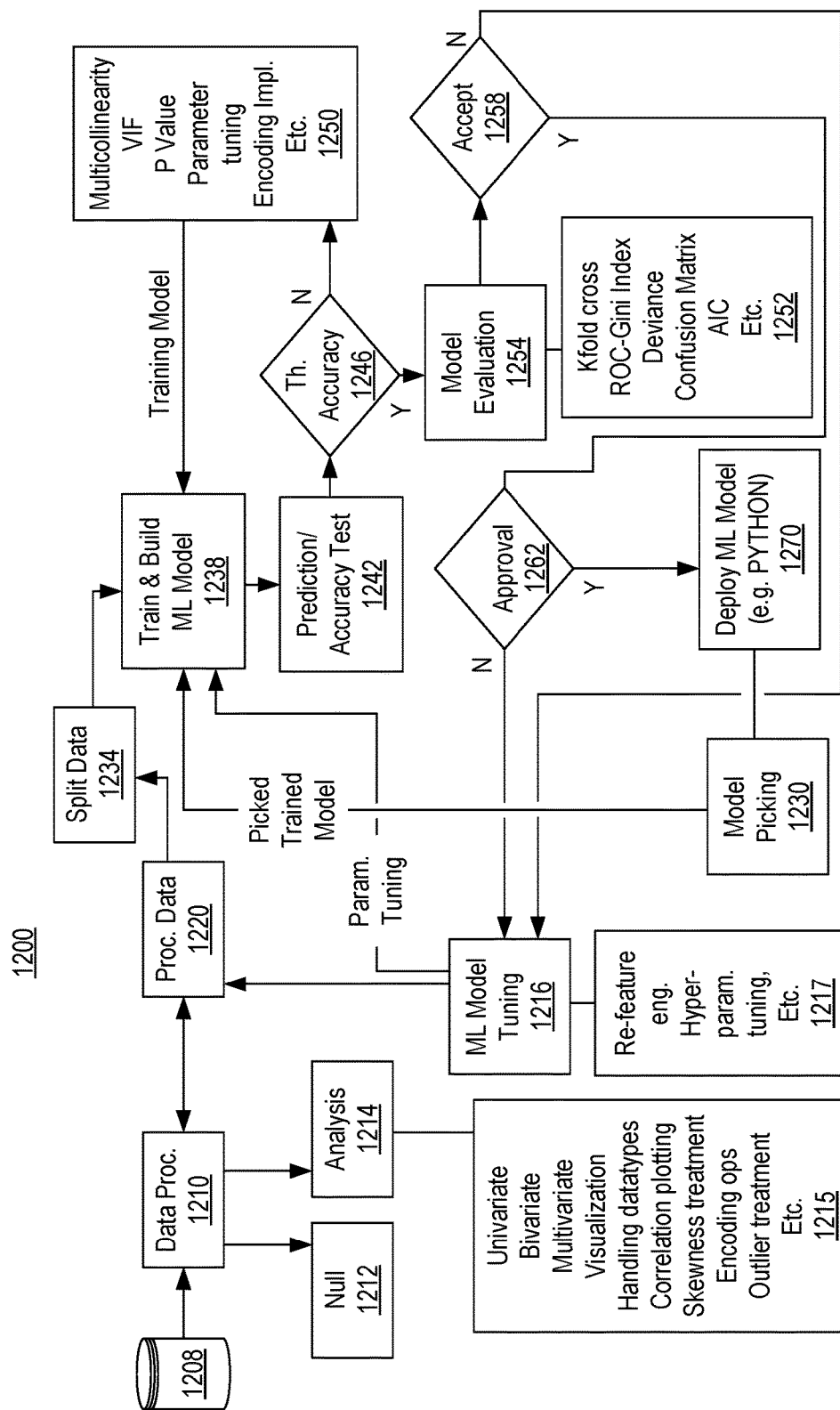
FIG. 12 illustrates an example of a system.

FIG. 12 shows an example of a system 1200 that can be utilized for ML model generation and deployment. As shown, the system 1200 includes a data source 1208 where a data processing block 1210 can process data from the data source 1208 to generate null results 1212 and/or analysis results 1212, which can include, per a block 1215, analysis results utilizing one or more of univariate, bivariate, multivariate, visualization, handling data types, correlation plotting, skewness treatment, encoding operations, outlier treatment, etc., techniques.

As shown, a ML model tuning block 1216 can provide for various operations per a block 1217, which can include re-feature engineering, hyperparameter tuning, etc. The ML model tuning block 1216 can provide output to the processed data block 1220, which can include processed data from data processing of the data processing block 1210. In such an example, a split data block 1234 can provide for splitting data for output to a train and build ML model block 1238. Further, a model picking block 1230 can output a picked trained model and the ML model tuning block 1216 can provide for parameter tuning for the train and build ML model block 1238. In such an example, output of the train and build ML model block 1238 can be subjected to prediction and/or accuracy testing per a test block 1242.

As shown in the example of FIG. 12, a decision block 1246 can decide whether accuracy determined by the test block 1242 meets a threshold. Where the decision block 1246 decides that the threshold for accuracy is not met ("N" branch), the system 1200 can proceed to a block 1250 for one or more of various operations that aim to increase accuracy of the ML model. For example, consider techniques such as multicollinearity, variance inflation factor (VIF), p value, parameter tuning, encoding implementation, etc. As to VIF, it can be a measure of the amount of multicollinearity in a set of multiple regression variables. The VIF for a regression model variable can be equal to a ratio of overall model variance to variance of a model that includes that single independent variable. Such a ratio can be calculated for each independent variable. A high VIF can indicate that an associated independent variable is highly collinear with the other variables in the model.

In the example of FIG. 12, a loop can exist with the train and build ML model block 1238 until a test accuracy per the test block 1242 reaches a threshold level per the decision block 1246. In such a loop, one or more of the techniques of the block 1250 can be implemented in an effort to increase accuracy. As shown, once the decision block 1246 indicates that test accuracy is acceptable, the system 1200 can progress to a model evaluation block 1254 (see "Y" branch of the decision block 1246).

As shown, the model evaluation block 1254 can implement one or more of various techniques as available in a block 1252. For example, consider one or more of k-fold cross validation, receiver operating characteristic (ROC) where the Gini index is defined as twice the area between the ROC-curve and a diagonal (ROC-Gini index), deviance, confusion matrix, Akaike information criterion (e.g., AIC as an estimator of prediction error and thereby relative quality of statistical models for a given set of data), etc. In the system 1200, a decision block 1258 can accept or not accept an evaluation of the evaluation block 1254. As shown, if the decision block 1258 decides to not accept the evaluation (see "N" branch), the system 1200 can return to the ML model tuning block 1216; whereas, if the decision block 1258 decides to accept the evaluation, the system 1200 can proceed to another decision block 1262, which can render a final decision (see "Y" branch) as to whether or not the trained and built ML model, as tested and evaluated, can be deployed per a deployment block 1270. As shown, if the decision block 1262 does not decide to approve (see "N" branch), then the system 1200 can return to the ML model tuning block 1216.

Figure 13:
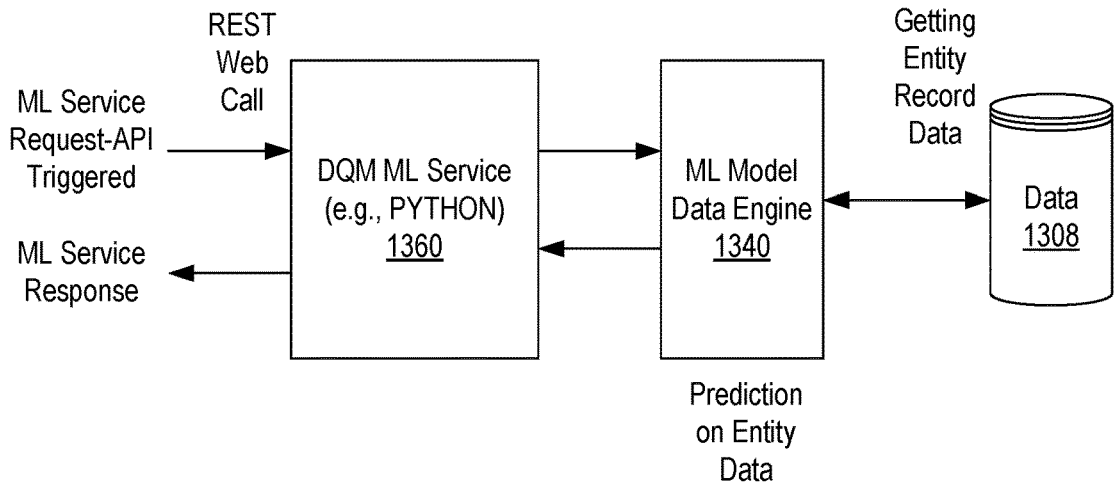
FIG. 13 illustrates an example of a system and example of a table of output.

The system 1200 of FIG. 12 can provide for implementation of a ML model development workflow, which may be suitable for development and deployment of one or more types of ML models. As explained, such a system can include a data-pre-processing pipeline, feature engineering, training and validating model and various components for ML model development FIG. 13 shows an example of a system 1300 that includes a data source 1308, a ML model data engine 1340 and a data quality management (DQM) ML service 1360. As shown, the ML model data engine 1340 can get or receive entity record data and make a prediction (e.g., and/or classification) as to the entity data where the DQM ML service 1360 can respond to REST web calls such as via one or more APIs. The system 1300 can provide for service flow of a request via a ML model data engine and a data source (e.g., a data lake, etc.).

FIG. 13 also shows an example table 1380 that can be output that includes data quality metrics per a ML model-based data engine as may be implemented using the APIGEE developer portal. In the example of FIG. 13, a status is shown as "good", which can be an acceptable data quality status indicator. Additionally, as shown in the example table 1380, a model name can be received such as "decision tree". As mentioned, a data engine may employ more than one ML model, for example, in an ensemble manner. In such an example, various ML models may generate output where output of one of the ML models can be ranked or otherwise selected for output. As an example, a call may be made to a data engine for output from a specific ML model and/or for output from more than one ML model.

As shown in the example table 1380, a query can be an API call (e.g., RESTful, etc.) that can carry a parameter such as an entity identification parameter (e.g., entity ID or entityid). As shown, that parameter can be utilized by the data engine 1340 to access an entity record per the entity ID.

FIG. 14 shows example tables 1410 and 1420 for various example models along with descriptions. As shown, models can include logistic regression, random forest, decision tree, support vector machine (SVM), XgBoost and Keras DNN with k-fold cross validation. In the example tables 1410 and 1420, indicators as to accuracy are shown for the models, include various variations of some of the models. As explained, an ensemble approach may be utilized.

Figure 15:
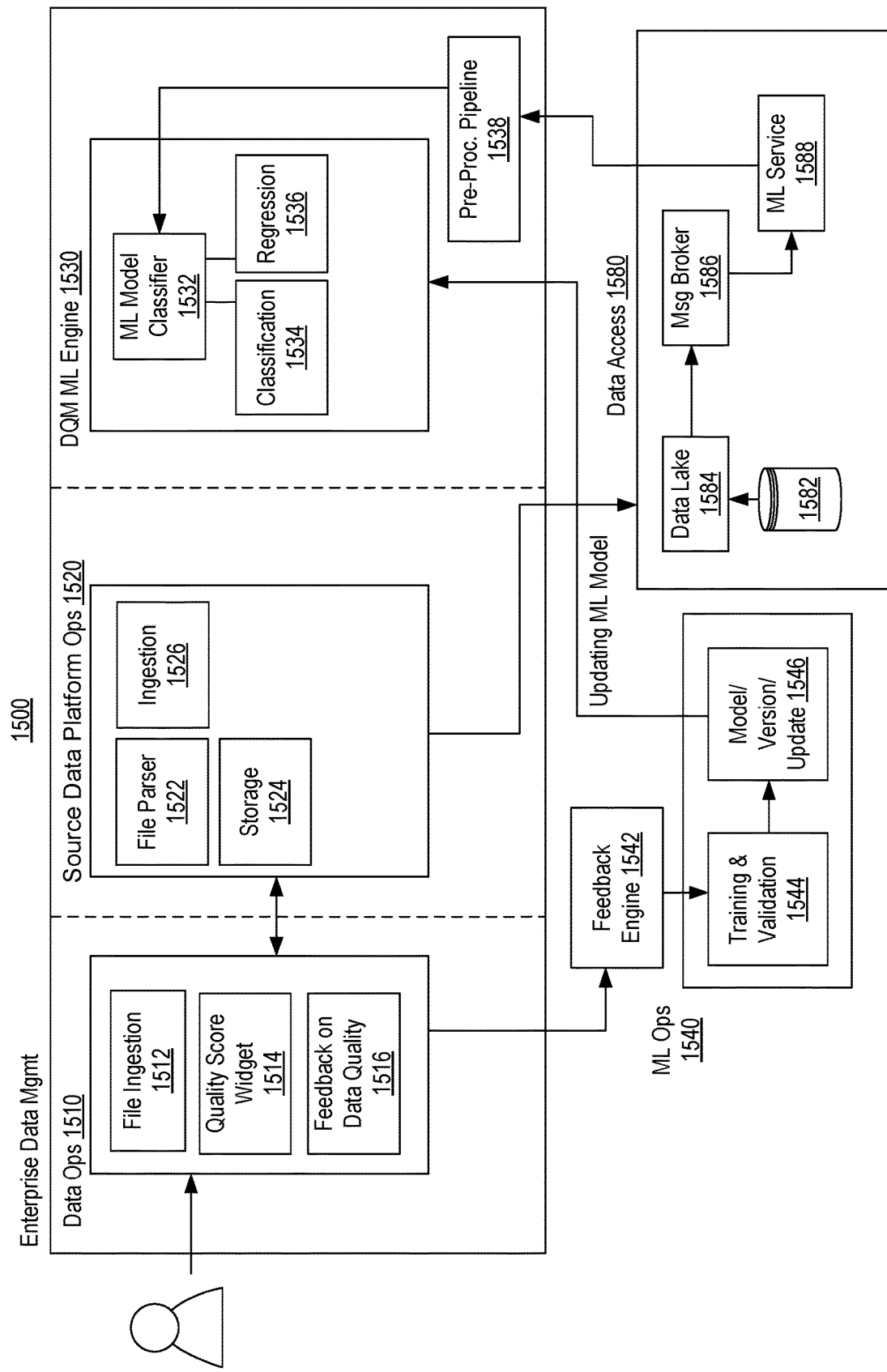
FIG. 15 illustrates an example of a system.

FIG. 15 shows an example of a system 1500 that can provide for enterprise data management (EDM). In the example of FIG. 15, the system 1500 can include data operations components 1510, source data platform components 1520, DQM ML/DL engine components 1530, ML operations components 1540 and various data access components 1580. As shown, the data operations components 1510 can include a file ingestion component 1512, a quality score widget component 1514 and a feedback on data quality component 1516; the source data platform components 1520 can include a file parser component 1522, a storage component 1524 and an ingestion component 1526; the DQM ML/DL engine components 1530 can include a ML model classifier component 1532 that can be linked to one or more classifier components 1534 and/or one or more regression components 1536 where a pre-processing pipeline component 1538 can provide data (e.g., raw and/or processed) to the ML model classifier component 1532; the ML operations components 1540 can include a feedback engine component 1542, a training and validation component 1544 and a model/version update component 1544; and the various data access components 1580 can include one or more data sources 1582 operatively coupled to a data lake component 1584, operatively coupled to a message broker component 1586, operatively coupled to a ML model service component 1588.

In the example of FIG. 15, the system can provide for feedback per the components 1516 and 1542 for purposes of updating a ML model, for example, via one or more of the DQM ML/DL engine components 1530. As explained, a service such as a ML model service per the ML model service component 1588 can be provided that can access, retrieve, etc., data from one or more data sources such as, for example, the one or more data sources 1582. In the example of FIG. 15, a user may interact with one or more of the data operations components 1510, which can provide for various interactions as indicated by arrows in FIG. 15. For example, consider the quality score widget component 1514 as being actuatable to cause the system 1500 to generate a quality score for a data in a file ingested by the file ingestion component 1512. In such an example, a user may have an opportunity to provide feedback on one or more quality scores (e.g., and/or one or more other metrics), which may provide for improvements in ML model training, ML model selection, ML model ensemble creation, etc.

In the example of FIG. 15, the quality score widget component 1514 can be operatively coupled to one or more of the DQM ML/DL engine components 1530 such that one or more quality metrics may be received by the quality score widget component 1514. As an example, output from a widget may include information as in one or more of the tables 1410 and 1420 of FIG. 14.

As shown in the example of FIG. 15, the source data platform operations components 1520 can be interactive with one or more of the data operations components 1510, for example, to parse a file or files per the file parser component 1522, to ingest data from a parsed file or files per the ingestion component 1526 and/or to store data per the storage component 1524, which may interact with one or more of the data access components 1580.

As explained, ML model building operations can include building one or more ML models (e.g., binomial logit regression, decision tree, random forest, naive Bayes, SVM, neural network, etc.) and converted such ML model or models into a persistent form to make it available for data classification and/or prediction. As explained, a method can include feature engineering of a given data distribution, performing visual analytics and correlations to understand a data pattern and gain insight, training and testing data splits, validation of the model using various techniques such as, for example, k-fold cross, Gini index, etc.

As to a data pre-processing component, as explained, one or more ML models may be utilized to automatically classify data, uncover data type, etc. As an example, pre-processing can include analysis of the outliers, null treatment, standardization, normalization of data, etc. As an example, a pre-processing pipeline can include features to process raw and/or other data into a form or forms suitable for input to one or more ML models, whether for training, classification, prediction, etc. As explained, a data engine may utilize multiple ML models where each ML model may have associated specifications as to input. In such an example, pre-processing may process data for a particular ML model or particular ML models (e.g., of an ensemble, etc.).

As to data labelling, such labeling may be performed using automated, semi-automated and/or manual techniques. As explained, a system can include various feedback mechanisms that may provide for labeling (e.g., for training, re-training, etc.). As an example, an approach may utilize the aforementioned DROOLS approach to labeling via a rule-based engine (e.g., consider completeness and validity rules, etc.).

As explained, various features may operate in a PYTHON environment, which may utilize the FLASK framework, the DJANGO REST framework, etc. As an example, a data engine may operate to generate binary output such as 0 or 1 as numerical values that can be appropriately mapped to good or bad status (e.g., acceptable or unacceptable) internally in service logic and output.

As explained, a DQM ML engine can build a DNN, ANN and/or other ML model using one or more of various algorithms (e.g., SVM, logit, tree, etc.). As explained, a labeled dataset may be provided by an organization to facilitate building a base model where the dataset can be labeled as good or acceptable as being 1 and bad or unacceptable as being 0, which can be classes for a classification task. In such an example, data can be pre-analyzed using domain expertise and tagged with creating nomenclature such that the data are useful for implementing in a supervised technique. As an example, data and/or ML model outputs may be compared to output from a rule-based engine (e.g., DROOLS) to assess pattern(s) of classification tagged values.

As mentioned, one or more types of data pre-processing can be implemented. For example, consider one or more of data type discovery and/or one or more EDA analyses (e.g., univariate and multivariate analysis, correlation plotting, skewness treatment, encoding operations, outlier treatment, etc.), which may help make data suitable for model development and/or one or more other tasks.

As to feature engineering, consider, as an example, using a heatmap correlation technique to check which features are contributing to prediction/classification and generating correlations for the same.

As to data splitting, consider implementation of one or more data splitting ratios (e.g., 60:20:20) for training, testing and validation tasks.

As to training and building a ML model, training can be perform on appropriate split data where one or more of various technique can be utilized to fine tune performance, for example, if a given threshold is not met. As mentioned tuning techniques can include VIF, p value, etc.

As to ML model evaluation, consider one or more of the following techniques k-fold cross, ROC-Gini index, deviance analysis, confusion matrix, AIC, etc., which may be utilized to validate ML model accuracy for a validate dataset (e.g., per a split ratio, etc.).

As to hyperparameter tuning, where a desired level accuracy and precision is not met, parameter tuning may be performed in an effort to achieved desired results.

As to a data-processing pipeline, once an event is received by a ML model service, pre-processing data pipeline logic can be implement, for example, such that data are treated and processed before feeding to a ML model or ML models.

As shown in the example system 1500 of FIG. 15, after the data are ingested and a record is available, the message broker component 1586 or a notification service of the source data platform components 1520 can publish an event as a DQM topic. In such an example, the system 1500 can continuously listen to that topic and feed data to the ML service component 1588 which in turn can activate one or more components of the DQM ML engine components 1530, which can further process data to generate quality score status of the data, which may be pushed to a publishing queue. As explained, the DQM ML engine components 1530 can include a Keras DNN model integrated with PYTHON ML microservices, which can be event-driven.

As mentioned, a reward-based approach may be utilized. For example, consider an approach where once a score and a status are generated for given ingested data and visible on the EDM system 1500, if one or more users disagree with the score and/or the status, a mechanism for feedback can exist such as via the feedback engine component 1542. In such an example, an upvote/downvote reward event may be generated, which in turn can trigger re-training of a ML model on a real-time basis where a re-trained model can be tagged with new version for the ML operations components 1540 to push to one or more appropriate environments (e.g., the DQM ML engine components 1530, etc.).

As explained, a rule-based approach may be implemented; however, such an approach can experience a performance hit when features and complexity increase. Further, users may write different rules for various parameters, which can raise user to user discrepancies. By implementing one or more ML models, a rules-free approach can be implemented, optionally in combination with a rule-based approach. As explained, a rules-free approach can provide for automation and less demand or no demand for human intervention along with an ability to provide quality scores in real-time.

As an example, a system such as the system 1500 can expose one or more APIs, which may be suitable for use in an environment such as the DELFI environment. For example, consider a framework within the DELFI environment that can access an exposed API for purposes of accessing data with generated quality metrics, which may be real-time data, historic data, etc. As explained, a trained ML model can provide for predictive filtering of good and bad data (e.g., acceptable and unacceptable) prior to utilization of data in a workflow (e.g., via a framework, etc.). As an example, a system can provide automated generation of a quality score with one or more data insights (e.g., for an attribute or attributes) that may contribute to quality score generation. As an example, quality metrics can be analyzed, which may provide for making predictions, providing guidance, etc. For example, consider a predictive approach by which a user can take preventive decision on data analysis.

As an example, the system 1500 can provide for improved real-time data insight using a ML model-based data engine, can reduce non-productive time (NPT) related to the data analysis, can improve on time consumption for data analysis via data quality process automation using one or more ML models, can automate quality score generation with low to no human intervention as to writing rules on a given data source, can provide a feedback mechanism to train/re-train a ML model in real-time, can operate in a schemeless manner as a ML model service that can provide for data agnostic implementation for generation of one or more types of quality metrics for various types of data (e.g., log data, seismic survey data, Log ASCII Standard (LAS) data, Digital Log Interchange Standard (DLIS) data, document data, etc.).

As an example, a system such as the system 1500 can be extensible as to its operations and/or interactions. For example, consider a voice assistant to which user can converse and get various quality metrics of data on demand queries. In such an example, speech-to-text (STT) and/or natural language processing (NLP) may be implemented.

As an example, a user may subscribe to a service that can leverage a system such as the system 1500. In such an example, the service may provide real-time data quality metrics without intervention by user rule writing. In such an approach, the user may save more time for data analysis, which may be improved as quality of data is known prior to analysis. In such an example, a user may be able to perform various data interpretation tasks more efficiently in less time.

As an example, the system 1500 may be implemented in a local and/or remote manner. For example, consider an on-premises approach that is local and/or a cloud approach that is remote. As explained, a system can be extensible, optionally via provisioning of resources, which can include compute, memory, applications, etc.

As an example, a system, such as the system 1500, can receive data from one or more pieces of equipment where such equipment may be processor-enabled, including one or more network interfaces, and/or may be operatively coupled to a processor-enabled local edge framework or processor-enabled local edge frameworks, which can include one or more network interfaces. As an example, one or more pieces of equipment can be Internet-of-Things (IoT) enabled equipment. As an example, a field site may be operatively coupled to one or more types of networks (e.g., cellular, cable, satellite, etc.). In such an example, field data from the field site can be transmitted in batches, streams, etc. As explained, a system may be suitable for handling data from multiple field sites where, for example, the system includes one or more ML models that can identify data types and/or assess data quality in an automated manner. As an example, a system can be distributed where, for example, one or more components may be deployed to one or more field sites. In such an example, a combination of local ML models and remote ML models may be utilized. For example, consider an architecture that includes IoT components and cloud components (e.g., remote cloud-based AI components with local IoT components, optionally with embedded with AI features).

As an example, a cloud-based platform can host various components of a system for implementation of a unified intelligent dashboard for DQM that can receive field data in batches, streams, from data storage, etc. In such an example, various components can provide for data identification and/or data quality assessments, optionally with predictive components or other components that can generate insightful results.

As an example, a dashboard can display real-time data generated along with generated quality scores, visuals of associated tools/equipment, attributes categorically monitored, graphical representations of quality, highlights of areas of concerns, forecast data using ML models (e.g., DNN, etc.) and data as per initial planning. In such an example, various data can be matched and a separate score generated for matched data.

As an example, a dashboard can generate artifacts that can be filtered, sorted, or selected in combination. A dashboard can provide graphical representations of data quality scores with reference to time and various attributes in graphical format. As an example, a customizable color coding scheme can be implemented for highlighting data quality scores (e.g., on a scale such as 0 to 100).

As an example, a dashboard can provide output for data that include planned data, predicted data and actual data. In such an example, these types of data can be used to determine health of equipment, operation status and safety and unexpected anomalies.

As explained, a system may be accessible via a voice-enabled assistant (VEA). As an example, a system may be accessible via augmented reality (AR) and/or virtual reality (VR) equipment such as projectors, headsets, etc.

As an example, a VEA can provide for dashboard control such that one or more graphical user interfaces (GUIs) can be navigated, interacted with, etc., optionally in a hands-free manner. For example, consider an operator at a field site utilizing a mobile computing device (e.g., tablet, smart phone, AR/VR goggles, etc.) that can utilize voice commands to cause a system to generate output that can be rendered to a display of the mobile computing device. In such an example, the mobile computing device can be equipped with one or more sensors capable of acquiring biometric information (e.g., facial images, voice signals, fingerprints, etc.). For example, consider utilization of facial recognition, optionally in combination with voice recognition, uniform recognition and/or other symbol recognition (e.g., badge, hardhat, etc.), for purposes of secure login to a system. A system can provide two-way communication via a VEA (e.g., embedded in a mobile computing device, embedded in field equipment, etc.) to assist with monitoring, control, decision making, etc. As an example, a dashboard can include features for coordinating between multiple locations (e.g., field and/or other), optionally with customized filtering of parameters, report generation, etc.

As explained, an environment such as the DELFI environment can host various frameworks that can be utilized in complex multi-framework workflows that can utilize various types of data. As explained, a complex workflow can benefit from automated data identification and/or data quality assessment early in the workflow or prior to commencement of the workflow. As an example, a dashboard may be interactive within the DELFI environment and/or within one or more frameworks. In such an example, a user may assess available data and make a decision as to whether and/or how to proceed with a workflow. For example, consider a dashboard that enables scrutiny of real-time data (e.g., live data, etc.) to highlight one or more concerns and/or potential risks (e.g., health, safety, security and environment (HSSE) risks, etc.). A system can be extensible such that a dashboard is extensible, for example, to integrate data from one or more sources, which can include non-hydrocarbon sources, renewable energy sources, etc. For example, consider a hybrid dashboard that can identify data from hydrocarbon operations and non-hydrocarbon operations where hybrid operations may involve combined operations, switching operations, etc.

As explained, a system can include an intelligent real-time monitoring dashboard for static and live data sources where the system can operate extensibly in a plug-n-play manner. For example, consider front-end extensibility via a speech-to-text (STT) engine, a natural language processing (NLP) engine, etc., which may be embedded in local and/or mobile equipment and/or integrated in a cloud platform (e.g., consider local and/or remote engine components, etc.). As to STT and NLP, such engines may be tailored to particular domains, which may include proprietary terms that can enhance security, enhance accuracy and/or expedite processing.

As explained, ML models may be trained in one or more manners (e.g., supervised, semi-supervised, unsupervised, etc.) to support identification and/or quality assessment of existing types of data type and, extensibly, future types of data.

As explained, a ML model can be trained using a reward-based approach. For example, consider an upvote/downvote approach that can be implemented using one or more types of user interfaces, optionally via a VEA interface. In such an example, a ML model can be retrained on the basis of feedback.

As to various aspects of data assessment, a system may provide for data analytics and quality metrics like quality score on completeness, validity, and accuracy. As explained, a system can include one or more components that can provide for data insights, for example, via one or more ML models. In such an example, insight metrics can be predictive, suggestive, etc., which may be represented graphically (e.g., via a dashboard, a GUI, etc.).

As explained, a system can perform real-time monitoring of data as to identification and/or quality assessment. For example, consider a system that can perform real-time data quality assessment on drilling data prior to allowing transmission of such data for one or more types of further geophysical analysis, which may be part of a comprehensive drilling to analysis workflow involving one or more drilling sites (e.g., rigsites, etc.).

As an example, an intelligent DQM dashboard (iDQM dashboard) can include various components or sets of components. For example, consider a conversational AI (CAI) set of components (e.g., intelligent VEA, etc.); a set of components for dashboard data insights, visualizations, trends, comparisons, etc.; and a set of components for a predictive engine that can utilized one or more ML models that may be trainable using one or more types of training techniques (e.g., supervised, semi-supervised, unsupervised, etc.).

As to predictive analytics, consider a method that can show attributes that contributed to quality score generation and generate a predictive suggestion for consideration by a machine, a human, etc., as to one or more bases for improvement of data quality. For example, where a sampling rate is low and contributes to a low quality score, a prediction engine can suggest an increase to the sampling rate, which may be implemented with or without a human in the loop (HITL). In such an approach, a system may issue an instruction to a piece of field equipment to instruct it to increase its sampling rate, where, if the piece of field equipment cannot do so, the system may receive a response and/or otherwise infer that the piece of field equipment cannot do so on the basis of additional data streamed by the piece of field equipment. As to suggestions to improve data quality, a system may employ forecast modeling. For example, consider generating a forecast and modeling based on the forecast to determine whether or not data quality can be improved.

As an example, a dashboard can include a drag-n-drop region that can allow a user to drag and drop a file icon in that region. In such an approach, a system can assess the data and provide one or more quality metrics for consideration by the user. In turn, the user can decide whether to proceed with an ingestion process or not. As an example, data may be represented in a graphical manner, for example, as a matrix, a vector, etc. In such an example, a user may select a portion of the data via a graphic and drag and drop and/or otherwise cause a system to assess quality. In such an approach, a user may determine that portions of the data are of higher quality than others and decide to utilize higher quality portions for a workflow. Where data are time-series data or otherwise characterizable with respect to time, a system can generate one or more data quality trend metrics, which may be represented for consideration by a user. In such an approach, a user may be able to determine that quality of data from a certain source is deteriorating, which may be for one or more reasons that can or cannot be remedied. In such an example, where a remedy is available, the system may suggest the remedy, which as mentioned, may be machine implemented without a human in the loop (HITL) or human implemented (e.g. via issuance of a control instruction, a communication to replace or otherwise service field equipment, network equipment, etc.).

As an example, a predictive engine can assist with an existing ruleset predictor. For example, consider a dashboard that provide for a drag and drop of a file by a user where the user wants to create rules for a DROOLS engine. In such an approach, the predictive engine can be utilized to generate one or more suggestions as to rules to implement in the DROOLS engine. Such an approach can conserve time for a user that wants to implement a rule-based approach.

As to a set of conversational AI (CAI) components, consider utilization of one or more features of the language understanding (LUIS) platform (Microsoft Corporation, Redmond, Washington), the GOOGLE text-to-speech (gTTs) platform, etc. Such platforms can be implemented using cloud platform resources (e.g., AZURE cloud platform, GOOGLE cloud platform, etc.).

As an example, a CAI components can form a VEA that can provide for voice directed operations such as command searching an ingested document, requesting generation of a plot of data during ingestion, rendering quality scores of various files and/or portions thereof, performing one or more comparison, etc.

As explained, a data quality dashboard can be customizable and data centric, which can show details of various attributes through visualizations and perform various on-the-fly computations of parameters that contribute to generation of quality scores, which can facilitate machine and/or human decision making.

As an example, a system can generate comparison reports of data files based on various header parameters. As an example, a dashboard can be integrated to a live streaming source of data where a user can see real-time generated quality metrics on one or more of various factors that may be selected by the user. In such an approach, the user may interact with the dashboard in real-time to determine how data quality may change and/or be assessed, which may allow the user to arrive at an optimum solution as may be facilitated by stop-n-go, traffic light-based color coding.

As explained, a dashboard can be intelligent through implementation of a ML model-based system that can optionally train one or more ML models in a real-time mode, a batch mode, based on user feedback (e.g., reward, etc.), based on outcomes as may be indicated in data, decision making, etc. Such training may be automated or semi-automated. For example, consider a dashboard that provides a graphical control that can be actuated to allow a user to determine whether feedback is to be considered or not. Where the user wants to provide feedback, re-training may occur where the dashboard can render results based on re-training for consideration by a user. If the user determines that the results are unacceptable or nonsensical, the user may instruct a system to revert back to a prior trained ML model.

As an example, a dashboard can provide a comprehensive snapshot of performance of one or more operations at one or more field sites. In such an example, the dashboard can incorporate a relatively large amount of detail with minimal use of drilldown graphics. As an example, a system can use data from the past (historical data) to identify one or more trends and/or patterns that may assist with process improvements.

A data quality dashboard can be an information management tool that visually tracks, analyzes, and displays performance indicators. Such a dashboard can highlight particular data to monitor for one or more purposes (e.g., health of a field, health of equipment, health of a process, etc.). A data quality dashboard can render metrics that allows a user to understand how much trust can be placed on data from one or more sources.

Figure 16:
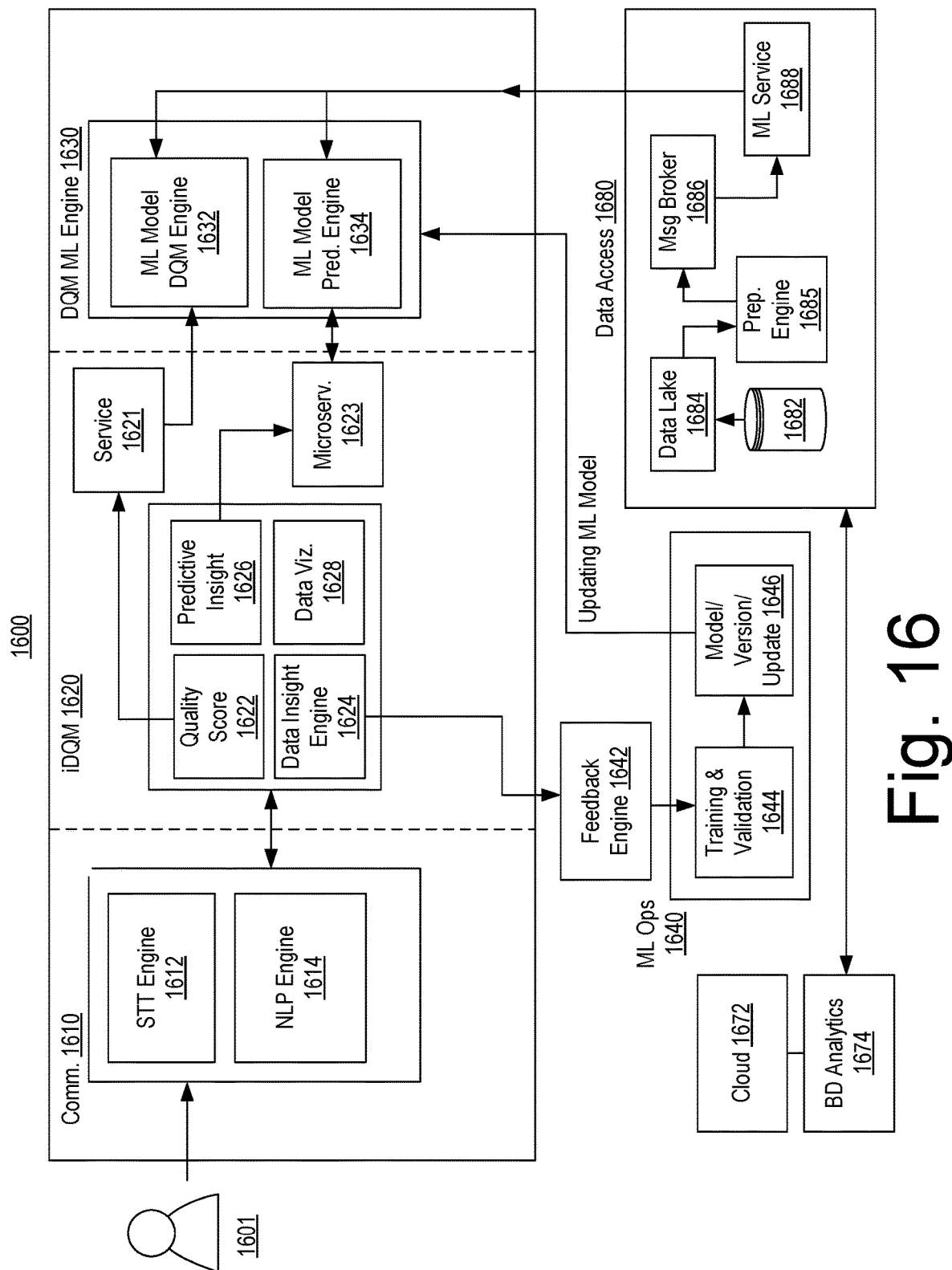
FIG. 16 illustrates an example of a system.

FIG. 16 shows an example of a system 1600 that includes various groups of components, including a communications group 1610, an intelligent data quality management (iDQM) group 1620, a data quality management machine learning engine (DQM ML engine) group 1630, a machine learning operations (ML Ops) group 1640 and a data access group 1680.

As shown, the system 1600 can implement various workflows. For example, consider a user 1601 that utters voice commands that can be received by one or more microphones for processing by a speech-to-text (STT) engine 1612 and/or a natural language processing (NLP) engine 1614. In such an example, output of the communication group 1610 can be received in a suitable digital form by the iDQM group 1620. For example, a quality score component 1622, a data insight engine 1624, a predictive insight component 1626 and/or a data visualization component 1628 can respond to digital information received from the communication group 1610. As shown, the quality score component 1622 can be operatively coupled to a service 1621 that links to the DQM ML engine group 1630, the data insight engine 1624 can be operatively coupled to a feedback engine 1642 of the ML Ops group 1640 and the predictive insight component 1626 can be operatively coupled to a microservice 1623 that can link to the DQM ML engine group 1630. As to the data visualization component 1628, it may be coupled to other components for receipt of information where such information can be processed for rendering to one or more displays (e.g., as one or more interactive GUIs, etc.). As explained, a user such as the user 1601 may utilize a mobile device with a microphone, a display and a network interface such that voice commands can be utilized to drive the system 1600 for generation of information that can be rendered to the display of the mobile device.

In the example of FIG. 16, the system can include or be operatively coupled to one or more cloud platform components 1672, which may provide for access to one or more big data (BD) analytics frameworks 1674. As shown in FIG. 16, the components 1672 and 1674 can be operatively coupled to the data access group 1680, which can include one or more data stores 1682, operatively coupled to or otherwise forming a data lake 1684 that can be accessed by a preprocessing engine 1685 that can supply information to a message broker 1686 that can be operatively coupled to a machine learning service (ML service) 1688. As shown, the ML service 1688 can supply information to a ML model DQM engine 1632 and/or a ML model predictor engine 1634. Such information, which can include one or more types of data from the one or more data stores 1682, etc., can be utilized for training and/or for use of the ML model DQM engine 1632 and/or the ML model predictor engine 1634. For example, the ML service 1688 and the service 1621 and/or the microservice 1623 can be operatively coupled. In such an approach, utterances of the user 1601 can result in appropriate data handling to generate a desired output or outputs for the user 1601.

As explained, feedback can play various roles in a workflow or workflows. As shown in the example of FIG. 16, the feedback engine 1642 may receive information responsive to an utterance or other action of the user 1601 (e.g., interacting with a computing device, etc.). Such information can be transmitted to a training and validation component 1644 for purposes of model updates per a model and version update component 1646 of the ML Ops group 1640. As shown, the model and version update component 1646 can be operatively coupled to the DQM ML engine group 1630 for purposes of updating the ML Model DQM engine 1632, the ML model predictor engine 1634, etc. Such updating can provide for version control such that, for example, where feedback does not improve a workflow, a version may be deprecated, rolled-back, etc.

As explained, the system 1600 shows how voice commands and data can flow using ID QM group components and services and/or microservices. As explained, the system 1600 may be a real-time distributed intelligent data quality management framework. In such an example, various pluggable components, etc., can provide for data handling, analysis and visualizations. As an example, the system 1600 can aggregate computation of various types of streaming IOT data in real-time where results can be distributed via one or more networks to one or more user devices.

As explained, various conversational AI component may be utilized that can form a voice assistant (e.g., a voice-enabled assistant) that can interact with a user. While visualizations are mentioned, such an approach can include generating speech from text or other digital data. For example, a mobile device can include a speaker such that a conversational AI component can cause the mobile device to render an audible question. A communication group can provide for assisting a user for conversations to perform various task at the user's command where the communication group can be backed by a STT engine, a text-to-speech (TTS) engine, a NLP engine, etc.

As explained, an iDQM group can provide for dashboard rendering and/or interactions. For example, consider such a group as including components for managing real-time computations and generating real-time visualizations that can give a user data insights, which can include quality score generation, hierarchical relationship visualization, in depth trend analysis, drill down analysis to various attributes, etc.

As explained, a DQM ML engine group can provide for data quality management and predictions using one or more types of ML models. For example, consider a deep neural network (DNN) based model that can be developed using a hybrid approach of supervised and un-supervised techniques.

As an example, a system can provide for real-time monitoring. For example, consider a backend AI engine that can be integrated with a real-time distributed framework. In such an example, a workflow may include big data streaming that internally distributes computational loads to various provisioned nodes where the nodes process data for the AI engine in a manner that may provide for continuous feedback (e.g., training, re-training, etc.).

Figure 17:
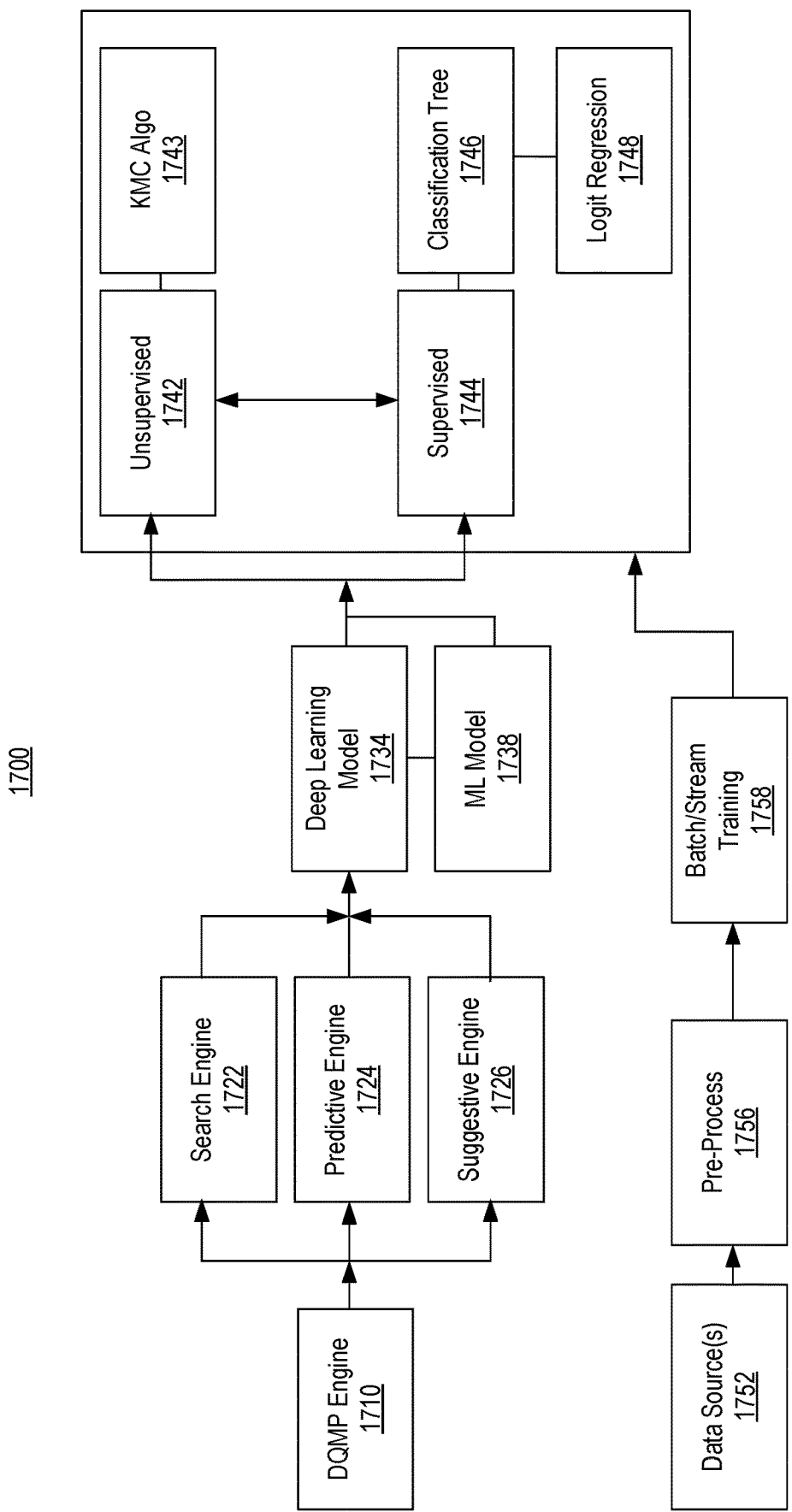
FIG. 17 illustrates an example of a system.

FIG. 17 shows an example of a system 1700 that includes various features for model development. As shown, output from a DQMP engine 1710 can feed a search engine 1722, a predictive engine 1724 and a suggestive engine 1726 for purposes of deep learning (DL) of a deep learning model 1734, which may be operatively coupled to and/or include one or more other machine learning models (ML model) 1738. In the example of FIG. 17, the system 1700 can include various components for learning (e.g., training, re-training, etc.). As shown, the system 1700 can include an unsupervised learning component 1742, a kinetic Monte Carlo (KMC) algorithm component 1743, a supervised learning component 1744, a classification tree component 1746 and a logit regression component 1748.

As an example, a KMC algorithm component can provide for computer simulation that simulates time evolution of a process, which may be a natural process or a machine process. In such an example, a process may occur with known transition rates among states. As an example, a logistic regression component (logit regression) can utilize a statistical model that includes a logistic function that can model one or more dependent variables. For example, in regression analysis, logit regression can provide for estimating parameters of a logistic model (e.g., as a form of binary regression).

Figure 18:
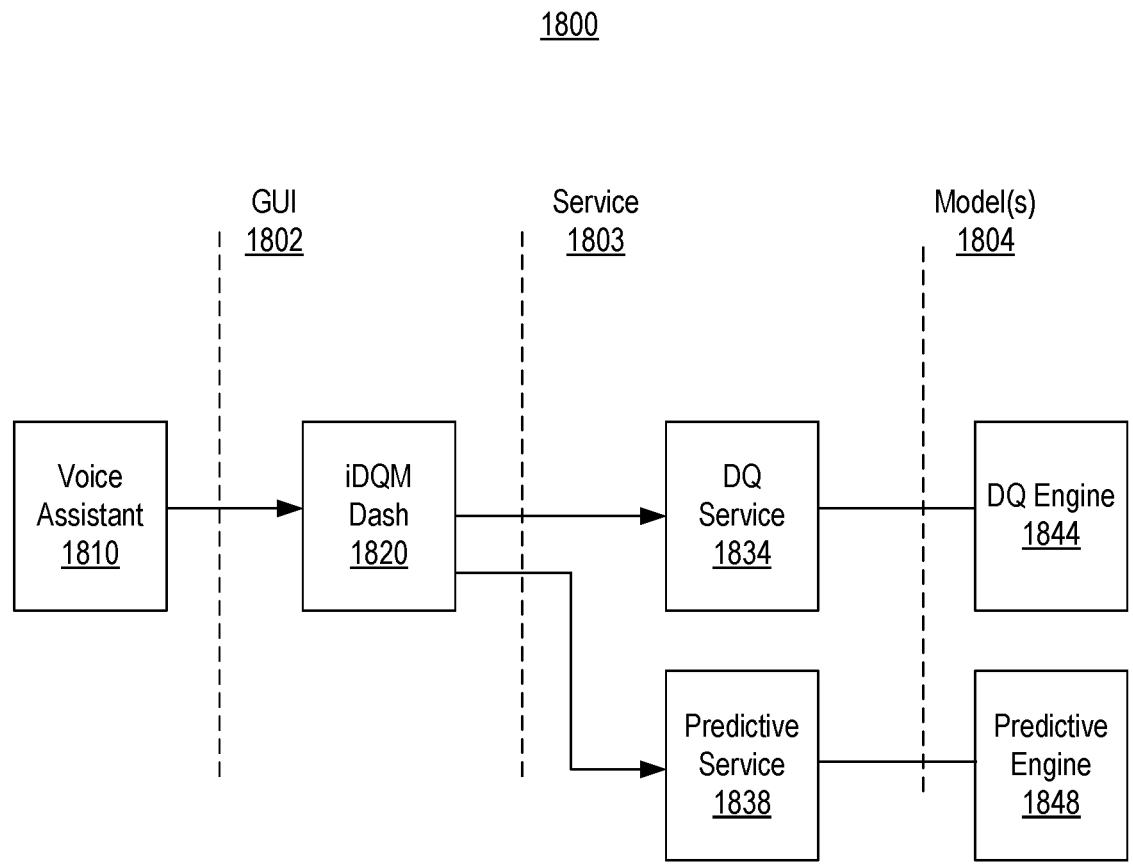
FIG. 18 illustrates an example of a system.

FIG. 18 shows an example of a system 1800 that includes a GUI components group 1802, a service components group 1803 and a model or models components group 1804. As shown, the system 1800 can be structured to perform various workflows. For example, consider input form a voice assistant 1810 to an intelligent data quality management (iDQM) dashboard 1820 that is operatively coupled to a data quality service 1834 and a predictive service 1838. In such an approach, the DQ service 1834 can instruct a DQ engine 1844 and the predictive service 1838 can instruct a predictive engine 1848. While the workflow indicators in the example system 1800 are shown in a unidirectional manner, as explained, output from one or more ML models can be provided to a machine or machines for purposes of data storage, big data analytics, GUI renderings, audio signal generation, etc. In the example of FIG. 18, the voice assistant 1810 can be a machine that can be a mobile device, an equipment device, etc. As mentioned, one or more pieces of field equipment may include embedded voice assistant features for interaction with a user or users directly and/or indirectly (e.g., consider BLUETOOTH communication to a user headset, a user phone, etc.).

As explained, a system may be implemented using one or more types of computational resources, whether machines, languages, standards, etc. For example, the PYTHON language and/or PYTHON resources may be utilized (e.g., consider PYTHON services, etc.).

In the example of FIG. 18, the system 1800 can provide for a flow of information that involves internal communication to components and/or from components (e.g., voice assistant, services, microservices, ML engines, etc.).

Figure 19:
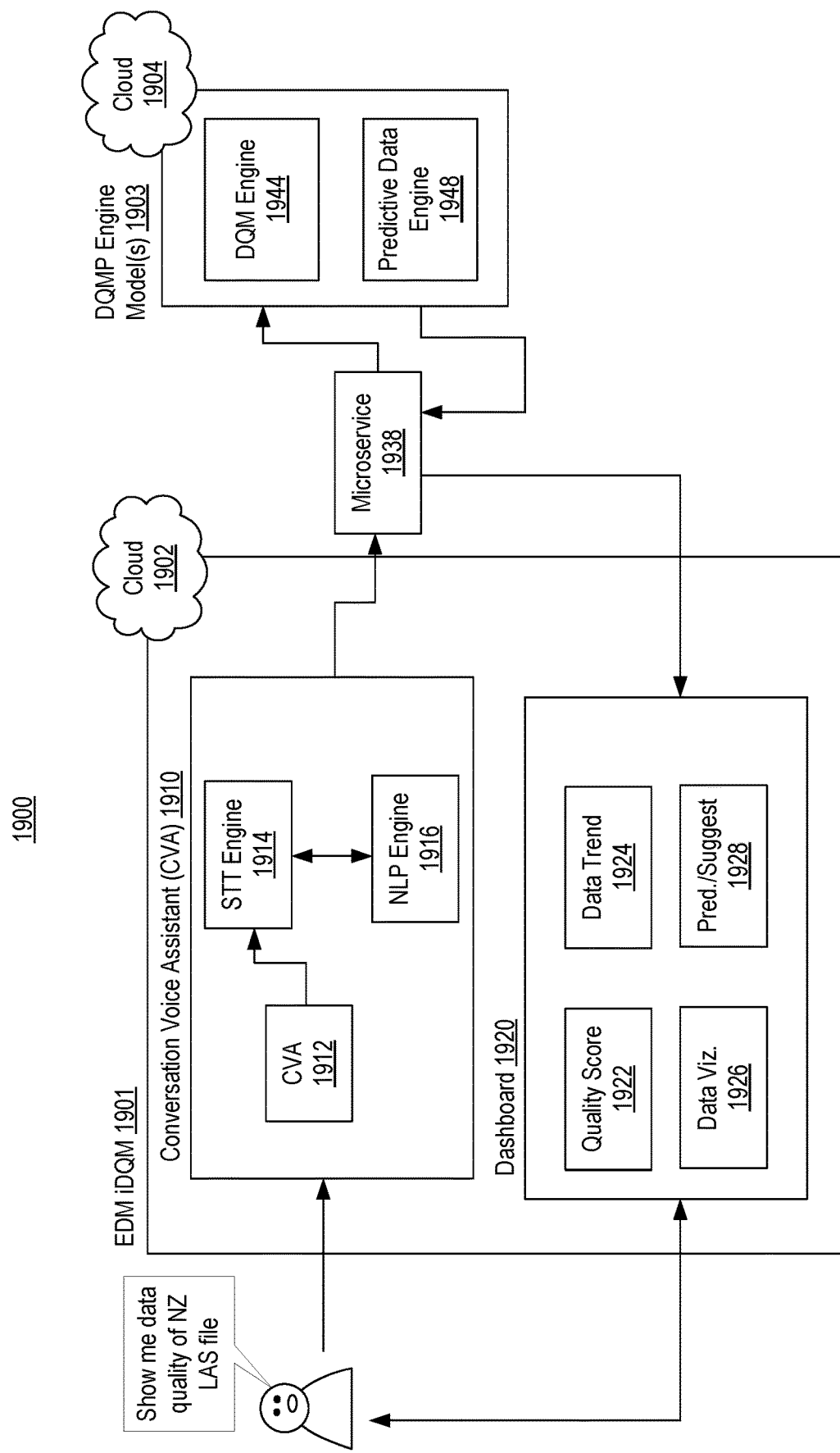
FIG. 19 illustrates an example of a system.

FIG. 19 shows an example of a system 1900 with respect to a user voice command: "Show me data quality of NZ LAS file". In FIG. 19, the command, which may be interpreted as a query, can generate a data flow for outputting an answer, which can include a quality score of ingested records in an enterprise data management system where output can be viewed via rendering to a GUI of a dashboard, heard via audio rendering to a speaker, etc.

As shown, the system 1900 includes various EDM iDQM components 1901 that may be hosted by cloud resources 1902 and a DQMP engine 1903 that may be hosted by cloud resources 1904. In the example of FIG. 19, the cloud resources 1902 and 1904 may be from a common cloud platform or, for example, via cloud platforms that are operatively coupled.

As shown, a conversational voice assistant (CVA) 1910 can include a CVA component 1912, a STT engine 1914 and a NLP engine 1916. Such features may be accessible and/or represented via a dashboard 1920 that can provide for quality scores 1922, data trends 1924, data visualizations 1926 and predictions and/or suggestions 1928.

In the example of FIG. 19, the CVA 1910 can be operatively coupled to a microservice 1938 that can mediate messaging, actions, data, etc., between the EDM iDQM 1901 and the DQMP engine 1903. For example, the microservice 1938 can be cloud coupled to one or more cloud platforms and/or cloud instantiated. As indicated, the microservice 1938 can receive input to instruct the DQMP engine 1903 and can receive output from the DQMP engine 1903 that can be passed onto one or more components of the dashboard 1920.

As explained, a dashboard component may include a TTS component such that audio signals can be generated. As an example, the system 1900 may operate without a visual dashboard and via a microphone and a speaker. For example, consider a human to machine conversation that can occur using an audio headset, a microphone and a speaker of a phone, etc. As an example, one or more of the EDM iDQM 1901 components may be accessible via a network where audio signals are transmitted back and forth.

As explained, data can include wellbore entity data for a well where such data can be utilize for building a classification and regression supervised model. For example, such data can include location (e.g., latitude and longitude), a wellbore identifier, one or more dates, etc.

As explained with respect to FIG. 14, various metrics can be generated for a number of ML models, which may be part of an ensemble approach where ML models can be ranked according to one or more metrics. And, as explained with respect to FIG. 13, output can be generated for data quality via a ML model (e.g., a ML model service, etc.).

As explained, a system can include various independent sets of components that can operate collaboratively. One set can provide for interactions such as voice interactions. As explained, a CAI or CVA can be developed by using NLP and by forming a predefined knowledge base. A CAI or CVA can include an STT engine and/or a TSS engine, which may be customized. In such an example, an NLP engine can be operatively coupled to a STT engine and/or a TSS engine.

As explained, a set of components can provide for various dashboard features, which may be referred to as an intelligent data quality management (iDQM) dashboard. In such an approach, a CAI or CVA can trigger one or more workflows upon processing of input (e.g., voice input). Input may be in the form of a query such that a dashboard can act responsive to the query to trigger a backend data quality management and predictive engine (DQMP) via a microservice or other service.

As explained, a DQMP engine can include a deep learning hybrid model that is developed using supervised learning (e.g., gradient boosting machine, etc.) and un-supervised learning (e.g., clustering, etc.) to provide a trained ML model that can output data insights. For example, consider data insights in terms of quality along with suggestions to optimize and manage data driven insights. As explained, a predictive model can be integrated with search analytics to provide an option for user to find file information that can be uploaded via an EDM application.

As to real-time monitoring and dynamic training, components can provide for integration of a DQMP model with real-time pre-processed data coming via various sources, which can include industrial IoT (IIoT) devices subject to domain lines. For example, consider data for drilling, mud logging or another kind of data burst that can provide for predictive insights to optimize decision-making. As an example, data received from one or more IIoT devices can be stored to a data lake after performing pre-processing, which can include formatting data with a structure suitable for utilization by a deep learning classifier to generate quality metrics (e.g., completeness, fairness, validity, accuracy, etc.). For asynchronous and continuous operation, a message broker can operate as a listening component and push an event as a topic of DQMP topics hosted on a cloud cluster.

As to the DQMP model, it can be a combination of independent models that include a DQM Engine that can be used for classification quality status (e.g., good/bad) and regression score values using a supervised learning technique and that include a predictive model that can be used to predict trends and give data insights.

A ML model for DQM can be trained using a supervised learning technique. Such a ML model can be built using one or more algorithms such as, for example, binomial logit regression, decision tree, random forest, naive Bayes, SVM, neural network, etc., and converted into a persistent form to make a trained ML model available for predictions. Such an approach can include feature engineering of data distribution, performance of visual analytics and correlations for understanding data patterns and getting insight, training and testing data splits, validation of the model using various metrics (e.g., k-fold cross, Gini index, etc.).

As an example, model building can include labeling a dataset where labels can include, for example, good as "1" and bad as "0" as to classification for quality status. In such an approach, data can already be analyzed through domain expertise and tagged with nomenclatures that are suitable for implementing a supervised classification technique. As to utilization of regression, the same dataset may be utilized with a certain amount of basic tuning.

As to a predictive model, an artificial neural network (ANN) forecast model can be built that provide for forecasting data trends and output of suggestive data insights. Such a model can output metric value predictions, estimated numeric values for new data based on learnings from historical data, etc.

As to data pre-processing, a workflow can include performing EDA like univariate and multivariate analysis, correlation plotting, skewness treatment, encoding operations, outlier treatment, etc., for example, to make data fit for model development.

As to feature engineering, a workflow can include using heatmap correlation techniques, ANOVA, etc., to check which features are contributing to prediction and generating correlation for the same.

As to data splitting, a workflow can include splitting data into three ratios (e.g., 60:20:20, etc.) for training, testing and validation tasks.

As to training and building a model, a workflow can include performing training of a model using split data and performing various techniques to fine tune performance if a given threshold is not met by using VIF, P-Value, etc.

As to model evaluation, a workflow can include using various metrics (e.g., k-fold cross, ROC-Gini index, deviance analysis, confusion matrix, AIC, etc.) and one or more techniques to validate model accuracy for a validation dataset (e.g., as split).

As to hyper-parameter tuning, a workflow can include assessing accuracy and precision as to an ability to make robust decisions.

As an example, a workflow can utilize one or more feature agnostic techniques for unsupervised learning. For example, consider a workflow that initially builds a model using a feature engineering approach and, in an advance stage, that implements an unsupervised clustering technique (e.g., k-means, etc.) to create feature clusters before feeding to an ANN model. Such an approach can free a model from one data source type prediction and make for a source agnostic implementation.

As an example, a workflow can include prediction of anomalies (e.g., anomaly detection) on real-time streaming data. For example, consider combining dimensionality reduction and clustering algorithms to power an unsupervised model and to get dimensionality reduction as an initial-stage for anomaly detection. In such an example, a workflow can transform a high-dimensional space into a lower-dimensional space (e.g., consider an encoder, PCA or another technique) where density of major data points can be assessed in the lower-dimensional space for identification of "normal" and "abnormal" data, where those data points located far away from the normal data point space can be considered outliers and referred to as anomalies.

As an example, a data pre-processing engine can be implemented that provides for data treatment, which can include analysis of outliers, null treatment, standardization, normalization of data, skewness treatment, etc. As an example, a base data pre-processing pipeline can be implemented to perform actions to convert raw data into processed data before feeding to a trained ANN classifier.

As explained, various services, frameworks, etc., may be utilized. For example, a ML PYTHON Service, a FLASK/DJANGO REST framework, etc. In such an approach, binary (e.g., 0 or 1) numerical values can be mapped to good status or bad status internally in service logic and output (see, e.g., FIG. 13), along with one or more metrics such as, for example, a regression quality score.

As to a suggestive approach, a predictive model can output data point insights such as, for example, a trend of data quality over time, which may provide for insights such as whether or not data are degrading and, if so, which parameters are contributing to degradation; where, if those parameters are irrelevant, a user may trigger a reward event to cause re-training of the predictive model. In an instance where one or more parameters are relevant, a user can take action using an option provided by the predictive model such as an indication that rate of penetration for drilling is less than a certain desired value such that one or more actions for drilling operations can be optimized, etc. As an example, a suggestive option can be for real-time data assessment such as, for example, an outlier model with a time series model that can detect anomalies and issue alerts to a user upon anomaly detection. One or more predictive models can provide for responses that include various parameters upon which a user can take one or more actions.

As explained with respect to the example of FIG. 19, a user can utter a command for ingestion by the CVA 1910 of the EDM iDQM 1901 that involves converting speech to text and feeding a result to the NLP engine 1916 which can further trigger the backend microservice 1938 with information sufficient to get a data quality score with predictive results per the DQMP engine model(s) 1903 where such a score and results can be rendered to a display and/or converted into audio signals suitable for rendering by a speaker such that the user can hear them.

As explained, various services, frameworks, etc., may be utilized in a system such as the system 1900 of FIG. 19. A CAI or CVA can utilize gTTs, LUIS.AI, a cloud platform, PTHYON and/or JAVA languages. An iDQM dashboard can utilize various user interface technologies, etc. A DQMP can utilize KERA, PYTORCH, TENSORFLOW, etc., along with logit, random tree, extra boost classifier, outlier, prophet, GBM, etc., techniques and various cloud technologies. As to data processing, a system may utilize various big data analytics technologies (e.g., HADOOP, APACHE SPARK, etc.). As to visualization, technologies such as MATLAB, PLOTLY and HEATMAP may be implemented.

As to CAI and CVA, these may be provided as options to a user. For example, where a user is in an environment where a display may be small (e.g., a smart phone), gloves may be used, etc., it may be easier for the user to speak into a microphone than to interact with a GUI. Further, voice-based approach can be more flexible than a GUI. For example, a voice-based approach can be contemporaneous with circumstances at a field site; whereas, a GUI may be limited in content, limited by latency, etc. A voice-based approach may allow for making specific queries without a person taking her eyes off equipment, etc. For example, a person looking at a gauge may read the gauge and utter a query that includes a gauge reading more efficiently than having to enter similar content via a GUI.

As explained, a system can provide for real-time data quality generation optionally along with anomaly tracking and detection in upstream operations (e.g., wireline logging, directional drilling, etc.).

A combination of a dashboard and voice-based commands may facilitate formulating queries and visualizing results thereof. As explained, a system may be operable using one or more AR/VR technologies.

As an example, a dashboard application can be integrated with 3D hologram projection, for example, where a user can perform actions using one or more AR/VR technologies, which may provide for system extensibility. As an example, an AR headset and/or a VR headset may provide for audio interactions and visualizations of GUIs, whether in an on-screen experience or an overlay experience (e.g., appearing on or associated with equipment).

As an example, a system can handle various types of data, which can include, for example, seismic data, production data, logging data, etc.

Figure 20:
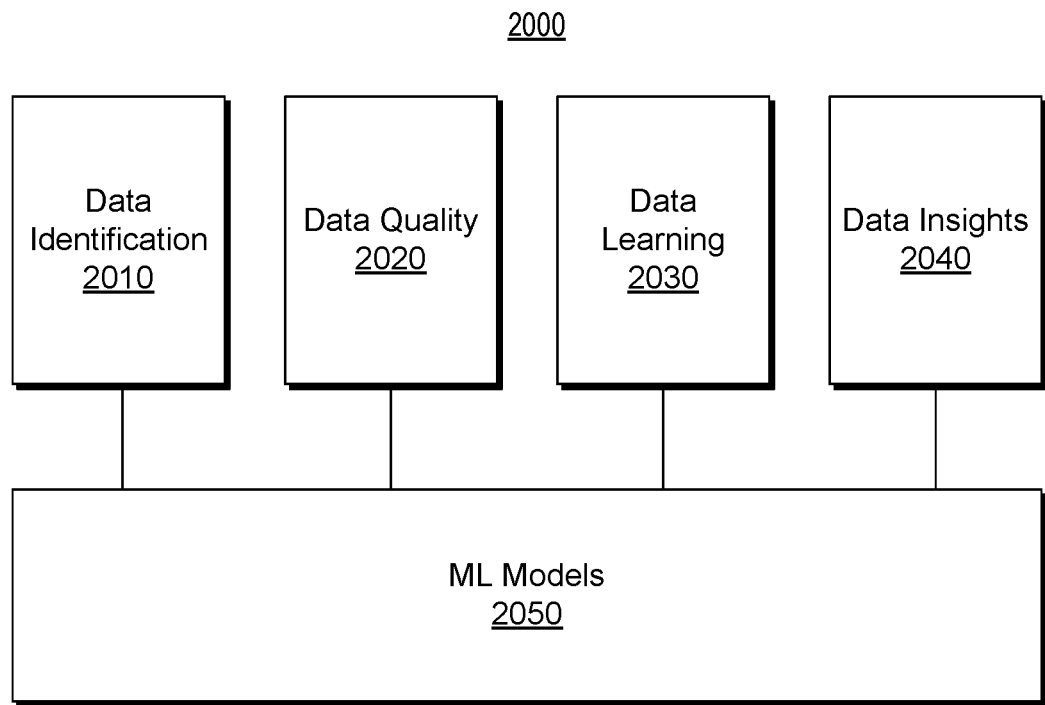
FIG. 20 illustrates an example of a system.

FIG. 20 shows an example of a system 2000 that includes a data identification block 2010, a data quality block 2020, a data learning block 2030, a data insights block 2040 and a ML models block 2050. As explained, one or more ML models can be utilized for one or more purposes. In the example of FIG. 20, the system may perform data learning per the block 2030 using raw data, identified data, quality assessed data, etc., where one or more ML models trained via the data learning block 2030 may be utilized by the data identification block 2010, the data quality block 2020 and the data insights block 2040. As an example, the data identification block 2010 can utilize a ML model trained to identify data types, the data quality block 2020 can utilize a ML model trained to assess data quality and the data insights block 2040 can utilize a ML model trained to output predictions (e.g., trends, etc.) and optionally suggestions.

As an example, a data quality management framework can provide an automated rule-based QC engine to identify and locate data issues, which may provide for changing and/or and automatically adjusting or synchronizing data according to one or more rules. In such an example, the QC engine can perform checks for data quality across different data quality measurement categories like content, completeness, consistency, uniqueness and validity.

As explained, a QC engine may implement a rule-based approach and/or a ML model-based approach. For example, consider a rule-free approach that uses one or more ML models or a ML model-based approach that can use one or more rules. As to a rule-free and reduced rule approaches, as may be achieved via implementation of one or more ML models, code duplication and if-else logic may be reduced, which can improve the code maintainability.

As explained, a QC engine can check for data quality across different data quality measurement categories like content, completeness, consistency, uniqueness and validity. Such categories can be used to measure degree in which data meet a predefined set of data quality demands, for example, percentage of data that are defect free, data content (required data available), data completeness (data source has required attributes), data consistency (attributes of each item agree between data sources), data uniqueness (lack of duplicates) and data validity (attributes of the item are acceptable and make sense, data objects are internally consistent, data honor standards, etc.).

As an example, consider data issues where data of a deviation survey and a well-path are not in agreement, where marker picks (e.g., picks or markers) do not agree with log curves, where a checkshot survey is invalid.

A checkshot survey is a type of borehole seismic data acquisition and processing procedure designed to measure the seismic traveltime from surface to a known depth. P-wave velocity of formations encountered in a wellbore can be measured directly by lowering a geophone to each formation of interest, sending out a source of energy from the surface of the Earth, and recording the resultant signal. The data can then be correlated to surface seismic data by adjusting a sonic log and generating a synthetic seismogram to confirm or modify seismic interpretations.

As an example, a system may include features for extensibility and/or adaptability. For example, consider features for plug-and-play adapters for reading, inserting, and updating data.

As explained, a QC engine can utilize one or more ML models. For example, consider a ML model that is trained to check for data quality across various data quality measurement categories and for different data types. Various types of ML models can be accessed via the SCIKIT platform (e.g., scikit-learn), which utilizes the PYTHON programming language. As an example, a k-nearest neighbors (k-NN) approach, a random forest approach, etc., may be utilized.

As an example, through use of one or more ML models, a system can perform data quality check for various well domain data types (e.g., well, logs, checkshots, markers/picks, deviation survey, seismic, etc.). In such an approach, a ML model can return a data quality report with a quality score. A system may provide for ingestion of various types of data files (e.g., LAS, DLIS, CSV, navigation files, etc.) where a QC engine can output a quality score result for data of one or more data files.

As an example, a predictive analysis can indicate one or more attributes that contributed to quality score generation and provide a predictive suggestion to a user as to a basis or bases for potential data quality improvement.

As an example, a system may provide for user options such as an option to improve a data quality score. For example, consider a data treatment service that can perform data adjustments, filtering, etc. Such an approach can include analysis of outliers, null treatment, completeness, standardization, normalization of data, etc., which may provide for conversion of raw data into a standard type of processed data with an improved quality score.

After performing one or more adjustments to improve quality, data can be transferred or loaded into an environment, a framework, etc. For example, consider one or more of the frameworks illustrated in the system 100 of FIG. 1.

As an example, a QC engine may be accessible via one or more APIs where, for example, an API call can provide for accessing data and assessing the data via one or more trained ML models. In such an approach, a ML model may be self-trained via unsupervised learning, which may include on-going learning responsive to API calls, etc.

Figure 21:
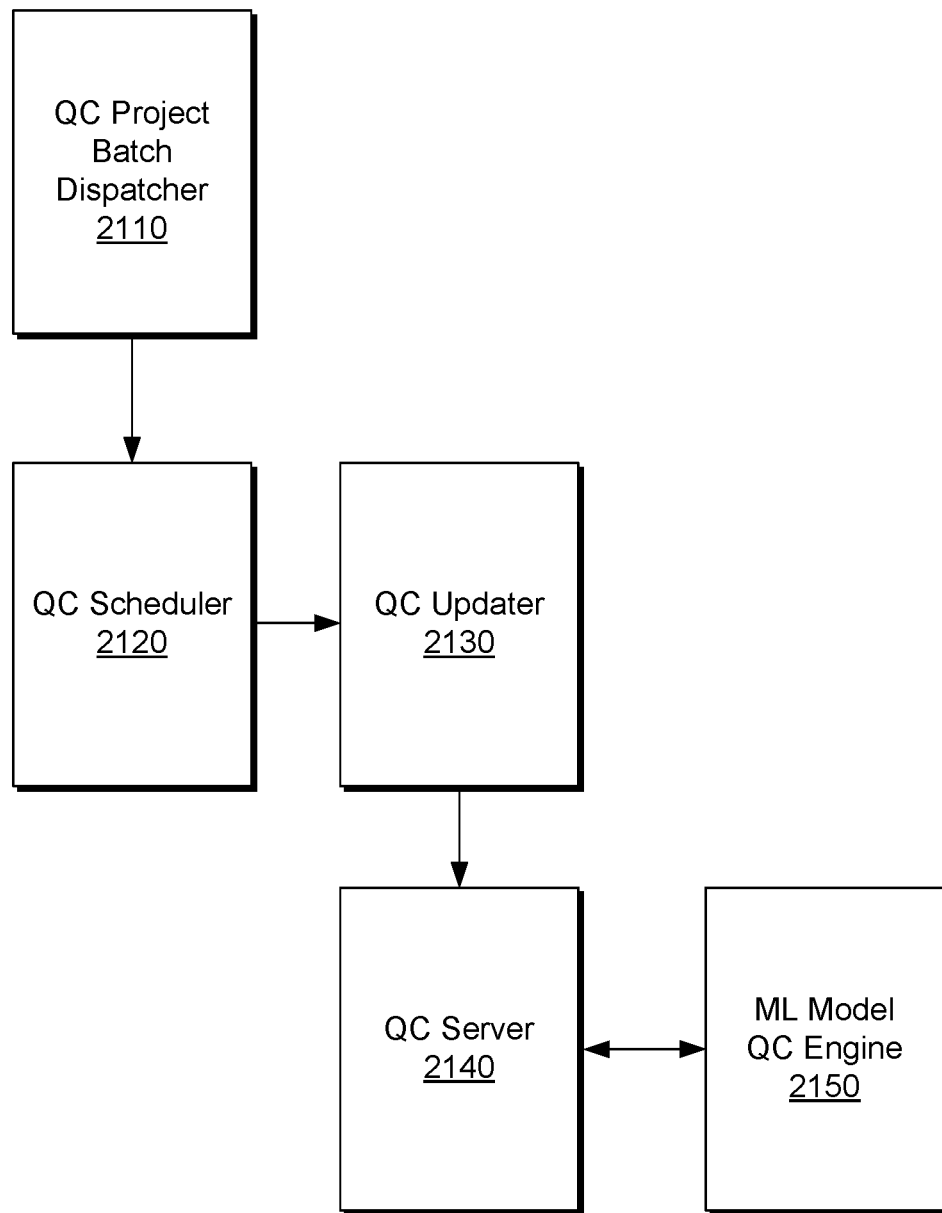
FIG. 21 illustrates an example of a system.

FIG. 21 shows an example of a system 2100 that includes a QC project batch dispatcher 2110, a QC scheduler 2120, a QC updater 2130, a QC server 2140 and a ML model QC engine 2150. As shown, the QC project batch dispatcher 2110 can provide information to the QC scheduler 2120, which can be operatively coupled to the QC updater 2130. As shown, the QC updater 2130 can instruct a QC server 2140 for interactions with the ML model QC engine 2150 to generate quality assessment metrics for a batch or batches of data.

As an example, the QC project batch dispatcher 2110 can be operatively coupled to and triggered by a framework that can be utilized as part of a project workflow. For example, consider the PETREL framework as being utilized for a project where data are to be loaded for actions to be performed by the PETREL framework. In such an example, a batch or batches of data may be accessed and assessed using a system such as the system 2100 of FIG. 21. As explained, where the system 2100 generates a quality score for a batch of data, if the quality score is unacceptable, an option can exist for making an attempt to improve the quality score. For example, consider a GUI control within the GUI 120 that can provide for requesting adjustments to data in an effort to improve quality. As explained, such an approach may be utilized where data are for training, testing, validating, etc., a ML model. In a workflow, a user may make a decision as to whether to train a ML model or not on the basis of data quality. In such an example, a user may attempt to improve data quality such that a more robust or meaningful ML model can be generated via training, testing, etc.

In the example of FIG. 21, the system 2100 may include a rule-based QC engine that may be implemented as an option. For example, consider a workflow that implements the ML model QC engine and a rule-based QC engine, which may be implemented simultaneously or sequentially. For example, if a ML model QC engine quality score is sufficiently high, then the data may be assessed using the rule-based QC engine; whereas, if the quality score is too low, attempts to improve the data may be made prior to assessing the data using the rule-based QC engine. In such an approach, the rule-based QC engine can utilize human written rules, which may serve as a confidence check on the ML model QC engine results and/or highlight one or more aspects of lesser quality data or greater quality data.

As an example, a system such as the system 2100 can be used to identify and locate data issues and automatically adjust or synchronize data through a combination of an ML model-based approach and a user-defined rule-based approach.

Figure 22:
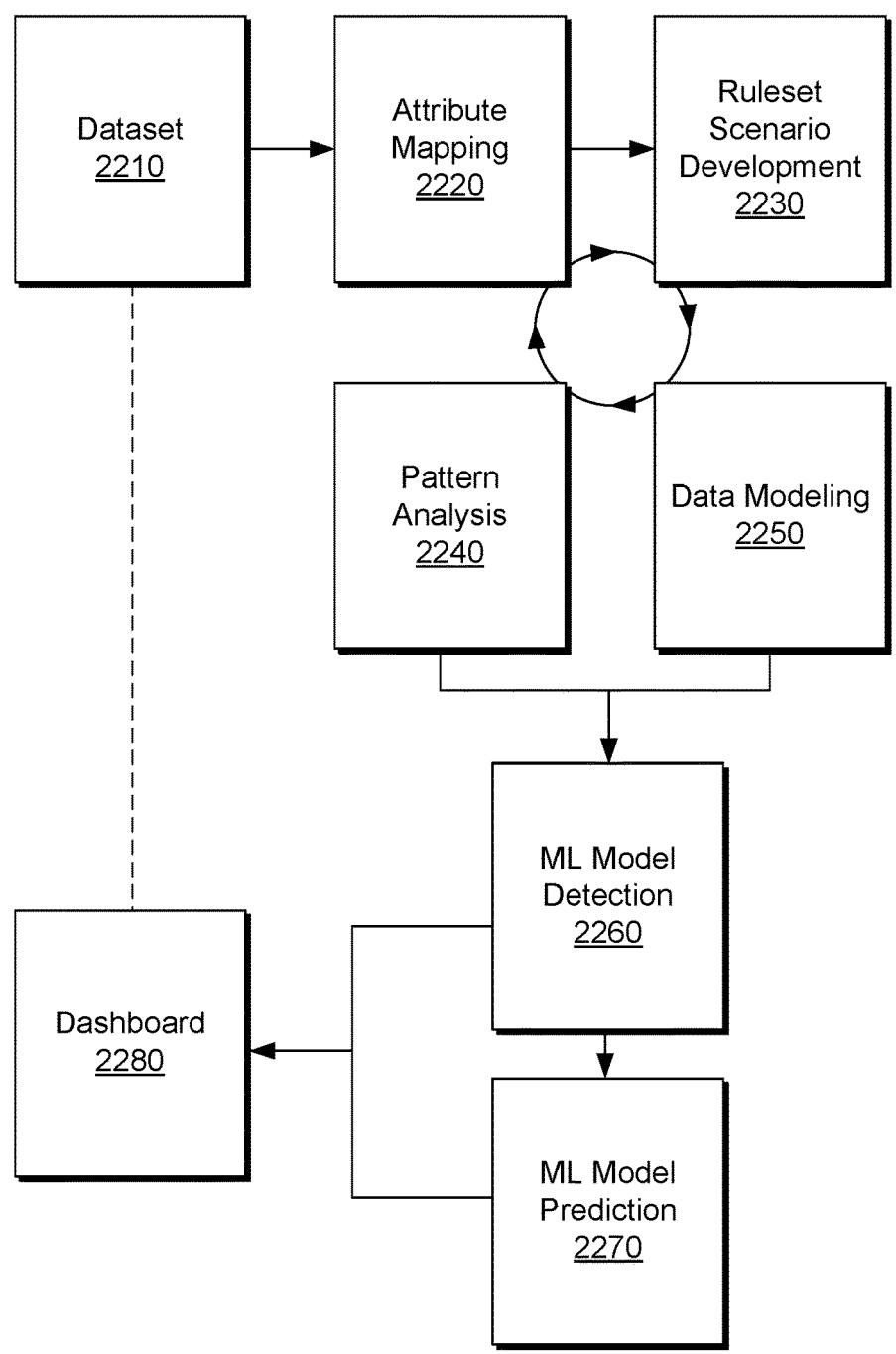
FIG. 22 illustrates an example of a system.

FIG. 22 shows an example of a system 2200 that includes a dataset block 2210, an attribute mapping block 2220, a ruleset scenario development block 2230, a pattern analysis block 2240 and a data modeling block 2250. As shown, the blocks 2220, 2230, 2240 and 2250 can generate output that can be received by one or more ML model blocks 2260 and 2270, where the ML model block 2260 can be for detection and where the ML model block 2270 can be for prediction. In the example of FIG. 22, the system 2200 can include or otherwise be operatively coupled to a dashboard as represented by a dashboard block 2280. As shown, the dataset block 2210 can be operatively coupled to the dashboard block 2280. For example, consider a GUI where upon accessing a project, certain data are accessed as a dataset where the system 2200 can automatically assess data of the dataset.

The system 2200 can lessen demand for domain experts and human intervention. For example, the system 2200 can expedite workflows and can improve quality of results, which may be relied upon for decision making (e.g., human, machine, etc.).

As to assessing data quality, a domain expert-based approach can involve looking at data as rendered to a display, for example, to understand patterns (e.g., profiling) in an effort to establish data cleansing and matching rules. For example, a rule-based QC engine can be programmed on the basis of domain expert assessments. Such an approach can introduce latency in that rules may be suitable as of the date of the last assessment made by a domain expert. To improve data quality assessment, an approach that does not include a human in the loop (HITL) may be implemented using one or more ML models.

As explained, a ML model-based approach can assess data quality and provide for actions that may improve data quality. Such actions may be in the form of suggestions, available for selection and implementation by a user, or may be in the form of routines that can be performed automatically. As an example, a ML model-based approach can help to identify and rectify problems related to data quality in a manner that demands no or less human intervention. For example, a system may operate in an unsupervised manner, optionally as to training of a ML model and as to implementation of a ML model.

A ML model-based approach can considerably expedite data cleaning activities in that what may take weeks or months for a human can now be completed in a matter of hours or days. Where humans are involved, scaling creates issues (e.g., number of humans, communication between humans, consistency between humans, etc.); whereas, a machine-based approach can handle scaling as volume of data increases in a manner where consistency can be guaranteed. Further, machine learning can benefit from an increase in data where training as to detection, predictions, etc., becomes more robust, accurate, etc., as the amount of data available for training, testing, validating, etc., increases. ML models tend to be effective at spotting patterns, associations, and rare occurrences in a pool of data (e.g., anomalies, etc.).

As an example, consider a well log entity workflow that may be associated with a particular project. In such an example, a well log entity may be a structure within a framework such as, for example, the PETREL framework where well log data are available via another framework such as, for example, the TECHLOG framework. In such an example, the well log data can include data samples where various data samples may have a wrong value when compared to a reference dataset. To identify this wrong value, a human may check the samples manually until the wrong value is found and then adjust it based on personal knowledge and then modify or create a rule for samples such that they are within a certain range such as a range that does not include the erroneous, wrong value identified by the human. As may be appreciated, such an approach involves considerable human effort and can be subject to error. Further, if the size of a data block is too big, the human performance of a matching process can be severely impacted. And, as to the human defined rule, where substantial variation exists in datasets in terms of the quality, that rule may prove ineffective (e.g., inefficient) for some of the datasets.

Data quality issues can arise in a variety of contexts. For example, data quality issues can arise when reading data, transferring data, etc. For example, when using multiple frameworks, which may be from multiple vendors, read and write issues, units issues, etc., may arise. Some frameworks may include rule-based checks for such issues, however, such rules may be ineffective and depend on proper user selection of data type, etc.

As an example, a system can implement one or more ML models for purposes of data quality assessments. For example, consider utilization of decision trees, logistic regression, etc. Such types of models can be trained to learn rules and predict matches, bad data and duplicates. Further, such types of models pose little to no restrictions as to volume of data and can benefit from more data (e.g., for tuning models, etc.). As an example, a ML model-based approach can overcome various problems related to manual processing and provide for automated adjusting of data (e.g., data fixing, etc.). As explained, a relatively extensive workflow can be automated in a manner that demands little to no human supervision.

As an example, a system can include a library of models where different models can be selected for different types of data, different tasks, etc. As an example, the blocks 2220, 2230, 2240 and 2250 of FIG. 22 can utilize one or more ML models for performing data attribute mapping, ruleset scenario development, data modeling and pattern analysis.

In the example of FIG. 22, the system 2200 can access a dataset per the dataset block 2210 and provide the dataset to the attribute mapping block 2220 where data can be mapped with standard attributes of each entity. Thereafter, the data can be processed by the ruleset scenario development block 2230 where different rules can be applied on the data to perform checks such as, for example, whether data include null values, number of values till certain decimal points and range, already existing data in target, etc. In such an example, a failed rule check can be logged and passed data can be filtered. As to the pattern analysis block 2240, it can perform pattern analysis on passed data, for example, to check whether a pattern or patterns exist in the data. In such an approach, based on pattern analysis, one or more ML models per the blocks 2260 and 2270 can detect and/or predict quality of data.

As to pattern analysis, it can provide for real-time predictions and/or for indications of type of data. As an example, a tiered ML model-based approach may be utilized where a first QC tier may be followed by one or more other QC tiers. As an example, a system may provide for checking, detecting, predicting, etc., various aspects of data. For example, consider a system that can check, detect, predict, etc., one or more of legal tags, restrictions, geography, etc.

Figure 23:
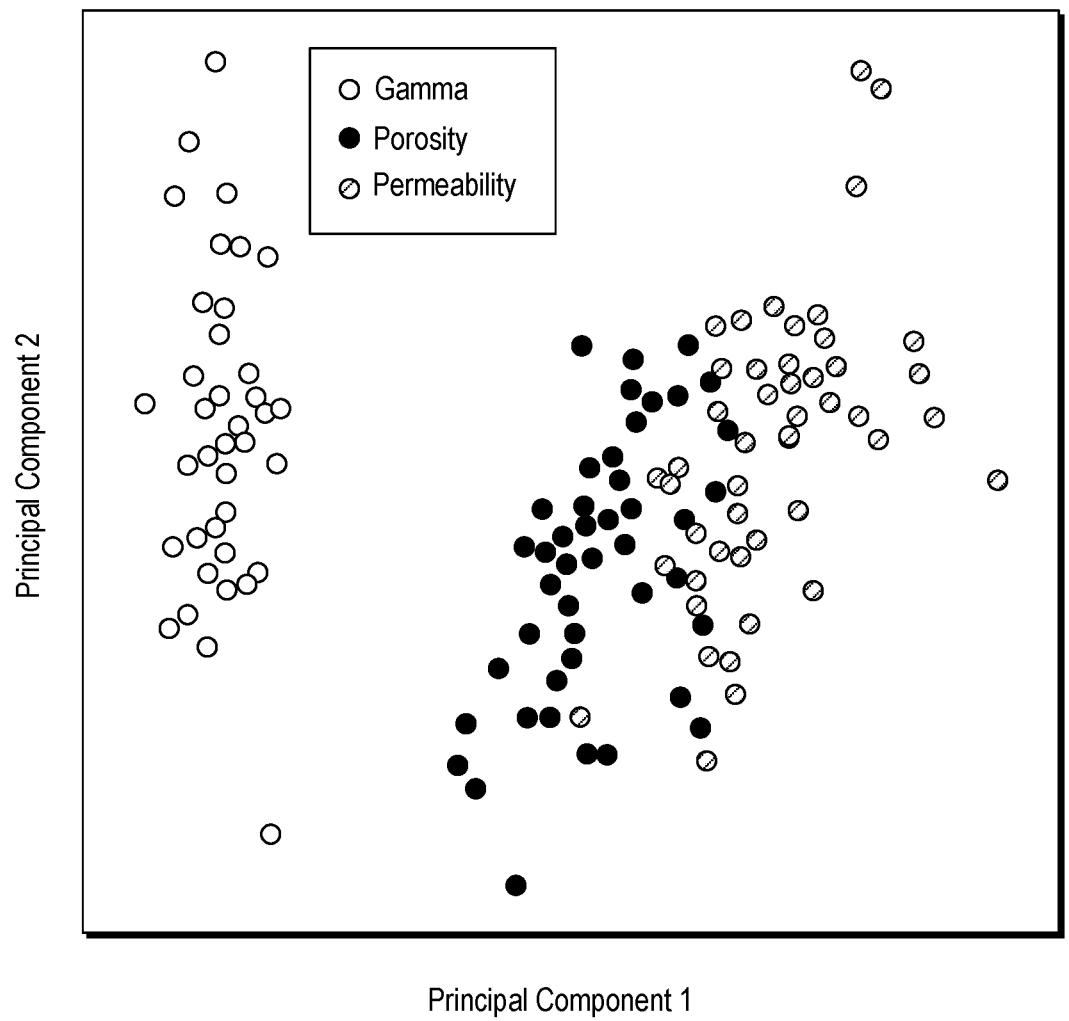
FIG. 23 illustrates an example of a plot of assessed data.

FIG. 23 shows an example plot 2300 of various data points rendered with respect to two axes that can correspond to a first principal component and a second principal component of a principal component analysis (PCA) technique. In the example of FIG. 23, PCA and/or another dimensionality reduction technique may be applied for purposes of data assessment, optionally in combination with one or more other techniques. As to PCA, the two components of the plot 2300 can represent ranked dimensions of variance in the data. For example, the two components can be arranged in chronological order of variance where the first principal component captures the most variance (e.g., information about the data), followed by the second principal component, third principal component, etc.

In the example of FIG. 23, the data are logcurve data where the logcurve data include gamma ray log data, porosity log data and permeability log data. As illustrated in FIG. 23, the different types of log data within the logcurve data occupy different regions within the two dimensions (first two principal components). As an example, a method can include perform 2-time PCA of another logcurve data and checking the data range to determine whether it lies within the same range, ranges, regions, etc., as in the plot 2300. Such an approach can help to check quality of data and facilitate decision making (e.g., by human, by machine, etc.).

While the data of the example of FIG. 23 pertain to downhole data associated with well-related operations, such techniques may be applied to field equipment data for other types of field operations (e.g., wind energy production, solar energy production, etc.). As an example, consider meteorological data that can include various types of data that can be identified and/or assessed as to quality. Such data can be germane to workflows, decision making, etc., in various energy production domains where operations may be organized according to sites, projects, etc.

As an example, the system 2200 of FIG. 22 may be provided as a service or scheduler that can be run on data on a certain interval. As an example, the system 2200 of FIG. 22 may be integrated into an environment, a framework, frameworks, etc., for purposes of performing quality checks on data before and/or during ingestion and transfer.

The system 2200 of FIG. 22 may help to create and enrich data assets in an efficient, user-friendly way; may help to maintain high-quality data by supporting proactive and reactive data maintenance as well as for data unification; may help to manage a data life-cycle, especially when it comes to sensitive data and retiring data; may help to increase the use of data by improving data discovery for users (e.g., data scientists for model training, etc.). The system 2200 may be implemented in a manner that helps to reduce the impact of bad data.

As explained, a system may provide for tagging and/or tag assessment. For example, tags may be utilized in automated contracts (e.g., smart contracts) for purposes of expiration, restrictions, usage time limit in a database, etc.

As an example, a workflow can include processing data using various restrictions (e.g., tags, geography, time, permissions, etc.), detecting type of data via one or more ML models, processing one or more types of data using various restrictions, assessing data quality via one or more ML models and processing the quality assessed data using various restrictions.

Figure 24:
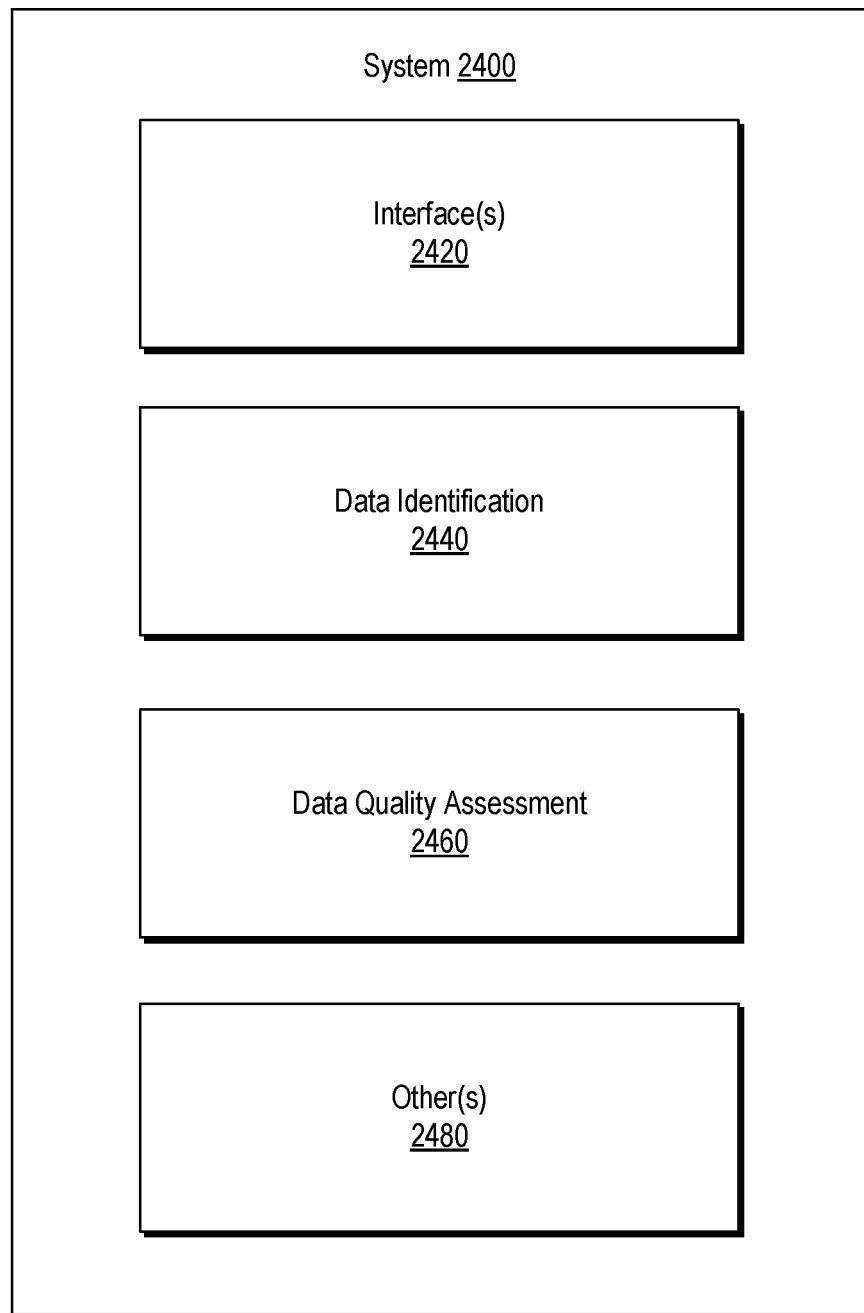
FIG. 24 illustrates an example of a system.

FIG. 24 shows an example of a system 2400 that includes an interface component 2420, a data identification component 2440, a data quality assessment component 2460 and optionally one or more other components 2480. Such a system can utilize one or more ML models to receive data via the interface component 2420 (e.g., network interface, network interfaces, etc.), to identify data types of the data via the data identification component 2440 and/or to assess data quality via the data quality assessment component 2460. As explained, such a system may operate via application programming interface (API) calls where, in response, data type and/or quality metrics are returned. In such an example, a call may specify whether to identify data type and/or whether to assess data quality.

Figure 25:
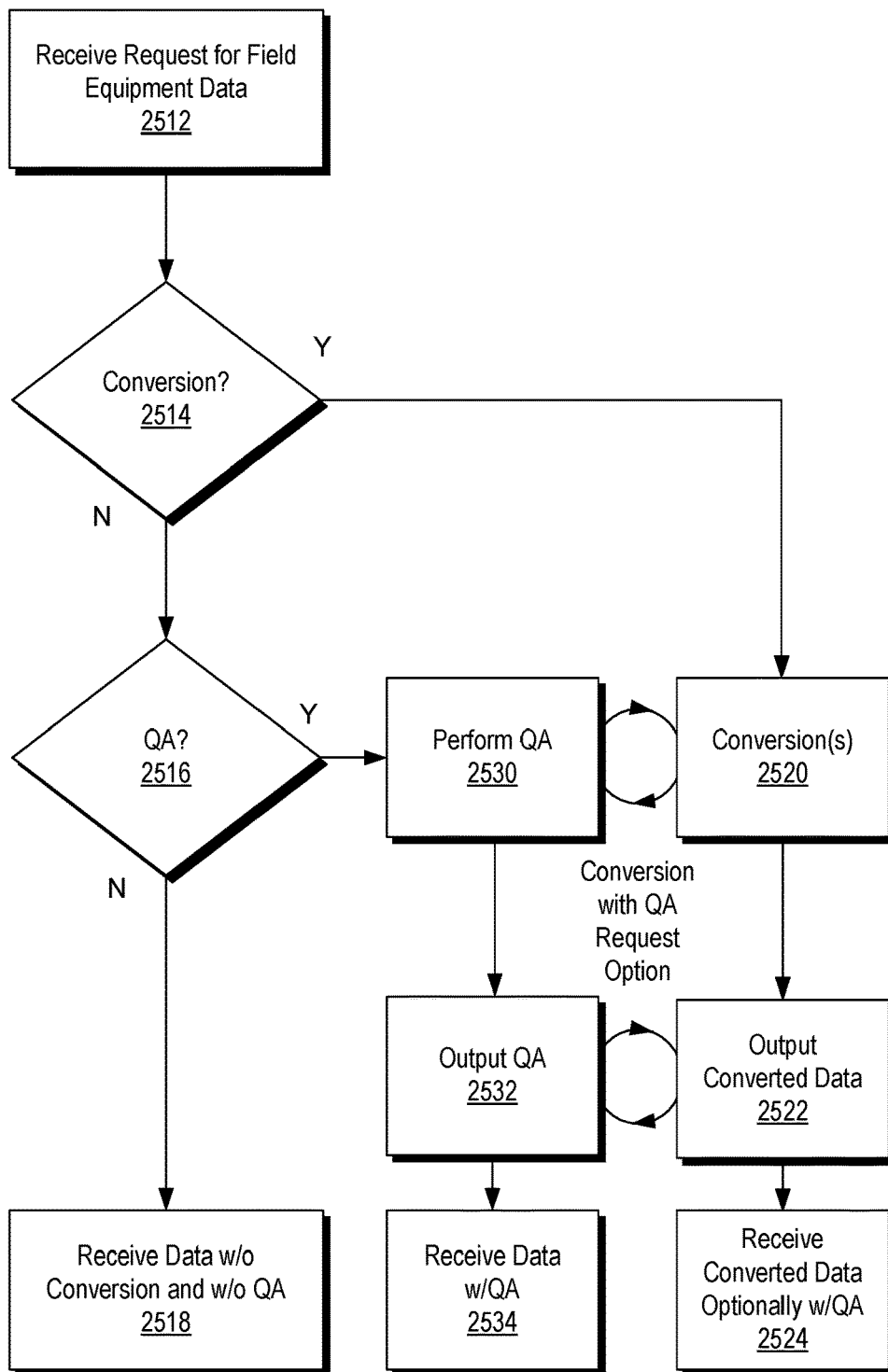
FIG. 25 illustrates an example of a method.

FIG. 25 shows an example of a method 2500 that includes a reception block 2512 for receiving a request for field equipment data, a decision block 2514 for deciding whether to convert the data and a decision block 2516 for deciding whether to quality assess the data. In such an example, a request may be received with one or more parameters that indicate whether one or more conversions are required and/or whether one or more quality assessments are desired.

As shown, where the decision block 2514 decides that a conversion is to occur, then the method 2500 can proceed to a conversion block 2520 for performing one or more conversions where the conversion block 2520 is operatively coupled (e.g., linked) to a performance block 2530 for performing quality assessment. As to conversions, consider, for example, a unit conversion, a coordinate system conversion or other conversion. As explained, where data are to be transferred from one framework to another framework, one or more data conversions like converting non-SI unit data to SI unit data, converting data from one coordinate reference system (CRS) to another, etc., may occur, which may raise one or more quality related issues. Such issues can be compounded where multiple conversions occur, where back and forth transfers occur, etc. For example, consider transferring data from a source for subsurface data that adheres to one standard to a destination that adheres to another standard. As shown in the method 2500 of FIG. 25, the conversion block 2520 can proceed to an output block 2522 for outputting converted data and the performance block 2530 can proceed to an output block 2532 that can output one or more quality metrics for the converted data and/or unconverted data noting that comparisons may be made between converted and unconverted data. As indicated, conversion may occur with a quality assessment (QA) option such that a reception block 2524 provides for receiving converted data optionally with a quality assessment.

In the example of FIG. 25, where the decision block 2514 decides that conversion is not to occur, the method 2500 can continue to the decision block 2516 to decide whether to perform quality assessment per the performance block 2530. In such an example, the performance block 2530 may operate in a manner that is independent of the conversion block 2520 and proceed to generate quality metrics that can be output by the output block 2532 and then to the reception block 2534 for receiving data with a quality assessment. As shown, in the case that the decision block 2516 decides that quality assessment is not to occur, the method 2500 can proceed to the reception block 2518 for receiving the data without conversion and without quality assessment.

As explained, where a conversion is to occur, a method can include automatically performing quality assessment. For example, consider the system 2400 as including a conversion component (e.g., as one of the other components 2480) where an API call for a conversion results in triggering quality assessment via the data quality assessment component 2460. In such an example, one or more conversions may occur based on data identification per the data identification component 2440. For example, if a particular type of unit is identified for data where another type of unit is known to be desired, then the system 2400 may automatically trigger a conversion component and optionally automatically trigger the data quality assessment component 2460.

As explained with respect to FIG. 23, identification may occur using one or more classification techniques such as, for example, PCA, which may be applied one or more times. As an example, data type classification/identification may also provide for unit detection. In various examples, data types (e.g., types of logs, surveys, etc.) may be identified via matching and/or plotting PCA output with reference to one or more base and/or trained datasets. As an example, a dataset may be available in different units such that matching and/or plotting can determine data type along with units (e.g., SI, non-SI, etc.). As mentioned, PCA may be combined with a clustering technique. For example, consider utilizing a clustering technique to define clusters for the three types of data shown in FIG. 23. In such an example, regions may be assessed spatially and/or statistically for purposes of classification/identification and/or quality assessment (e.g., consider distance from mean of a cluster, cluster boundary, etc.).

Figure 26:
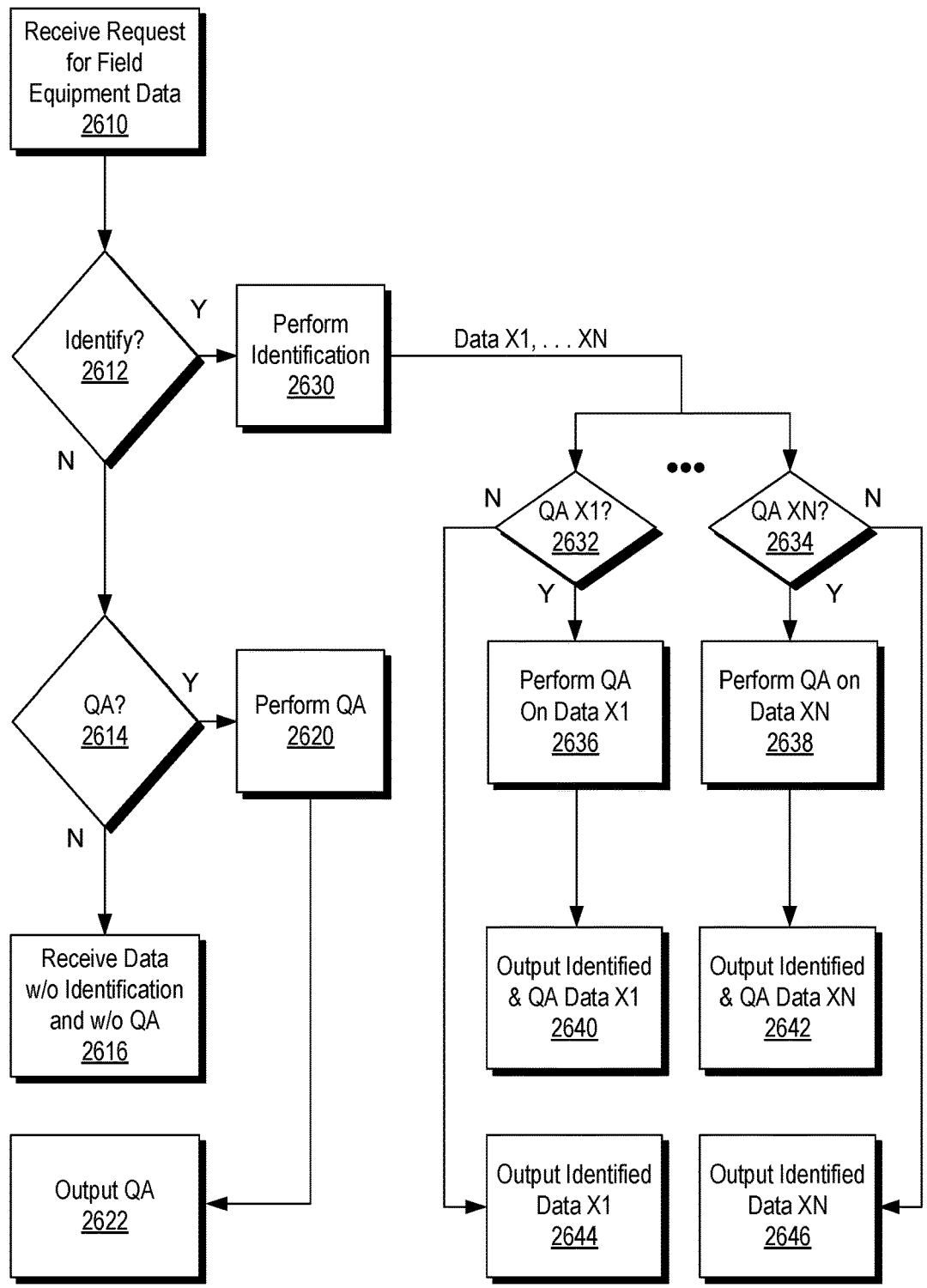
FIG. 26 illustrates an example of a method.

FIG. 26 shows an example of a method 2600 that includes a reception block 2610 for receiving a request for field equipment data where a decision block 2612 is provided for deciding whether to identify type and a decision block 2614 is provided for deciding whether to perform quality assessment without identifying type. As shown, the decision block 2614 can proceed to a performance block 2620 for performing quality assessment or can proceed to a block 2616 for receiving the data without identification and without quality assessment. Where quality assessment is performed, the block 2620 can proceed to an output block 2622 for outputting one or more quality metrics.

In the example of FIG. 26, where the decision block 2612 decides that identification is to occur, the method 2600 can proceed to a performance block 2630 for performing identification as to data type (e.g., and optionally units). As shown, the performance block 2630 may identify one or more data types, indicated as X1 to XN, where N is 1 or greater (e.g., where N=1 is a single type). In such an approach, an appropriate number of decision blocks 2632 and 2634 can be utilized for deciding whether to quality assess each of the data types. As shown, the decision blocks 2632 and 2634 can proceed to performing quality assessment per blocks 2636 and 2638 and outputting identified and quality assessed data per blocks 2640 and 2642 and/or can proceed to outputting identified data type(s) per blocks 2644 and 2646. In various examples, one or more data types may not be amenable to quality assessment while one or more other data types are amenable to quality assessment. Thus, the method 2600 may output information using one or more of the blocks 2640, 2642, 2644 and 2646 (e.g., as may be present depending on the value of N).

As explained, some data types may be appropriate for conversion. In such an example, a method such as the method 2600 can include one or more decision blocks as to conversion, which may be prior to and/or after identification, quality assessment, etc. As an example, the method 2600 may include one or more loops where one or more decisions may cause a loop to be entered. For example, if a quality assessment fails, that may indicate an inappropriate identification such that a loop back to the performance block 2630 occurs.

As an example, a request of the reception block 2610 may include one or more parameters that indicate how one or more decisions are to be made. For example, consider logic where, if a particular type of data is identified, then quality assessment for that particular type of data is to occur. Similarly, logic can be provided where, if a particular type of data is identified, then quality assessment for that particular type of data is not to occur. While type of data and quality are mentioned, one or more parameters may pertain to conversion (e.g., unit conversion, reference system conversion, etc.). As an example, an API may provide for specifying source or sources and destination or destinations. In such an example, consider a source as being a first framework and a destination as being a second framework where parameters provide logic for making decisions as to one or more of identification, conversion and quality assessment. Given such information, a system such as the system 2400 may perform appropriate actions to help assure the second framework can utilize the source data, where data operations, assessments, etc., may occur in a seamless and automated manner, which may be hidden or visible to a user of the second framework.

FIG. 27 shows an example of a system 2700 and an example of a method 2750. As shown, the system 2700 can include framework X data 2710 as source data or destination data, an identification/mapping and/or assessment component 2720 operatively coupled to or including one or more ML models 2730 and framework Y data 2740 as destination data or source data. In such an example, consider the framework X data 2710 as being entity type of data while the framework Y data 2740 are well domain type of data (see also the methods 700-1 and 700-2 of FIG. 7). In such an example, the system 2700 can utilize one or more of the ML models 2730 (e.g., unsupervised and/or supervised) in a forward mode or in an inverse mode to provide for identification and/or mapping between the types of data of the framework X data 2710 and the framework Y data 2740.

As an example, the system 2700 can provide for transfer of data between frameworks, platforms, etc. Such a system may utilize an already trained ML model in a forward or an inverse manner (e.g., with logic inversion). For example, consider using a supervised ML model that can use a common training dataset to recognize well domain data and, inversely, to recognize entity data.

In FIG. 27, the method 2750 is shown with respect to the framework X and framework Y along with two parallel timelines. In the example of FIG. 27, the method 2750 is shows as getting data 2752, identifying data 2754 and sending data 2756 associated with the framework X to the framework Y. As shown, the framework Y can receive data 2758, save data 2760 and also get data 2762 and identify data 2764 for purposes of quality assessment. In such an example, a technique such as a PCA technique may be performed on data prior to sending (see sent data 2756) of the framework X associated data, which may be part of an identification process (see identify data 2754) as may be performed by an intermediate system (see, e.g., the blocks 2720 and 2730 of the system 2700). Further, the same technique may be performed on data that has been sent or otherwise available (see get data 2762) to the framework Y, which may be part of an identification process (see identify data 2764). In the example of FIG. 27, the techniques are shows a PCA techniques 2766 and 2768. As shown, results of the PCA techniques 2766 and 2768 can be utilized to perform a quality assessment 2770 (e.g., a PCA results to PCA results comparison). On the basis the quality assessment, the method 2750 can include creating a report 2772 that can be available for one or more purposes. For example, if a report indicates that quality is lacking, a user of the framework Y may decide to not continue with a workflow; whereas, if the report indicates that quality is sufficient, then the user of the framework & may decide to continue with the workflow.

As explained with respect to FIG. 23, a PCA or another technique may provide for characterizing data with respect to regions where different regions may correspond to different types of data. In such an approach, data represented within a region may indicate a span of data, data variance, data outliers, data shifts, etc. As an example, where location information is shifted due to a conversion (e.g., a coordinate reference system conversion, a units conversion, etc.), such a shift may be detectable via a comparison of PCA results. As an example, a system may include a location adjustment option where an indicated shift or shifts can be compensated in a manner to that helps assure location accuracy exists for transferred data.

As an example, a method can include receiving a request for field equipment data; responsive to the request, automatically processing the field equipment data using a trained machine learning model to generate a quality score for the field equipment data; and outputting the quality score. In such an example, generating the request can occur responsive to accessing a project via a computational framework. For example, consider accessing a project for a well using a framework such as the PETREL framework or the TECHLOG framework. As explained, field equipment data may be associated with one or more domains, which can include one or more energy domains (e.g., hydrocarbon energy, wind energy, solar energy, thermal energy, etc.).

As an example, a method can include making a determination that a quality score exceeds a threshold and, responsive to the determination, processing field equipment data using computational framework. For example, a method can automatically, semi-automatically or manually allow for a user to proceed with a workflow where a quality score exceeds a threshold. In such an example, the user can have an assurance that the data are of sufficient quality to proceed with the workflow.

As an example, a method can include receiving feedback on a quality score and re-training a trained machine learning model based at least in part on the feedback. For example, consider an upvote/downvote approach where a user may accept or reject receipt of data for processing using a framework. In such an example, an acceptance (upvote) or a rejection (downvote) may be utilized as feedback for purposes of re-training, for example, to improve quality assessment by a machine learning model.

As an example, a method can include selecting a trained machine learning model from an ensemble of trained machine learning models based at least in part on an accuracy metric. For example, consider utilizing a number of ML models to process data and to generate accuracy metrics based on such processing. As explained with respect to the example tables 1410 and 1420 of FIG. 14, accuracy metrics can be compared to rank models based on accuracy.

As an example, a method can include, responsive to a request, automatically processing field equipment data to identify at least one type of data in the field equipment data. In such an approach, one or more types of data may be identified. As an example, a method can include automatically processing field equipment data to identify at least one type of data via analyzing variable properties of field equipment data variables.

As an example, a method can include training a machine learning model to generate a trained machine learning model. In such an example, the training can include unsupervised learning and/or supervised learning.

As an example, a method can include automatically processing field equipment data using a trained machine learning model as a first trained machine learning model for generation of a quality score and can include automatically processing the field equipment data using a second trained machine learning model to generate a prediction for the field equipment data. For example, consider a trend prediction that indicates a trend in the field equipment data, which may be a current trend that can be extrapolated to a future time or future times. As an example, a method can include generating a suggestion to improve a quality score based at least in part on a prediction. For example, if a predicted trend is associated with poor data quality, a suggestion may provide information to improve data quality (e.g., adjusting a sampling rate, a conversion technique, etc.).

As an example, a method can include generating a request based at least in part on recognizing speech in audio signals via a speech recognition engine. In such an example, generating the request can be based at least in part on natural language processing of the speech via a natural language processing engine. As explained, a voice-enabled assistant (VEA) may be utilized for user interactions with a system or systems.

As an example, a method can include making a determination that a quality score for field equipment data exceeds a threshold and, responsive to the determination, splitting the field equipment data into at least a training portion and a testing portion. In such an example, the method can include training a machine learning model using the training portion and the testing portion of the field equipment data.

As an example, a method can include outputting that outputs a quality score to a data quality dashboard.

As an example, a system can include a processor; memory accessible to the processor; and processor-executable instructions stored in the memory to instruct the system to: receive a request for field equipment data; responsive to the request, automatically process the field equipment data using a trained machine learning model to generate a quality score for the field equipment data; and output the quality score.

As an example, one or more computer-readable storage media can include processor-executable instructions to instruct a computing system to: receive a request for field equipment data; responsive to the request, automatically process the field equipment data using a trained machine learning model to generate a quality score for the field equipment data; and output the quality score.

As an example, a method can include receiving a request for field equipment data; responsive to the request, automatically processing the field equipment data using a machine learning model to identify data types in the field equipment data; and outputting the data types. In such an example, automatically processing can include performing dimensionality reduction on the field equipment data and identifying spatial regions where each of the spatial regions corresponds to one of the data types. For example, consider a method that performs dimensionality reduction at least in part by performing principal component analysis (PCA).

As an example, a method can include comparing spatial regions for field equipment data to pre-defined spatial regions. In such an example, the pre-defined spatial regions may be determined via utilization of a technique such as PCA on training data, historical data, etc. As explained, data quality may be assessed in a reduced dimensionality space (e.g., of an encoder, a PCA technique, etc.).

As an example, field equipment data can be associated with a first framework where a request is received from a second framework. In such an example, the field equipment data may be formatted according to a convention of the first framework where the request is for utilization of at least a portion of the field equipment data for the second framework, which may adhere to a different formatting convention. As an example, a method can handle data types that correspond to a first framework and include mapping field equipment data for those data types to data types of a second framework. In such an example, a mapping or mappings can be utilized, which may be for forward mapping and/or inverse mapping. As explained, a method may provide for mapping of data between frameworks such as the TECHLOG and PETREL frameworks, which utilize different data formats, data structures, etc. In such an approach, mappings, once established, can be utilized in a forward manner or in an inverse manner.

As an example, a method can include processing field equipment data to identify units of the field equipment data. In such an example, the method can include, responsive to identification of the units, performing unit conversion for at least a portion of the field equipment data.

As an example, a method can include processing field equipment data to identify a reference system of the field equipment data. In such an example, the method can include, responsive to identification of the reference system, performing a reference system conversion for at least a portion of the field equipment data. As an example, a reference system can be a coordinate reference system (CRS).

As an example, a method can include training a model using machine learning to generate a machine learning model. In such an example, training can include supervised training and/or unsupervised training.

As an example, a method can include performing unsupervised training utilizing at least a portion of field equipment data. As explained, PCA is a technique that may be utilized in an unsupervised manner to process field equipment data for one or more purposes.

As an example, a method can include using a trained machine learning model that is trained using supervised learning and case-based reasoning. In such an example, a case base maybe provided, generated, supplemented, etc. As explained, a case base may be a resource for handling data requests between frameworks (e.g., PETREL and TECHLOG).

As an example, a method can include automatically processing field equipment data to identify data types via analyzing variable properties of field equipment data variables. In such an example, the variable properties can form a hierarchy. For example, consider a hierarchy that includes parent and child relationships.

As an example, a system can include a processor; memory accessible to the processor; and processor-executable instructions stored in the memory to instruct the system to: receive a request for field equipment data; responsive to the request, automatically process the field equipment data using a machine learning model to identify data types in the field equipment data; and output the data types.

As an example, one or more computer-readable storage media can include processor-executable instructions to instruct a computing system to: receive a request for field equipment data; responsive to the request, automatically process the field equipment data using a machine learning model to identify data types in the field equipment data; and output the data types.

As an example, a computer program product can include one or more computer-readable storage media that can include processor-executable instructions to instruct a computing system to perform one or more methods and/or one or more portions of a method.

Figure 28:
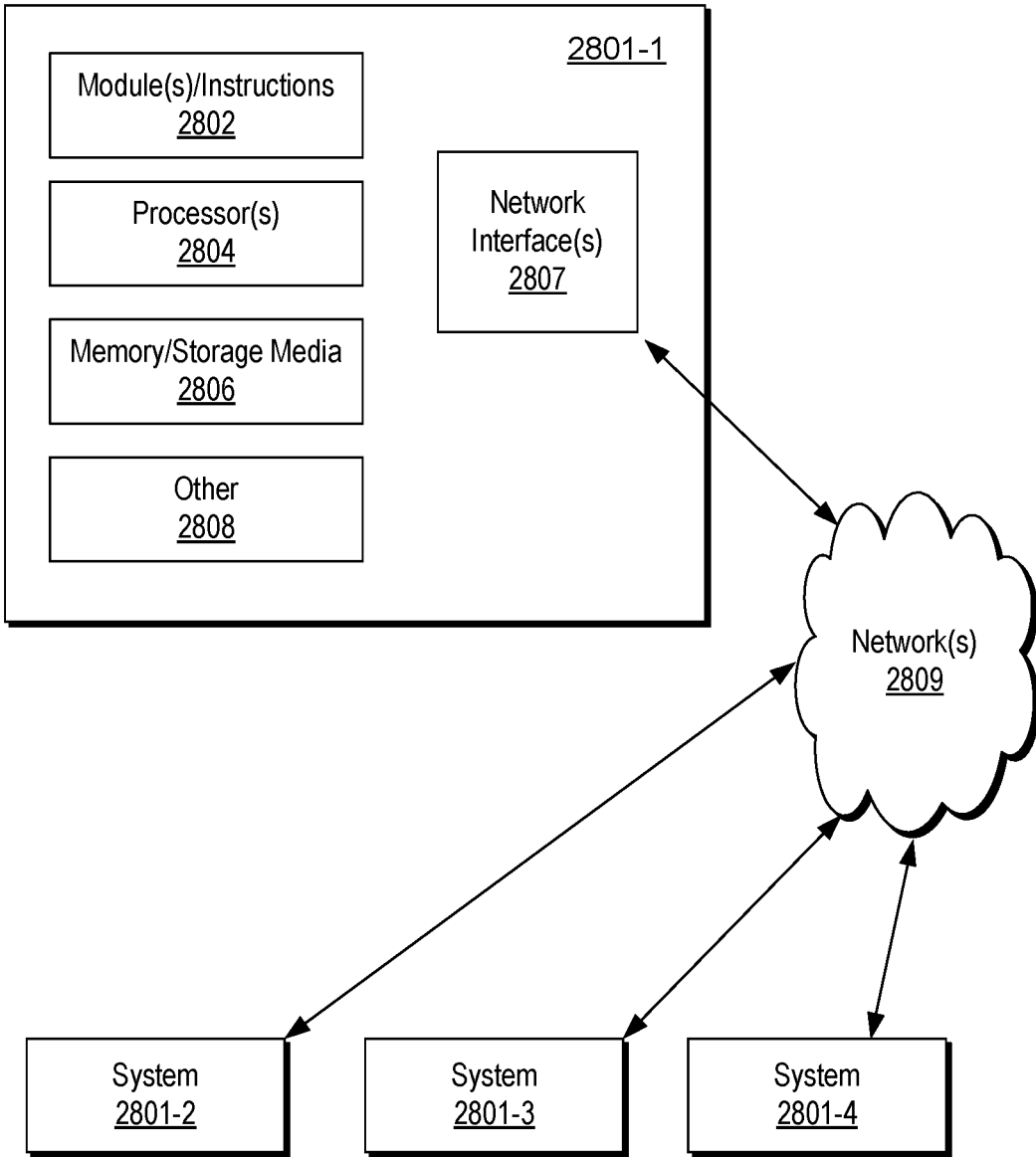
FIG. 28 illustrates examples of computer and network equipment.

In some embodiments, a method or methods may be executed by a computing system. FIG. 28 shows an example of a system 2800 that can include one or more computing systems 2801-1, 2801-2, 2801-3 and 2801-4, which may be operatively coupled via one or more networks 2809, which may include wired and/or wireless networks.

As an example, a system can include an individual computer system or an arrangement of distributed computer systems. In the example of FIG. 28, the computer system 2801-1 can include one or more modules 2802, which may be or include processor-executable instructions, for example, executable to perform various tasks (e.g., receiving information, requesting information, processing information, simulation, outputting information, etc.).

As an example, a module may be executed independently, or in coordination with, one or more processors 2804, which is (or are) operatively coupled to one or more storage media 2806 (e.g., via wire, wirelessly, etc.). As an example, one or more of the one or more processors 2804 can be operatively coupled to at least one of one or more network interface 2807. In such an example, the computer system 2801-1 can transmit and/or receive information, for example, via the one or more networks 2809 (e.g., consider one or more of the Internet, a private network, a cellular network, a satellite network, etc.).

As an example, the computer system 2801-1 may receive from and/or transmit information to one or more other devices, which may be or include, for example, one or more of the computer systems 2801-2, etc. A device may be located in a physical location that differs from that of the computer system 2801-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 2806 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EE- PROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

Figure 29:
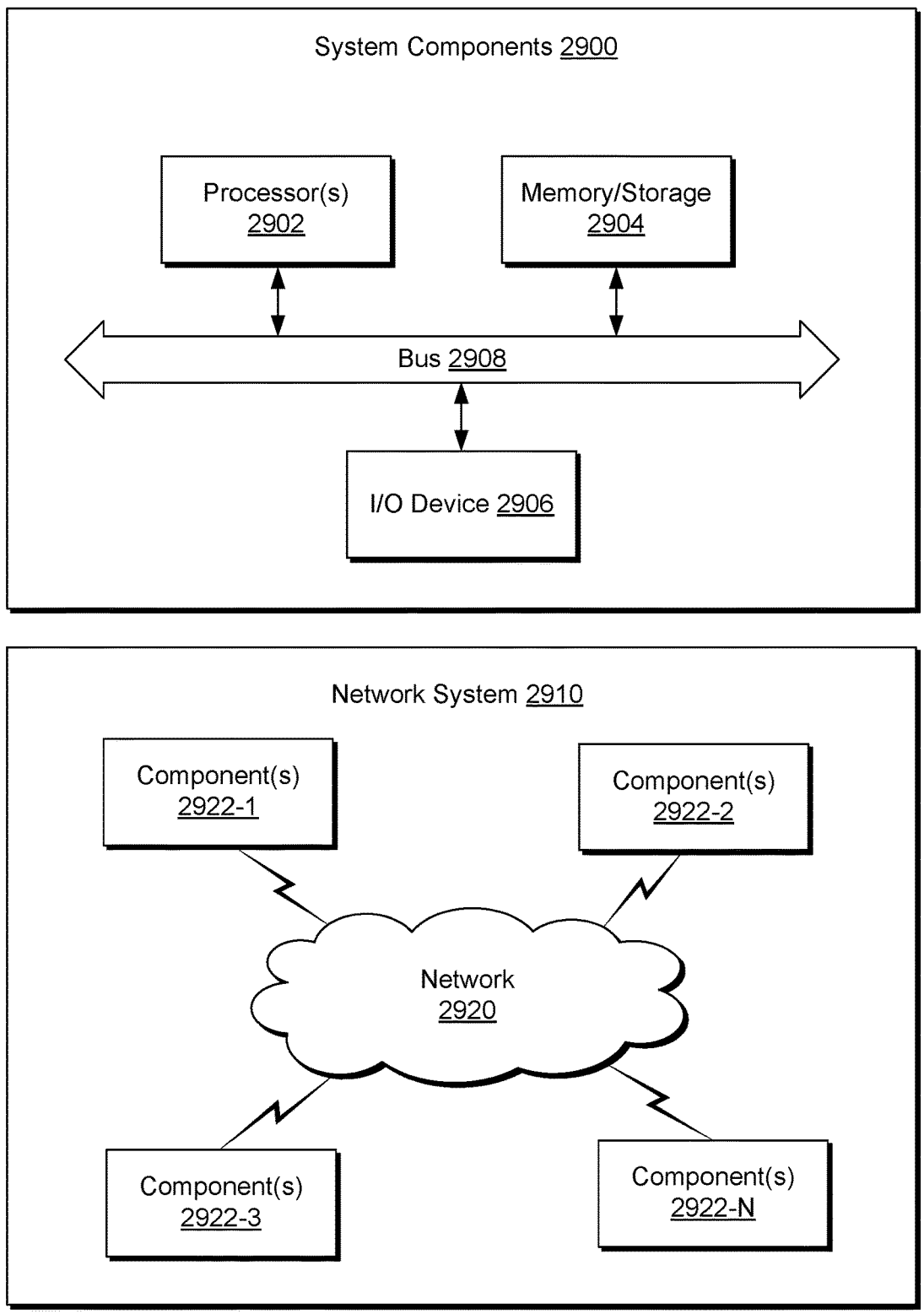
FIG. 29 illustrates example components of a system and a networked system.

FIG. 29 shows components of an example of a computing system 2900 and an example of a networked system 2910 with a network 2920. The system 2900 includes one or more processors 2902, memory and/or storage components 2904, one or more input and/or output devices 2906 and a bus 2908. In an example embodiment, instructions may be stored in one or more computer-readable media (e.g., memory/storage components 2904). Such instructions may be read by one or more processors (e.g., the processor(s) 2902) via a communication bus (e.g., the bus 2908), which may be wired or wireless. The one or more processors may execute such instructions to implement (wholly or in part) one or more attributes (e.g., as part of a method). A user may view output from and interact with a process via an I/O device (e.g., the device 2906). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 2910. The network system 2910 includes components 2922-1, 2922-2, 2922-3, . . . 2922-N. For example, the components 2922-1 may include the processor(s) 2902 while the component(s) 2922-3 may include memory accessible by the processor(s) 2902. Further, the component(s) 2922-2 may include an I/O device for display and optionally interaction with a method. The network 2920 may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method comprising:
receiving, from a framework, a request for field equipment data obtained from field equipment at a reservoir;
automatically identifying, using a machine learning model, data types of the field equipment data;
automatically converting, by the machine learning model, the data types to a data structure used by the framework in response to the machine learning model determining that the data types are in a different format from the data structure used by the framework;
generating, by the machine learning model, a quality metric in response to performing a quality assessment of converting the data types to the data structure used by the framework;
providing the field equipment data in the data structure used by the framework and the quality metric; and
performing, in response to the quality metric exceeding a threshold, a simulation on the field equipment data.

2. The method of claim 1, wherein the machine learning model performs dimensionality reduction on the field equipment data and an identification of spatial regions in the field equipment data wherein each of the spatial regions corresponds to one of the data types.

3. The method of claim 2, wherein performing dimensionality reduction comprises performing principal component analysis (PCA).

4. The method of claim 2, further comprising comparing the spatial regions for the field equipment data to defined spatial regions.

5. The method of claim 1, wherein the machine learning model compares the data types to the data structure used by the framework and automatically converts the data types in response to determining the data types are in a different format from the data structure.

6. The method of claim 1, wherein the machine learning model identifies units of measurement of the field equipment data.

7. The method of claim 6, further comprising, responsive to identification of the units of measurement, the machine learning model converting the units of measurement for at least a portion of the field equipment data into a unit of measurement used by the framework.

8. The method of claim 1, wherein the machine learning model identifies a coordinate reference system of the field equipment data.

9. The method of claim 8, wherein the machine learning model, responsive to identification of the coordinate reference system, converts the coordinate reference system for at least a portion of the field equipment data to a coordinate reference system used by the framework.

10. The method of claim 1, further comprising training the machine learning model.

11. The method of claim 10, wherein the training comprises using supervised machine learning processes.

12. The method of claim 10, wherein the training comprises using unsupervised machine learning processes.

13. The method of claim 12, wherein the unsupervised machine learning processes use at least a portion of the field equipment data for the training.

14. The method of claim 1, further comprising training the machine learning model using supervised learning and case-based reasoning.

15. The method of claim 1, wherein the machine learning model analyzes variable properties of field equipment data variables to identify the data types.

16. The method of claim 15, wherein the variable properties form a hierarchy.

17. The method of claim 16, wherein the hierarchy comprises parent and child relationships.

18. The method of claim 1, wherein if the quality metric is below the threshold, data degradation occurred during the conversion, and the method further comprises:
providing feedback to the machine learning model on the conversion; and
updating the machine learning model using the feedback.

19. A system comprising:
a processor;
memory accessible to the processor; and
processor-executable instructions stored in the memory to instruct the system to:
receive, from a framework, a request for field equipment data obtained from field equipment at a reservoir;
automatically identify, using a machine learning model, data types of the field equipment data;
automatically convert, by the machine learning model, the data types to a data structure used by the framework in response to the machine learning model determining that the data types are in a different format from the data structure used by the framework;
generate, by the machine learning model, a quality metric in response to performing a quality assessment of converting the data types to the data structure used by the framework;
provide the field equipment data in the data structure used by the framework and the quality metric; and
perform, in response to the quality metric exceeding a threshold, a simulation on the field equipment data.

20. One or more computer-readable storage media comprising processor-executable instructions to instruct a computing system to:
receive, from a framework, a request for field equipment data obtained from field equipment at a reservoir;
automatically identify, using a machine learning model, data types of the field equipment data;
automatically convert, by the machine learning model, the data types to a data structure used by the framework in response to the machine learning model determining that the data types are in a different format from the data structure used by the framework;
generate, by the machine learning model, a quality metric in response to performing a quality assessment of converting the data types to the data structure used by the framework;
provide the field equipment data in the data structure used by the framework and the quality metric; and
perform, in response to the quality metric exceeding a threshold, a simulation on the field equipment data.

* * * * *